US008432358B2

(12) United States Patent
Hunleth et al.

(10) Patent No.: US 8,432,358 B2
(45) Date of Patent: *Apr. 30, 2013

(54) METHODS AND SYSTEMS FOR ENHANCING TELEVISION APPLICATIONS USING 3D POINTING

(75) Inventors: Frank A. Hunleth, Rockville, MD (US); Negar Moshiri, Bethesda, MD (US); William J. Napier, Germantown, MD (US); Daniel S. Simpkins, Bethesda, MD (US); Frank J. Wroblewski, Gaithersburg, MD (US); Kevin Conroy, Rockville, MD (US); Charles W. K. Gritton, Sterling, VA (US)

(73) Assignee: Hillcrest Laboratories, Inc., Rockville, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 13/448,907

(22) Filed: Apr. 17, 2012

(65) Prior Publication Data

US 2012/0204210 A1 Aug. 9, 2012

Related U.S. Application Data

(63) Continuation of application No. 12/951,669, filed on Nov. 22, 2010, now Pat. No. 8,169,405, which is a continuation of application No. 11/354,329, filed on Feb. 14, 2006, now Pat. No. 7,839, 385.

(60) Provisional application No. 60/653,229, filed on Feb. 14, 2005.

(51) Int. Cl.
*G09G 5/08* (2006.01)

(52) U.S. Cl.
USPC .......................................... 345/158; 345/156

(58) Field of Classification Search .......... 345/156–169, 345/418–428
See application file for complete search history.

(56) References Cited

U.S. PATENT DOCUMENTS

| 4,745,402 A | 5/1988 | Auerbach |
| 5,045,843 A | 9/1991 | Hansen |

(Continued)

FOREIGN PATENT DOCUMENTS

| GB | 2 237 911 | 5/1991 |
| WO | 98/43183 | 10/1998 |

OTHER PUBLICATIONS

Verhoeven, A., et al., "Hypermedia on the Map: Spatial Hypermedia in HyperMap," International Conference on Information, Communications and Signal Processing, ICICS '97, Singapore, Sep. 9-12, 1997, pp. 589-592.

(Continued)

*Primary Examiner* — Vijay Shankar
(74) *Attorney, Agent, or Firm* — Potomac Patent Group PLLC

(57) ABSTRACT

Systems and methods according to the present invention provide a control framework for organizing, selecting and launching media items including graphical user interfaces coupled with an optional 3D control device for collection of the basic control primitives of point, click, scroll, hover and zoom which permit for easy and rapid selection of media items, e.g., movies, songs etc., from large or small collections. The remote control maps natural hand movements and gestures into relevant commands while the graphical display uses images, zooming for increased/decreased levels of detail and continuity of GUI objects to provide easy organization, selection and navigation among the media items by a user.

27 Claims, 49 Drawing Sheets

U.S. PATENT DOCUMENTS

| | | | |
|---|---|---|---|
| 5,297,061 A | 3/1994 | Dementhon | |
| 5,341,466 A | 8/1994 | Perlin et al. | |
| 5,359,348 A | 10/1994 | Pilcher et al. | |
| 5,554,980 A | 9/1996 | Hashimoto et al. | |
| 5,638,523 A | 6/1997 | Mullet et al. | |
| 5,671,342 A | 9/1997 | Millier et al. | |
| 5,745,710 A | 4/1998 | Clanton, III et al. | |
| 5,790,121 A | 8/1998 | Sklar et al. | |
| 5,793,438 A | 8/1998 | Bedard | |
| 5,796,395 A | 8/1998 | de Hond | |
| 5,835,156 A | 11/1998 | Blonstein et al. | |
| 5,912,612 A | 6/1999 | DeVolpi | |
| 5,940,072 A | 8/1999 | Jahanghir et al. | |
| 5,955,988 A | 9/1999 | Blonstein et al. | |
| 5,978,043 A | 11/1999 | Blonstein et al. | |
| 5,982,369 A | 11/1999 | Sciammarella et al. | |
| 6,002,394 A | 12/1999 | Schein et al. | |
| 6,005,578 A | 12/1999 | Cole | |
| 6,016,144 A | 1/2000 | Blonstein et al. | |
| 6,037,933 A | 3/2000 | Blonstein et al. | |
| 6,049,823 A | 4/2000 | Hwang | |
| 6,057,831 A | 5/2000 | Harms et al. | |
| 6,088,031 A | 7/2000 | Lee et al. | |
| 6,092,076 A | 7/2000 | McDonough et al. | |
| 6,154,723 A | 11/2000 | Cox et al. | |
| 6,175,362 B1 | 1/2001 | Harms et al. | |
| 6,181,333 B1 | 1/2001 | Chaney et al. | |
| 6,191,781 B1 | 2/2001 | Chaney et al. | |
| 6,195,089 B1 | 2/2001 | Chaney et al. | |
| 6,268,849 B1 | 7/2001 | Boyer et al. | |
| 6,295,646 B1 | 9/2001 | Goldschmidt Iki | |
| 6,314,575 B1 | 11/2001 | Billock et al. | |
| 6,330,858 B1 | 12/2001 | McDonough et al. | |
| 6,349,257 B1 | 2/2002 | Liu et al. | |
| 6,385,542 B1 | 5/2002 | Millington | |
| 6,397,387 B1 | 5/2002 | Rosin et al. | |
| 6,400,406 B1 | 6/2002 | Kim | |
| 6,411,308 B1 | 6/2002 | Blonstein et al. | |
| 6,412,110 B1 | 6/2002 | Schein et al. | |
| 6,415,226 B1 | 7/2002 | Kozak | |
| 6,421,067 B1 | 7/2002 | Kamen et al. | |
| 6,426,761 B1 | 7/2002 | Kanevsky et al. | |
| 6,429,813 B2 | 8/2002 | Fiegen | |
| 6,452,609 B1 | 9/2002 | Katinsky et al. | |
| 6,529,218 B2 | 3/2003 | Ogawa et al. | |
| 6,577,350 B1 | 6/2003 | Proehl et al. | |
| 6,621,452 B2 | 9/2003 | Knockeart et al. | |
| 6,735,777 B1 | 5/2004 | Kim | |
| 6,753,849 B1 | 6/2004 | Curran et al. | |
| 6,765,598 B2 | 7/2004 | Kim | |
| 7,194,702 B1 | 3/2007 | Peasley | |
| 7,839,385 B2 * | 11/2010 | Hunleth et al. | 345/158 |
| 8,169,405 B2 * | 5/2012 | Hunleth et al. | 345/158 |
| 2002/0112237 A1 | 8/2002 | Kelts | |
| 2002/0129366 A1 | 9/2002 | Schein et al. | |
| 2003/0038778 A1 | 2/2003 | Noguera | |
| 2004/0103432 A1 | 5/2004 | Barrett | |
| 2004/0218104 A1 | 11/2004 | Smith et al. | |
| 2004/0268393 A1 | 12/2004 | Hunleth et al. | |
| 2005/0102634 A1 | 5/2005 | Sloo | |
| 2005/0253806 A1 | 11/2005 | Liberty et al. | |
| 2006/0028446 A1 | 2/2006 | Liberty et al. | |

OTHER PUBLICATIONS

International Search Report for PCT/US01/08377, mailed Jul. 25, 2005.

Quesenbery, W., et al., Designing for Interactive Television, http://www.wqusability.com/articles/itv-design.html, 1996, pp. 1-6.

Prasar, V., Technology to the aid of science popularisation, http://www.vigyanprasar.com/dream/jan99/janvpinsight.htm, Jan. 1999, pp. 1-2.

Press Release, NetTV Selected for 800 Kansas City Classrooms, http://www.fno.org/mar98/NKCSDPR1.html, Mar. 23, 1998, pp. 1-2.

Fuerst, J. et al., Interactive Television: A Survey of the State of Research and the Proposal and Evaluation of a User Interface, http://wwwai.wu-wien.ac.at/~koch/stud/itv/paper.html, Jun. 1996, pp. 1-11.

Bier, E. et al., Toolglass and Magic Lenses: The See-Through Interface, Proceedings of Siggraph 93, Computer Graphics Annual Conference Series, ACM, Aug. 1993, pp. 73-80.

Stone, M., et al., The Movable Filter as a User Interface Tool, Proceedings of CHI '94, ACM, Apr. 24-28, 1994, pp. 306-312.

Bier, E. et al., A Taxonomy of See-Through Tools, Proceedings of CHI '94, ACM, Apr. 24-28, 1994, pp. 358-364.

Fishkin, K., et al., "Enhanced Dynamic Queries via Movable Filters", in Proc. ACM CHI '95, pp. 415-420, Denver, May 7-11, 1995. ACM Press.

Benderson, B., Quantum Treemaps and Bubblemaps for Zoomable Image Browser, UIST 2001, ACM, Symposium on User Interface Software and Technology, CHI Letters 3(2), pp. 71-80.

International Search Report for PCT/US04/14487, mailed Feb. 9, 2005.

Written Opinion of the International Searching Authority for PCT/US04/14487, mailed Feb. 9, 2005.

International Search Report for PCT/US06/05108, mailed Mar. 6, 2008.

Written Opinion for PCT/US06/05108, mailed Mar. 6, 2008.

Supplemental European Search Report for EP 06 73 4988, dated Jul. 2, 2009.

International Search Report for PCT/US01/08331, mailed Nov. 13, 2002.

International Search Report for PCT/US01/08261, mailed Aug. 5, 2002.

European Patent Office Office Action in corresponding European Application No. 06 734 988.6—2202 dated Jul. 25, 2012.

* cited by examiner

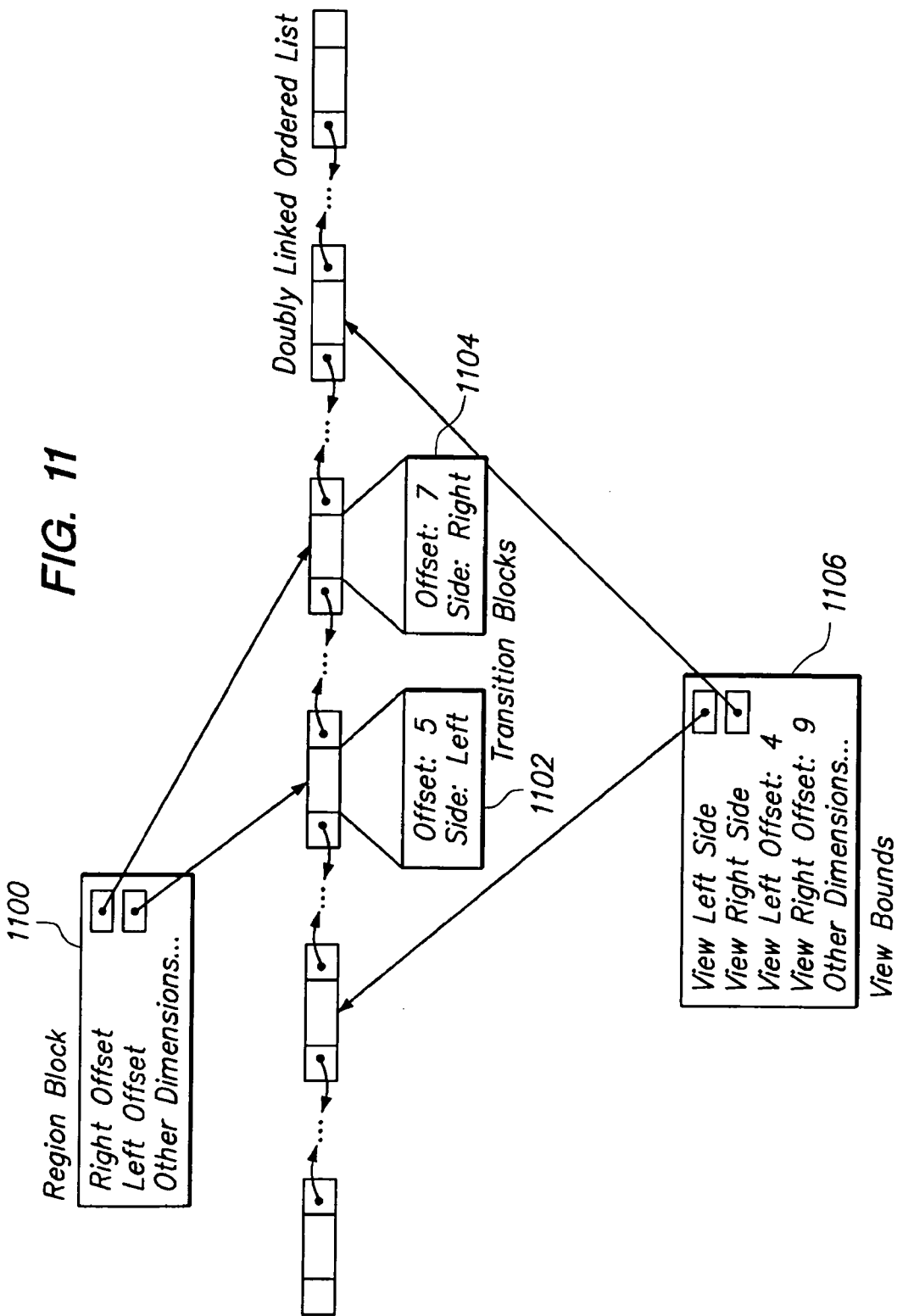

DRAMA

APOLLO 13 (1995)
Length: 120 Minutes    Price: $3.99

Massively popular, fast-paced retelling of near-disaster space mission. Much to enjoy for fans of suspense and special effects. Well-developed characters appeal even to those who don't like typical Hollywood epics.

Actors: Tom Hanks, Bill Paxton, Kevin Bacon, Gary Sinise, Ed Harris (BUY/WATCH TRAILER/BACK)

Tom Hanks

American leading actor Tom Hanks has become one of the most popular stars in contemporary American cinema. Born July 9, 1956, in Concord, CA.

Rated by Empire Magazine as 17th out of The Top 100 Movie Stars of All Time in October 1997, Hanks is married to actress Rita Wilson, with whom he appeared in Volunteers (1985).

Filmography
Saving Private Ryan
The Green Mile
Forrest Gump
Road to Perdition
Apollo 13
Philadelphia
Toy Story
Cast Away

FIG. 23B

WGNS The Beverly Hillbillies
15 WGNSAT  9:00 AM–9:30 AM  30 mins
The Clampetts inherit an English Castle (MY SHOWS) (MORE INFO) (RECORD)

Live Video Feed

| MON 1/30 | ALL | MOVIES | NEWS | SPORTS | FAMILY | |
|---|---|---|---|---|---|---|
| | | 9:00 am | 9:30 am | 10:00 am | 10:30 am | |
| 7 | W2DCLP | Cada Dia Con Maria Antonieta | Celebridad | | |
| 8 | NEWS8 | Inside Washington | NC8 9am Report | NC8 9am Report | NC8 9am |
| 9 | WFDC | Despierta America! | Casos de Familia | | |
| 10 | EDAC010 | Educational Access | Educational Access | | |
| 11 | LOOR011 | Local Origination | Local Origination | | |
| 13 | LOOR013 | Local Origination | Local Origination | | |
| 14 | WMDDCA | Que Buena se Puso Lola | | | |
| 15 | WGNSAT | The Beverly Hillbillies | The Beverly Hillbillies | Rockford Files | |
| 16 | MMC | Municiple Programming | | | |

2300

 2302

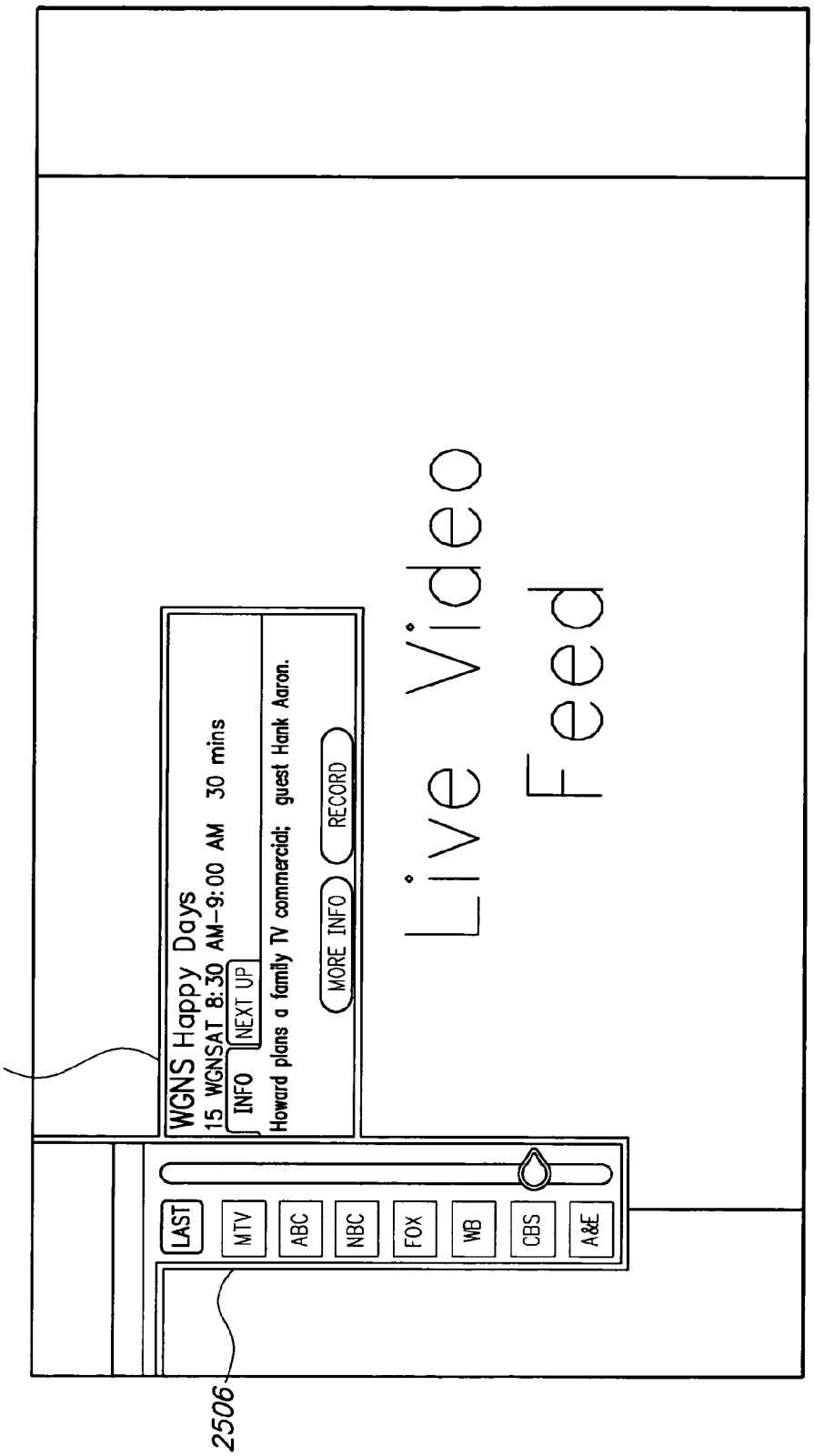

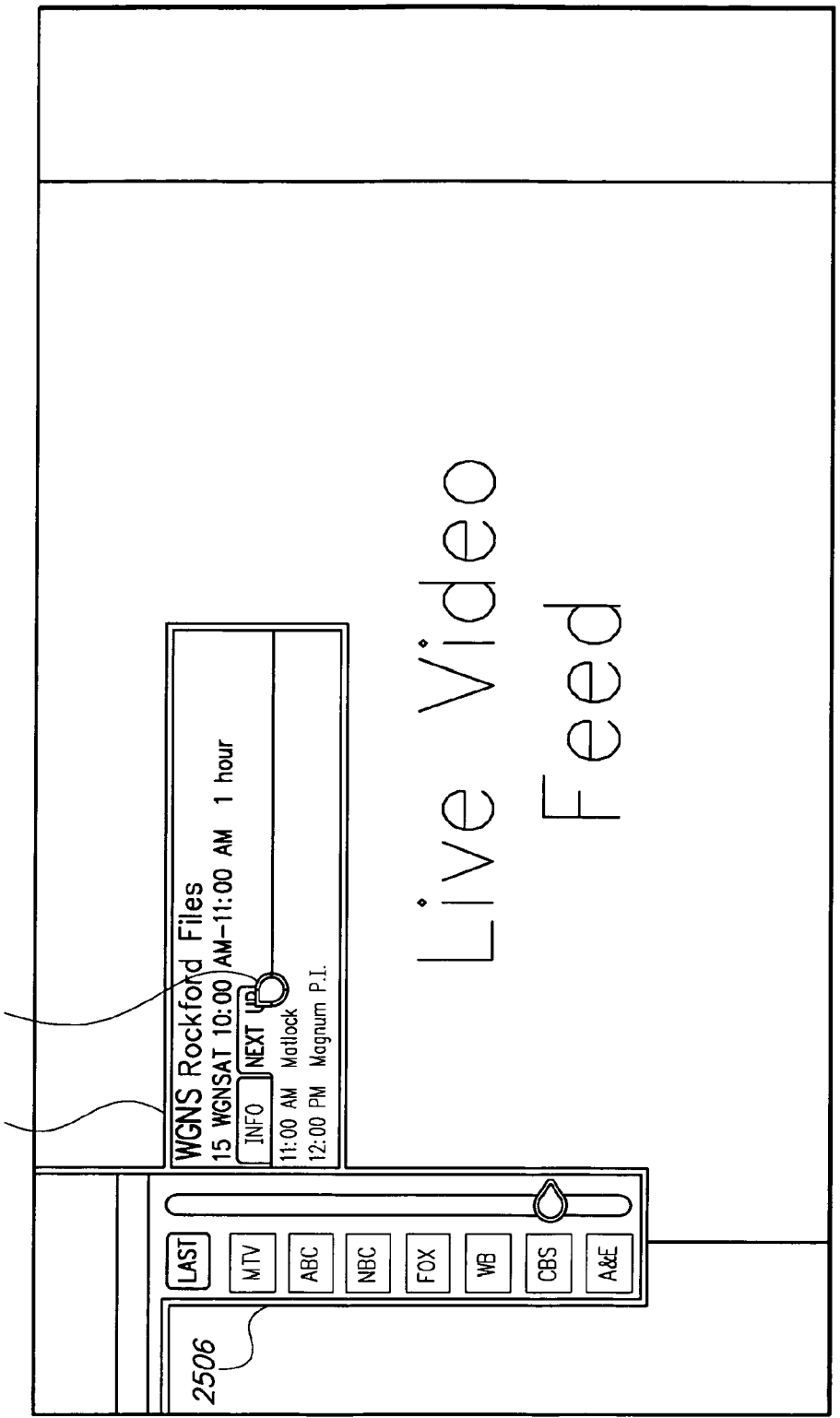

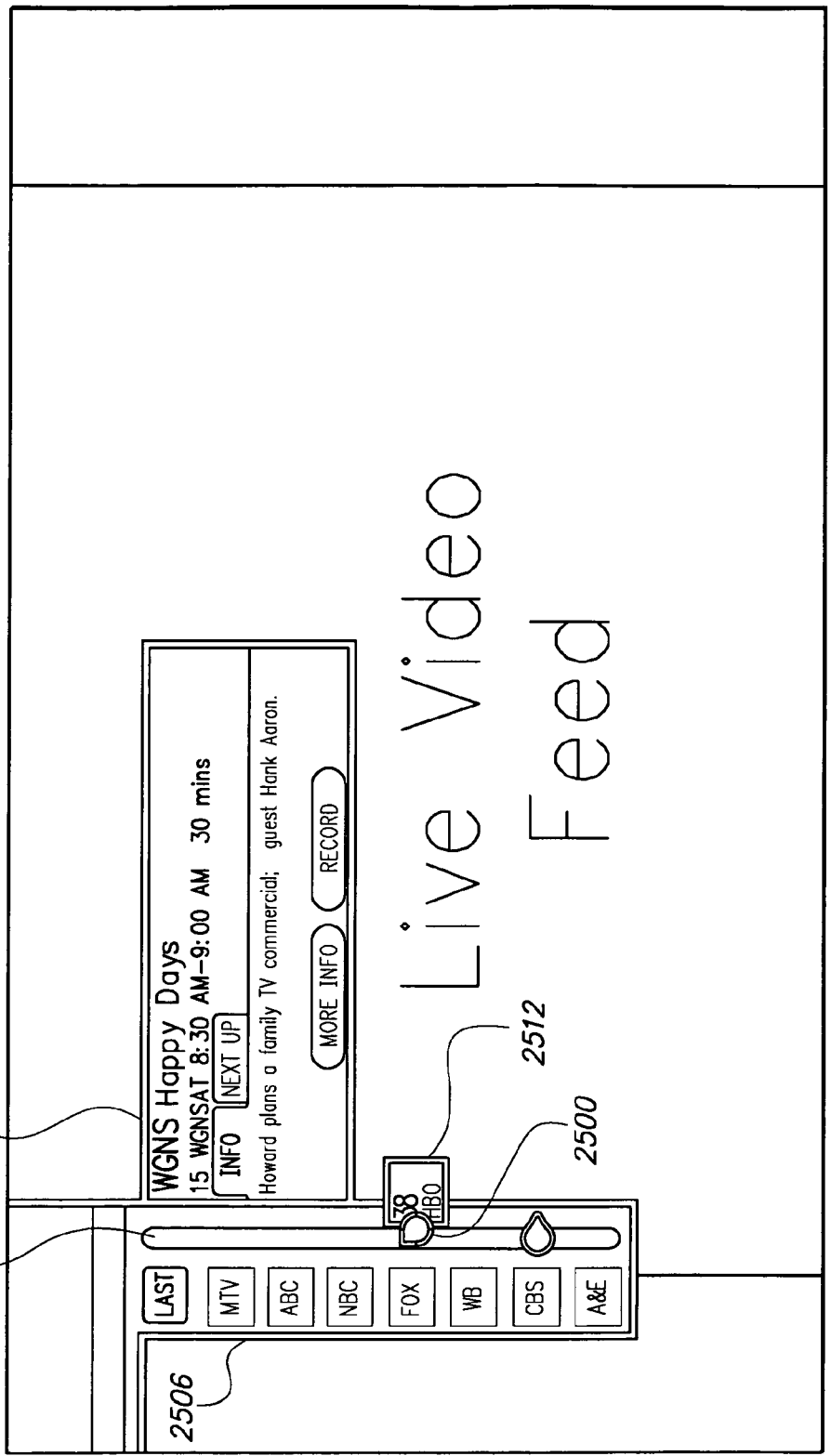

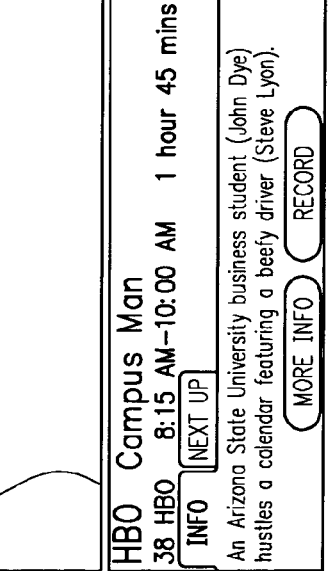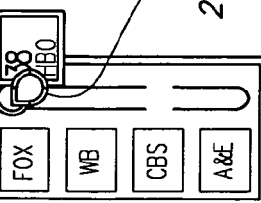

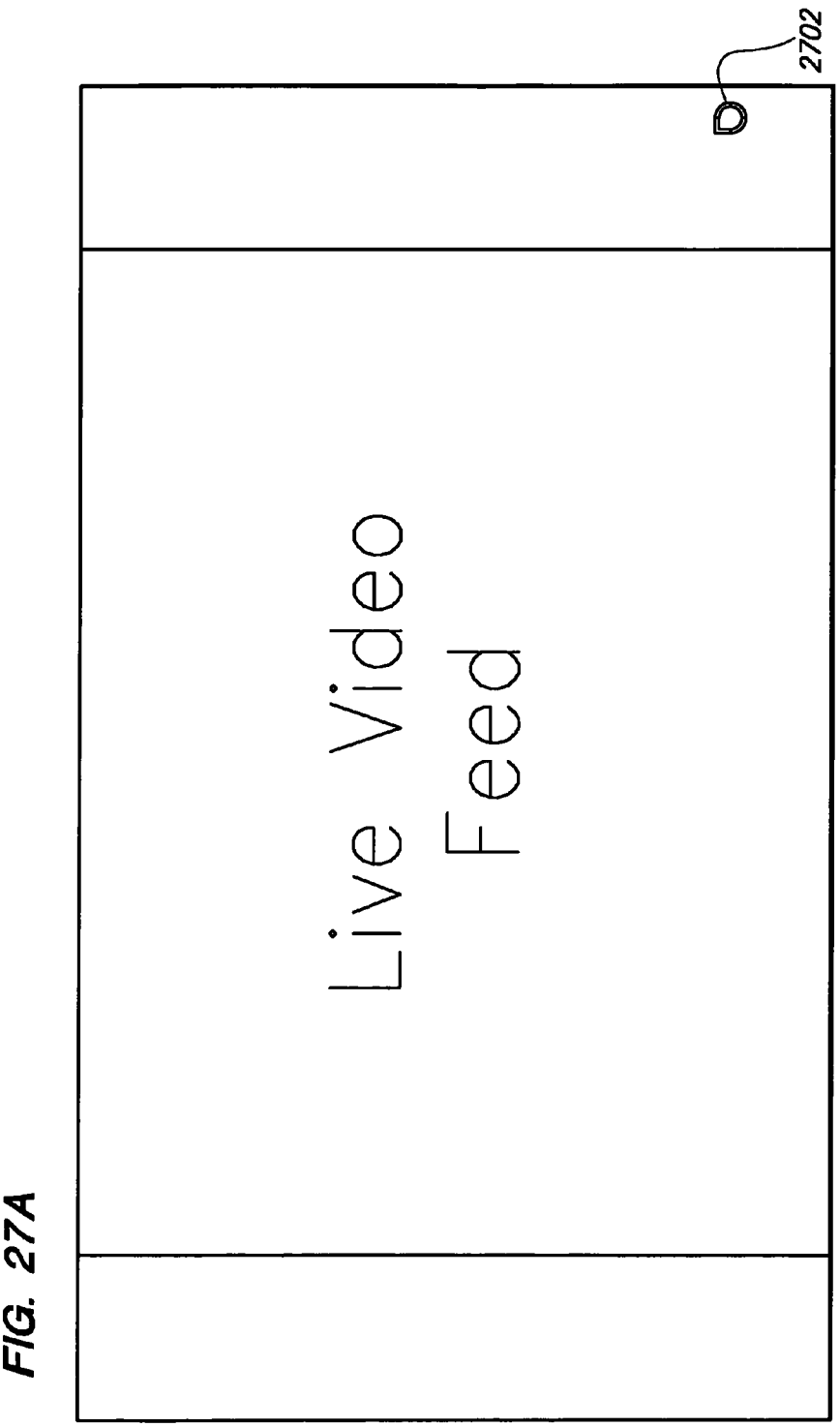

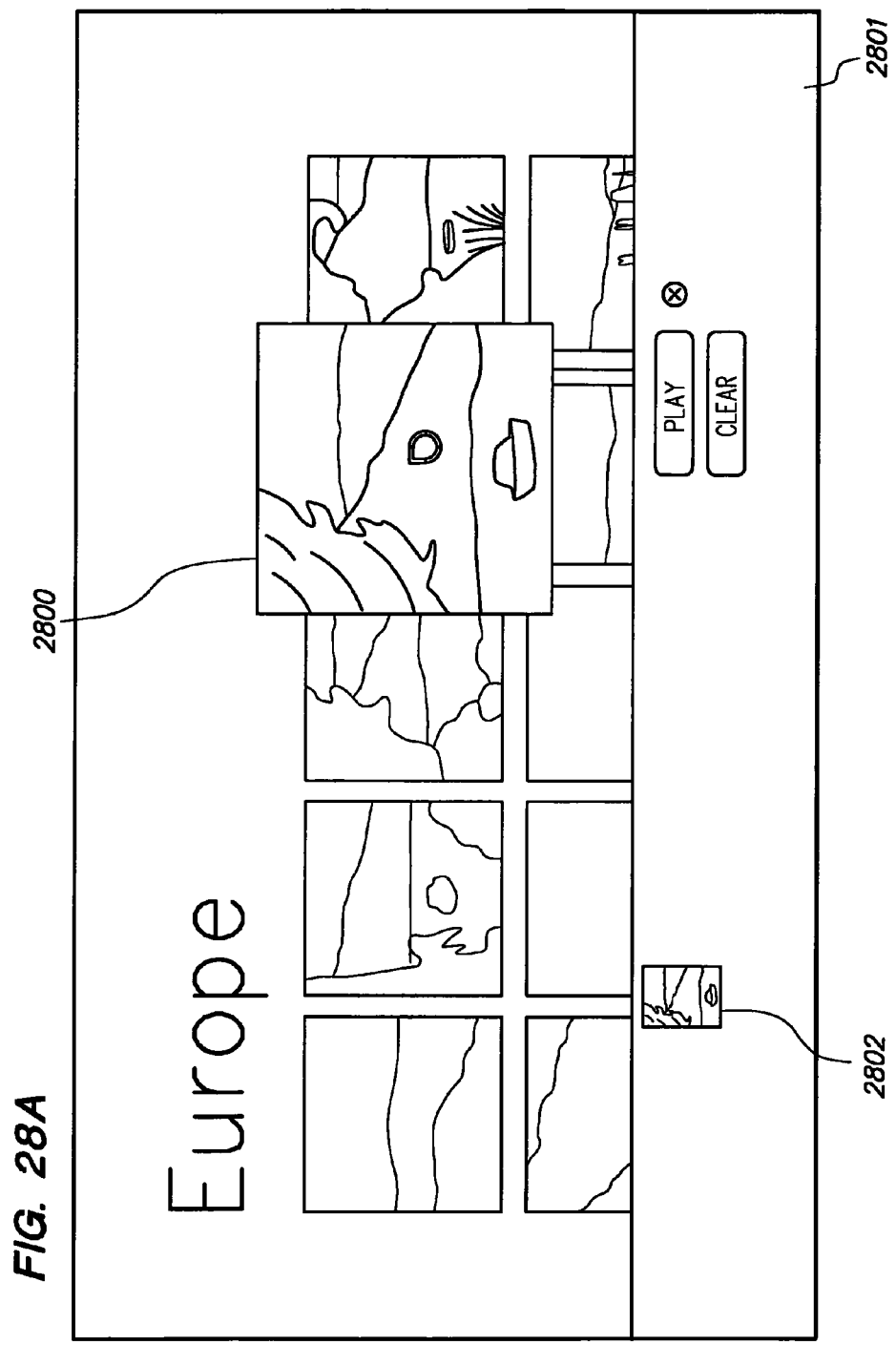

FIG. 30A

|   | S | M | T | W | T | F | S |
|---|---|---|---|---|---|---|---|
|   |   |   |   |   |   | 1 | 2 |
|   | 3 NCTA | 4 NCTA | 5 NCTA | 6 NCTA | 7 | 8 | 9 |
|   | 10 | 11 | 12 Soccer practice | 13 | 14 | 15 | 16 |
|   | 17 | 18 | 19 Soccer practice | 20 | 21 | 22 | 23 Kevin's Soccer |
|   | 24 | 25 | 26 Soccer practice | 27 | 28 | 29 Hannah's recital | 30 Kevin's Soccer |

◁ April 2005 ▷

FIG. 30B

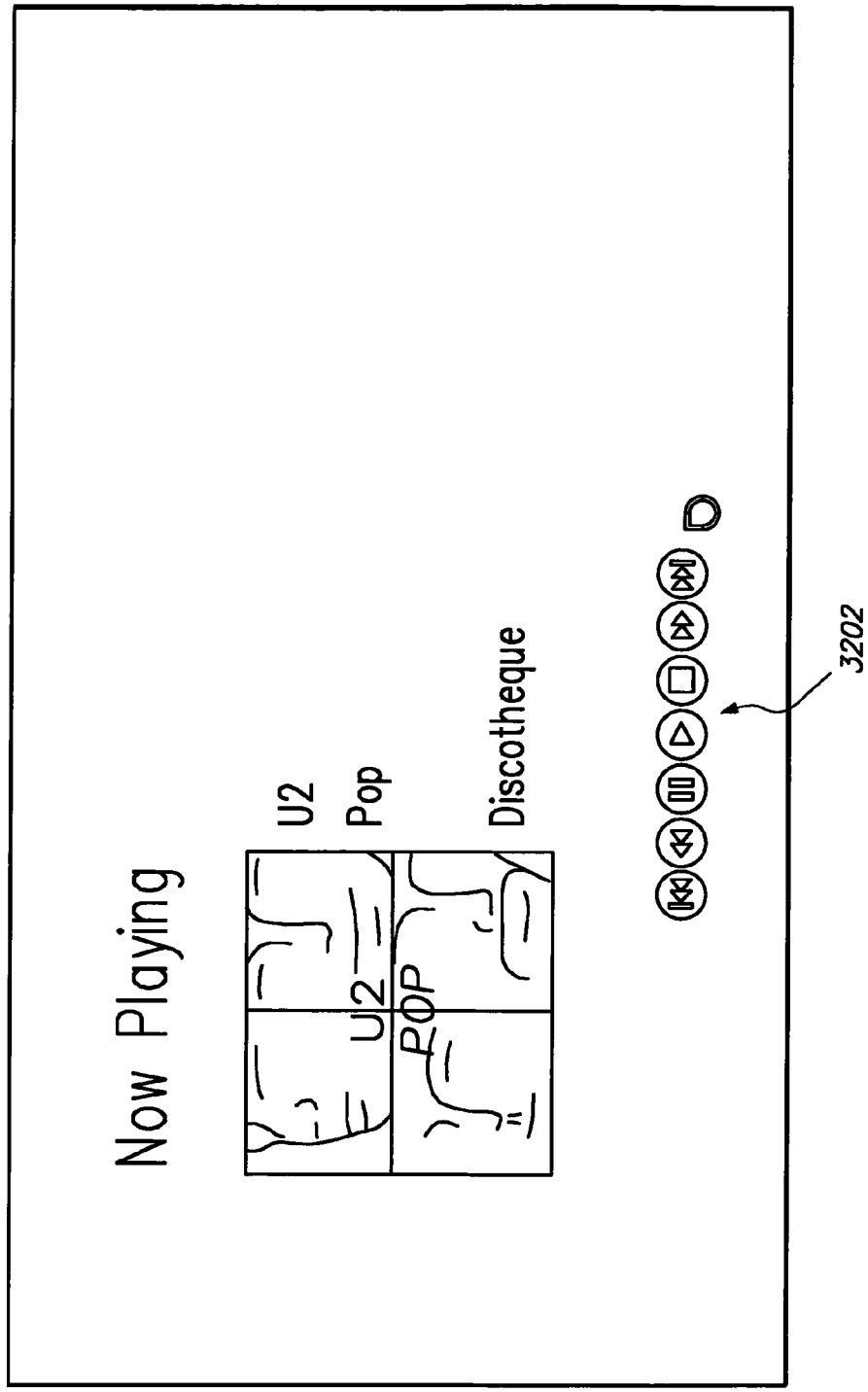

METHODS AND SYSTEMS FOR ENHANCING TELEVISION APPLICATIONS USING 3D POINTING

RELATED APPLICATION

This application is a continuation of U.S. patent application Ser. No. 12/951,669, filed on Nov. 22, 2010, which is a continuation of U.S. patent application Ser. No. 11/354,329, filed on Feb. 14, 2006 and now issued as U.S. Pat. No. 7,839,385, which is related to, and claims priority from, U.S. Provisional Patent Application No. 60/653,229, entitled "Methods and Systems for Enhancing Television Applications Using Free-Space Pointing", filed on Feb. 14, 2005, the disclosure of which is incorporated here by reference.

BACKGROUND

The present invention describes a framework for organizing, selecting and launching media items. Part of that framework involves the design and operation of graphical user interfaces with the basic building blocks of point, click, scroll, hover and zoom and, more particularly, to graphical user interfaces associated with media items which can be used with a 3D pointing remote.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and potentially thousands of channels of shows and information. Video-on-demand technology, currently used primarily in hotels and the like, provides the potential for in-home entertainment selection from among thousands of movie titles. Digital video recording (DVR) equipment such as offered by TiVo, Inc., 2160 Gold Street, Alviso, Calif. 95002, further expand the available choices.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface and control device options and framework for televisions has not changed much over the last 30 years. Printed guides are still the most prevalent mechanism for conveying programming information. The multiple button remote control with simple up and down arrows is still the most prevalent channel/content selection mechanism. The reaction of those who design and implement the TV user interface to the increase in available media content has been a straightforward extension of the existing selection procedures and interface objects. Thus, the number of rows and columns in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. A good example of this trend is the combination television/VCR/DVD in which three previously independent components are frequently sold today as an integrated unit. This trend is likely to continue, potentially with an end result that most if not all of the communication devices currently found in the household being packaged as an integrated unit, e.g., a television/VCR/DVD/internet access/radio/stereo unit. Even those who buy separate components desire seamless control of and interworking between them. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. Electronic program guides (EPGs) have been developed and implemented to replace the afore-described media guides. Early EPGs provided what was essentially an electronic replica of the printed media guides. For example, cable service operators have provided analog EPGs wherein a dedicated channel displays a slowly scrolling grid of the channels and their associated programs over a certain time horizon, e.g., the next two hours. Scrolling through even one hundred channels in this way can be tedious and is not feasibly scalable to include significant additional content deployment, e.g., video-on-demand. More sophisticated digital EPGs have also been developed. In digital EPGs, program schedule information, and optionally applications/system software, is transmitted to dedicated EPG equipment, e.g., a digital set-top box (STB). Digital EPGs provide more flexibility in designing the user interface for media systems due to their ability to provide local interactivity and to interpose one or more interface layers between the user and the selection of the media items to be viewed. An example of such an interface can be found in U.S. Pat. No. 6,421,067 to Kamen et al., the disclosure of which is incorporated here by reference. FIG. 2 depicts a GUI described in the '067 patent. Therein, according to the Kamen et al. patent, a first column 190 lists program channels, a second column 191 depicts programs currently playing, a column 192 depicts programs playing in the next half-hour, and a fourth column 193 depicts programs playing in the half hour after that. The baseball bat icon 121 spans columns 191 and 192, thereby indicating that the baseball game is expected to continue into the time slot corresponding to column 192. However, text block 111 does not extend through into column 192. This indicates that the football game is not expected to extend into the time slot corresponding to column 192. As can be seen, a pictogram 194 indicates that after the football game, ABC will be showing a horse race. The icons shown in FIG. 2 can be actuated using a cursor, not shown, to implement various features, e.g., to download information associated with the selected programming. Other digital EPGs and related interfaces are described, for example, in U.S. Pat. Nos. 6,314,575, 6,412,110, and 6,577,350, the disclosures of which are also incorporated here by reference.

However, the interfaces described above suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be more speedy to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist.

Accordingly, it would be desirable to provide organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user. Moreover, it would be desirable to provide interfaces which supply an easy and fast selection experience regardless of the size(s) of the media item collection(s) being browsed.

SUMMARY

Systems and methods according to the present invention address these needs and others by providing a total control framework for organizing, selecting and launching media items including an user interface framework which then provides for easy and rapid selection of media items. Control of the framework can employ a 3D pointing device that includes a minimal set of buttons and scroll wheel for pointing, clicking and scrolling through selections on an associated graphical user interface. This exemplary graphical user interface (GUI) provides feedback to the user through the use of an on-screen pointer, graphical animations when the pointer hovers over selections, and zooming into and out of selections to smoothly navigate between overview and detail screens. Exemplary embodiments of the present invention employ images, zooming for increased/decreased levels of detail and continuity of GUI objects which permit easy navigation by a user. Graphical user interfaces according to the present invention organize media item selections on a virtual surface. Similar selections can be grouped together. Initially, the interface presents a zoomed out view of the surface, and in most cases, the actual selections will not be visible in full detail at this level. As the user zooms progressively inward, more details are revealed concerning the media item groups or selections. At different zoom levels, different controls are available so that the user can play groups of selections, individual selections, or go to another part of the virtual surface to browse other related media items.

According to one exemplary embodiment of the present invention, a method for using a 3D pointing device with a software application that displays output on a television screen includes the steps of displaying a first set of information on the television screen associated with the software application, wherein the software application includes at least one of: an electronic program guide, television screen controls, a photo album, a home video collection and a shopping interface, moving the 3D pointing device, processing data associated with movement of the 3D pointing device to compensate for unintended movement of the 3D pointing device, moving a cursor displayed on the television screen based on the processed data to a new position on the television screen; and changing the display of the first set of information on the television screen in response to the new position of the cursor.

According to another exemplary embodiment of the present invention, a system includes a 3D pointing device, a television, a processor for running a software application that displays output on the television, wherein the processor initially displays a first set of information on the television associated with at least one of: an electronic program guide, television screen controls, a photo album, a home video collection and a shopping interface, further wherein, in response to movement of the 3D pointing device, the processor compensates data output from the 3D pointing device for unintended movement and then moves a cursor displayed on the television based on the compensated data to a new position on the television; and further wherein said display of the first set of information on the television screen is changed in response to the new position of the cursor.

According to yet another exemplary embodiment of the present invention, a system for using a 3D pointing device with a software application that displays output on a television screen includes means for displaying a first set of information on the television screen associated with the software application, wherein the software application includes at least one of: an electronic program guide, television screen controls, a photo album, a home video collection and a shopping interface, means for moving the 3D pointing device, means for processing data associated with movement of the 3D pointing device to compensate for unintended movement of the 3D pointing device, means for moving a cursor displayed on the television screen based on the processed data to a new position on the television screen, and means for changing the display of the first set of information on the television screen in response to the new position of the cursor.

According to yet another exemplary embodiment of the present invention, a software application for displaying information on a television screen in response to movement of a 3D pointing device includes means for processing movement data to remove unintended movement therefrom, means for repositioning a cursor on the television screen in response to the processed movement data and means for changing a display of information on the television screen solely responsive to the repositioning of the cursor.

BRIEF DESCRIPTION OF THE DRAWINGS

The accompanying drawings illustrate exemplary embodiments of the present invention, wherein:

FIG. 11 depicts a doubly linked, ordered list used to generated GUI displays according to an exemplary embodiment of the present invention;

FIGS. 16-20 depict a zoomable graphical user interface according to another exemplary embodiment of the present invention;

FIGS. 23(a)-23(b) are GUI screens illustrating using 3D pointing to select different channels in an electronic program guide according to an exemplary embodiment of the present invention;

FIGS. 25(a)-25(f) are GUI screens illustrating using 3D pointing to display and/or remove control elements associated with a video feed according to an exemplary embodiment of the present invention;

FIGS. 27(a)-27(b) are GUI screens illustrating using 3D pointing to display and/or remove transport overlay controls on a video stream according to an exemplary embodiment of the present invention;

FIGS. 28(a)-28(b) are GUI screens illustrating using 3D pointing to manipulate photos in a photo collection interface according to an exemplary embodiment of the present invention;

FIGS. 30(a)-30(b) are GUI screens illustrating using 3D pointing to manipulate a calendar in an interface according to an exemplary embodiment of the present invention;

FIGS. 32(a)-32(c) are GUI screens illustrating using 3D pointing to manipulate a music interface according to an exemplary embodiment of the present invention.

DETAILED DESCRIPTION

Figure 1:
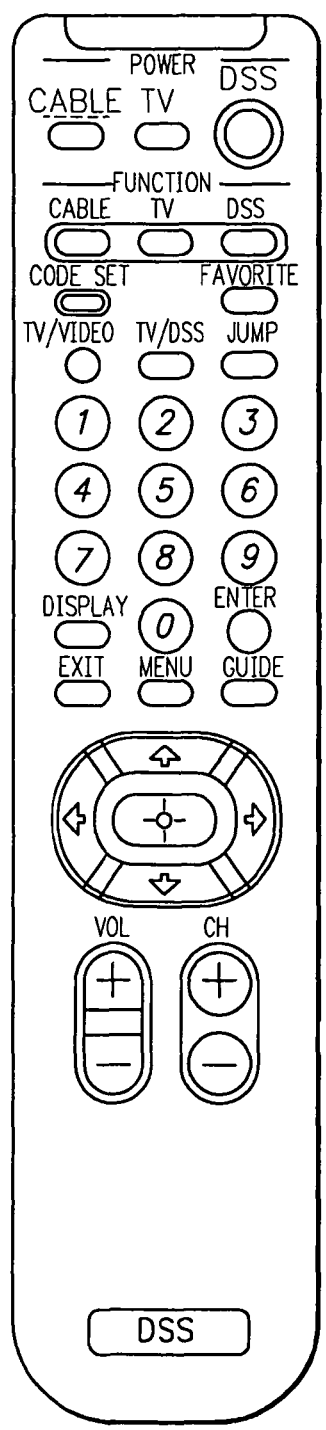
FIG. 1 depicts a conventional remote control unit for an entertainment system.
Figure 2:
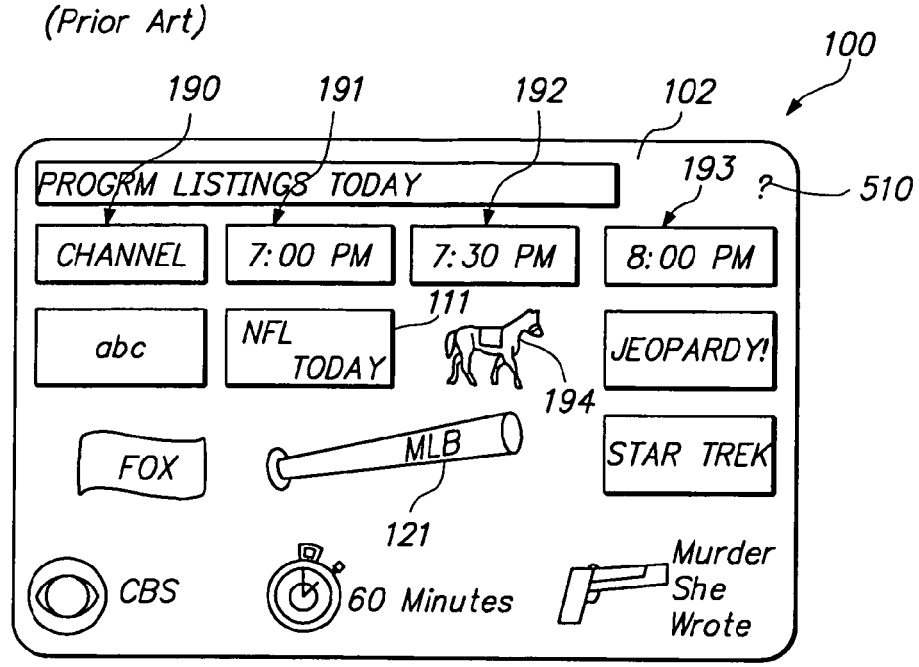
FIG. 2 depicts a conventional graphical user interface for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 3. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a media system remote control unit that supports 3D pointing, has a minimal number of buttons to support navigation, and communicates with the entertainment system 200 through RF signals. For example, wireless I/O control device 226 can be a 3D pointing device which uses a gyroscope or other mechanism to define both a screen position and a motion vector to determine the particular command desired. A set of buttons can also be included on the wireless I/O device 226 to initiate the "click" primitive described below as well as a "back" button. In another exemplary embodiment, wireless I/O control device 226 is a media system remote control unit, which communicates with the components of the entertainment system 200 through IR signals. In yet another embodiment, wireless I/O control device 134 may be an IR remote control device similar in appearance to a typical entertainment system remote control with the added feature of a track-ball or other navigational mechanisms which allows a user to position a cursor on a display of the entertainment system 100.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 3, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 3:
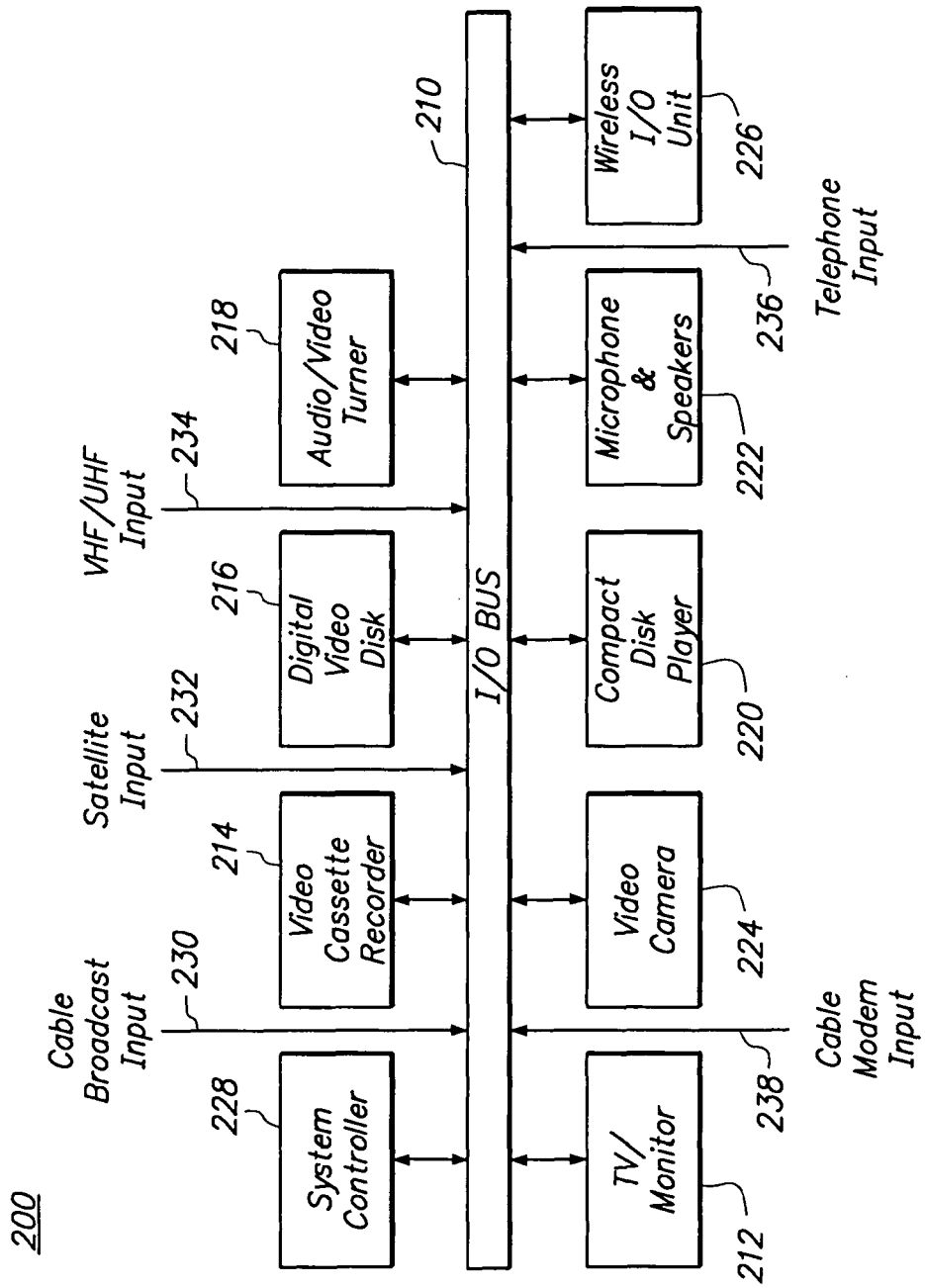
FIG. 3 depicts an exemplary media system in which exemplary embodiments of the present invention (both display and remote control) can be implemented.

As further illustrated in FIG. 3, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 3 are purely exemplary and that media system 200 may include more or fewer of both. For example, other types of inputs to the system include AM/FM radio and satellite radio.

Figure 4:
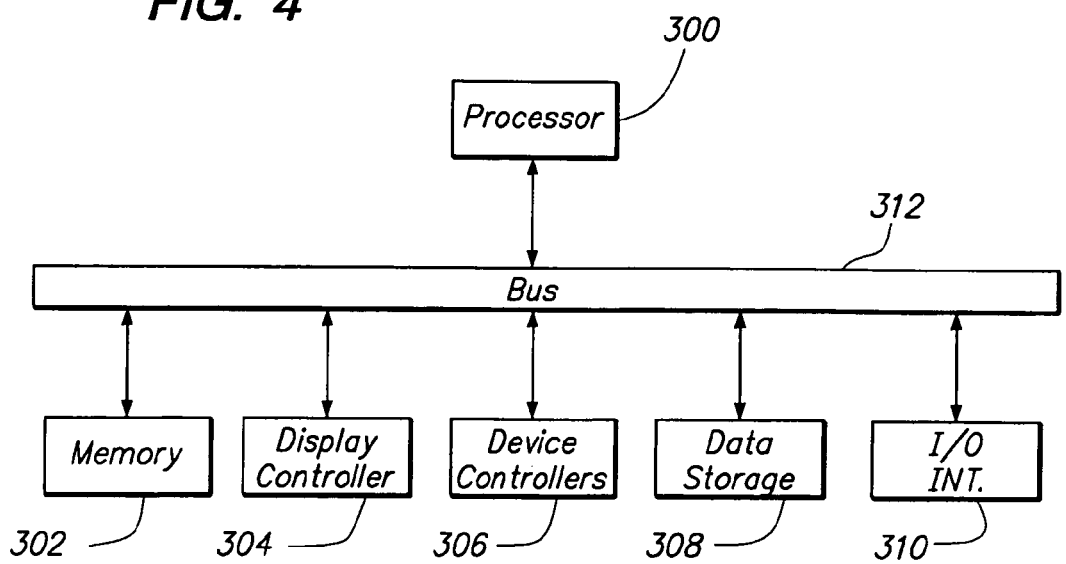
FIG. 4 shows a system controller of FIG. 3 in more detail.

FIG. 4 is a block diagram illustrating an embodiment of an exemplary system controller 228 according to the present invention. System controller 228 can, for example, be implemented as a set-top box and includes, for example, a processor 300, memory 302, a display controller 304, other device controllers (e.g., associated with the other components of system 200), one or more data storage devices 308 and an I/O interface 310. These components communicate with the processor 300 via bus 312. Those skilled in the art will appreciate that processor 300 can be implemented using one or more processing units. Memory device(s) 302 may include, for example, DRAM or SRAM, ROM, some of which may be designated as cache memory, which store software to be run by processor 300 and/or data usable by such programs, including software and/or data associated with the graphical user interfaces described below. Display controller 304 is operable by processor 300 to control the display of monitor 212 to, among other things, display GUI screens and objects as described below. Zoomable GUIs according to exemplary embodiments of the present invention provide resolution independent zooming, so that monitor 212 can provide displays at any resolution. Device controllers 306 provide an interface between the other components of the media system 200 and the processor 300. Data storage 308 may include one or more of a hard disk drive, a floppy disk drive, a CD-ROM device, or other mass storage device. Input/output interface 310 may include one or more of a plurality of interfaces including, for example, a keyboard interface, an RF interface, an IR interface and a microphone/speech interface. According to one exemplary embodiment of the present invention, I/O interface 310 will include an interface for receiving location information associated with movement of a wireless pointing device.

Generation and control of a graphical user interface according to exemplary embodiments of the present invention to display media item selection information is performed by the system controller 228 in response to the processor 300 executing sequences of instructions contained in the memory 302. Such instructions may be read into the memory 302 from other computer-readable mediums such as data storage device(s) 308 or from a computer connected externally to the media system 200. Execution of the sequences of instructions contained in the memory 302 causes the processor to generate graphical user interface objects and controls, among other things, on monitor 212. In alternative embodiments, hardwire circuitry may be used in place of or in combination with software instructions to implement the present invention. As mentioned in the Background section, conventional interface frameworks associated with the television industry are severely limited in their ability to provide users with a simple and yet comprehensive selection experience. Accordingly, control frameworks described herein overcome these limitations and are, therefore, intended for use with televisions, albeit not exclusively. It is also anticipated that the revolutionary control frameworks, graphical user interfaces and/or various algorithms described herein will find applicability to interfaces which may be used with computers and other non-television devices. In order to distinguish these various applications of exemplary embodiments of the present invention, the terms "television" and "TV" are used in this specification to refer to a subset of display devices, whereas the terms "GUI", "GUI screen", "display" and "display screen" are intended to be generic and refer to television displays, computer displays and any other display device. More specifically, the terms "television" and "TV" are intended to refer to the subset of display devices which are able to display television signals (e.g., NTSC signals, PAL signals or SECAM signals) without using an adapter to translate television signals into another format (e.g., computer video formats). In addition, the terms "television" and "TV" refer to a subset of display devices that are generally viewed from a distance of several feet or more (e.g., sofa to a family room TV) whereas computer displays are generally viewed close-up (e.g., chair to a desktop monitor).

Having described an exemplary media system which can be used to implement control frameworks including zoomable graphical interfaces according to the present invention, several examples of such interfaces will now be described. According to exemplary embodiments of the present invention, a user interface displays selectable items which can be grouped by category. A user points a remote unit at the category or categories of interest and depresses the selection button to zoom in or the "back" button to zoom back. Each zoom in, or zoom back, action by a user results in a change in the magnification level and/or context of the selectable items rendered by the user interface on the screen. According to exemplary embodiments, each change in magnification level can be consistent, i.e., the changes in magnification level are provided in predetermined steps. Exemplary embodiments of the present invention also provide for user interfaces which incorporate several visual techniques to achieve scaling to the very large. These techniques involve a combination of building blocks and techniques that achieve both scalability and ease-of-use, in particular techniques which adapt the user interface to enhance a user's visual memory for rapid re-visiting of user interface objects.

The user interface is largely a visual experience. In such an environment exemplary embodiments of the present invention make use of the capability of the user to remember the location of objects within the visual environment. This is achieved by providing a stable, dependable location for user interface selection items. Each object has a location in the zoomable layout. Once the user has found an object of interest it is natural to remember which direction was taken to locate the object. If that object is of particular interest it is likely that the user will re-visit the item more than once, which will reinforce the user's memory of the path to the object. User interfaces according to exemplary embodiments of the present invention provide visual mnemonics that help the user remember the location of items of interest. Such visual mnemonics include pan and zoom animations, transition effects which generate a geographic sense of movement across the user interface's virtual surface and consistent zooming functionality, among other things which will become more apparent based on the examples described below.

Organizing mechanisms are provided to enable the user to select from extremely large sets of items while being shielded from the details associated with large selection sets. Various types of organizing mechanisms can be used in accordance with the present invention and examples are provided below.

Figure 5:
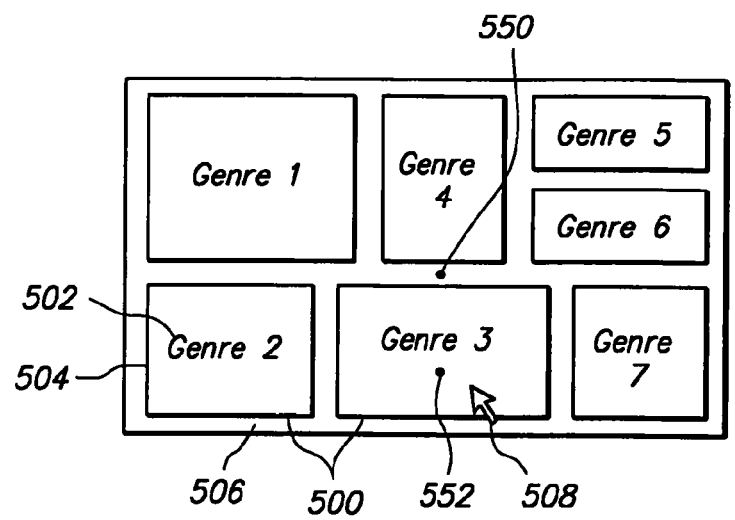
FIGS. 5-8 depict a graphical user interface for a media system according to an exemplary embodiment of the present invention.

Referring first to FIGS. 5-8, an exemplary control framework including a zoomable graphical user interface according to an exemplary embodiment of the present invention is described for use in displaying and selecting musical media items. Various alternative and/or additional GUI screens associated with interfaces according to the present invention can also be found in the later Figures. FIG. 5 portrays the zoomable GUI at its most zoomed out state. Therein, the interface displays a set of shapes 500. Displayed within each shape 500 are text 502 and/or a picture 504 that describe the group of media item selections accessible via that portion of the GUI. As shown in FIG. 5, the shapes 500 are rectangles, and text 502 and/or picture 504 describe the genre of the media. However, those skilled in the art will appreciate that this first viewed GUI grouping could represent other aspects of the media selections available to the user e.g., artist, year produced, area of residence for the artist, length of the item, or any other characteristic of the selection. Also, the shapes used to outline the various groupings in the GUI need not be rectangles. Shrunk down versions of album covers and other icons could be used to provide further navigational hints to the user in lieu of or in addition to text 502 and/or picture 504 within the shape groupings 500. A background portion of the GUI 506 can be displayed as a solid color or be a part of a picture such as a map to aid the user in remembering the spatial location of genres so as to make future uses of the interface require less reading. The selection pointer (cursor) 508 follows the movements of an input device and indicates the location to zoom in on when the user presses the button on the device (not shown in FIG. 5).

According to one exemplary embodiment of the present invention, the input device can be a wireless mouse, e.g., the wireless mouse manufactured by Gyration, Inc., 12930 Saratoga Avenue, Bldg. C, Saratoga, Calif. 95070, coupled with a graphical user interface that supports the point, click, scroll, hover and zoom building blocks which are described in more detail below. One feature of this exemplary input device that is beneficial for use in conjunction with the present invention is that it has only two buttons and a scroll wheel, i.e., three input actuation objects. One of the buttons can be configured as a ZOOM IN (select) button and one can be configured as a ZOOM OUT (back) button. Compared with the conventional remote control units, e.g., that shown in FIG. 1, the present invention simplifies this aspect of the GUI by greatly reducing the number of buttons, etc., that a user is confronted with in making his or her media item selection. An additional preferred, but not required, feature of input devices according to exemplary embodiments of the present invention is that they provide "3D pointing" capability for the user. The phrase "3D pointing" is used in this specification to refer to the ability of a user to freely move the input device in three (or more) dimensions in the air in front of the display screen and the corresponding ability of the user interface to translate those motions directly into movement of a cursor on the screen. Thus "3D pointing" differs from conventional computer mouse pointing techniques which use a surface other than the display screen, e.g., a desk surface or mousepad, as a proxy surface from which relative movement of the mouse is translated into cursor movement on the computer display screen. Use of 3D pointing in control frameworks according to exemplary embodiments of the present invention further simplifies the user's selection experience, while at the same time providing an opportunity to introduce gestures as distinguishable inputs to the interface. A gesture can be considered as a recognizable pattern of movement over time which pattern can be translated into a GUI command, e.g., a function of movement in the x, y, z, yaw, pitch and roll dimensions or any subcombination thereof. Those skilled in the art will appreciate, however that any suitable input device can be used in conjunction with zoomable GUIs according to the present invention. Other examples of suitable input devices include, but are not limited to, trackballs, touchpads, conventional TV remote control devices, speech input, any devices which can communicate/translate a user's gestures into GUI commands, or any combination thereof. It is intended that each aspect of the GUI functionality described herein can be actuated in frameworks according to the present invention using at least one of a gesture and a speech command. Alternate implementations include using cursor and/or other remote control keys or even speech input to identify items for selection.

Figure 6:
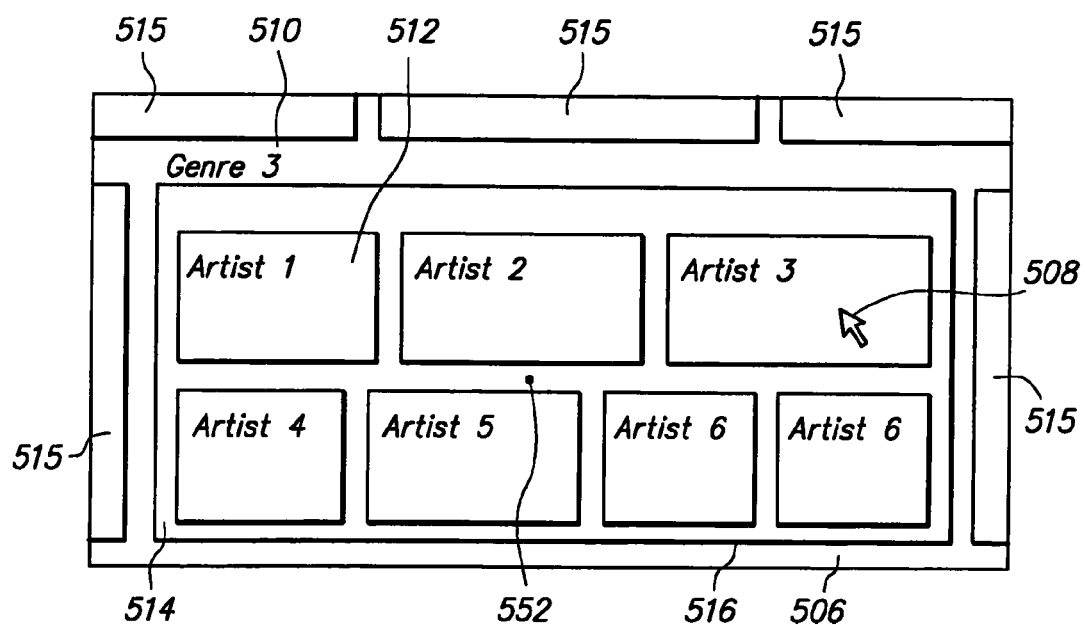

FIG. 6 shows a zoomed in view of Genre 3 that would be displayed if the user selects Genre 3 from FIG. 5, e.g., by moving the cursor 508 over the area encompassed by the rectangle surrounding Genre 3 on display 212 and depressing a button on the input device. The interface can animate the zoom from FIG. 5 to FIG. 6 so that it is clear to the user that a zoom occurred. An example of such an animated zoom/transition effect is described below. Once the shape 516 that contains Genre 3 occupies most of the screen on display 212, the interface reveals the artists that have albums in the genre. In this example, seven different artists and/or their works are displayed. The unselected genres 515 that were adjacent to Genre 3 in the zoomed out view of FIG. 5 are still adjacent to Genre 3 in the zoomed in view, but are clipped by the edge of the display 212. These unselected genres can be quickly navigated to by selection of them with selection pointer 508. It will be appreciated, however, that other exemplary embodiments of the present invention can omit clipping neighboring objects and, instead, present only the unclipped selections. Each of the artist groups, e.g., group 512, can contain images of shrunk album covers, a picture of the artist or customizable artwork by the user in the case that the category contains playlists created by the user.

Figure 7:
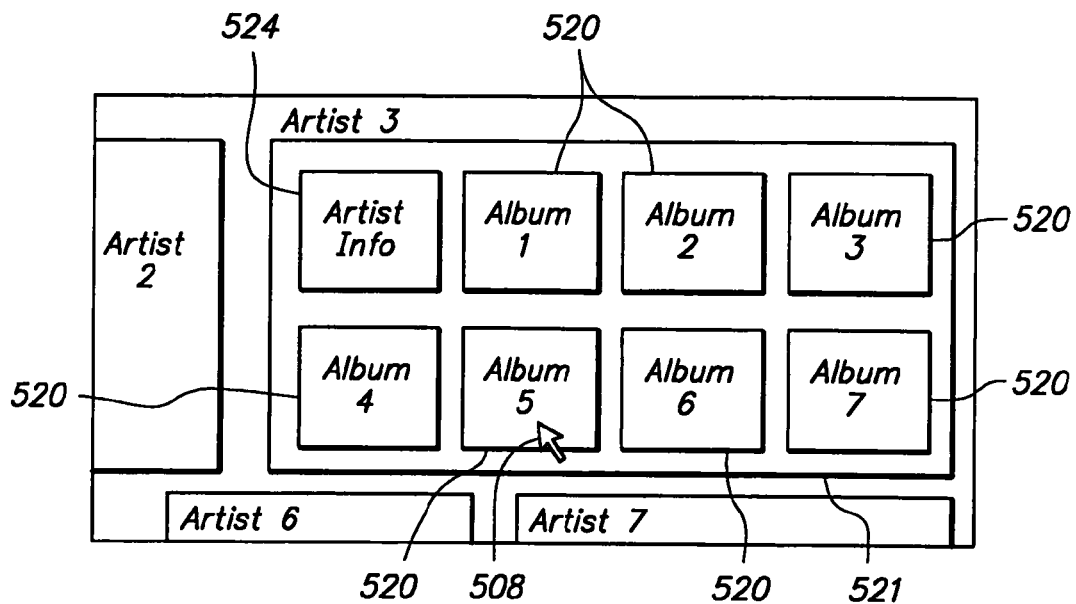

A user may then select one of the artist groups for further review and/or selection. FIG. 7 shows a further zoomed in view in response to a user selection of Artist 3 via positioning of cursor 508 and actuation of the input device, in which images of album covers 520 come into view. As with the transition from the GUI screen of FIG. 5 and FIG. 6, the unselected, adjacent artists (artists #2, 6 and 7 in this example) are shown towards the side of the zoomed in display, and the user can click on these with selection pointer 508 to pan to these artist views. In this portion of the interface, in addition to the images 520 of album covers, artist information 524 can be displayed as an item in the artist group. This information may contain, for example, the artist's picture, biography, trivia, discography, influences, links to web sites and other pertinent data. Each of the album images 520 can contain a picture of the album cover and, optionally, textual data. In the case that the album image 520 includes a user created playlist, the graphical user interface can display a picture which is selected automatically by the interface or preselected by the user.

Figure 8:
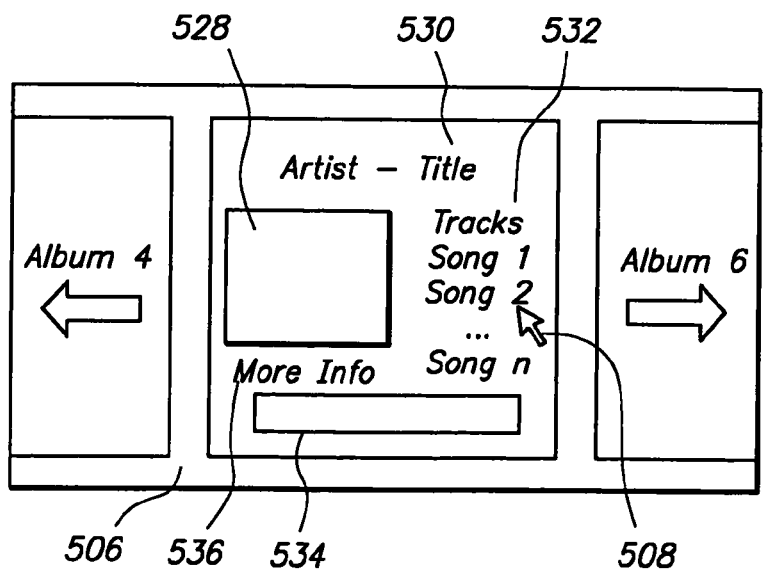

Finally, when the user selects an album cover image 520 from within the group 521, the interface zooms into the album cover as shown in FIG. 8. As the zoom progresses, the album cover can fade or morph into a view that contains items such as the artist and title of the album 530, a list of tracks 532, further information about the album 536, a smaller version of the album cover 528, and controls 534 to play back the content, modify the categorization, link to the artists web page, or find any other information about the selection. Neighboring albums 538 are shown that can be selected using selection pointer 508 to cause the interface to bring them into view. As mentioned above, alternative embodiments of the present invention can, for example, zoom in to only display the selected object, e.g., album 5, and omit the clipped portions of the unselected objects, e.g., albums 4 and 6. This final zoom provides an example of semantic zooming, wherein certain GUI elements are revealed that were not previously visible at the previous zoom level. Various techniques for performing semantic zooming according to exemplary embodiments of the present invention are provided below.

As illustrated in the FIGS. 5-8 and the description, this exemplary embodiment of a graphical user interface provides for navigation of a music collection. Interfaces according to the present invention can also be used for video collections such as for DVDs, VHS tapes, other recorded media, video-on-demand, video segments and home movies. Other audio uses include navigation of radio shows, instructional tapes, historical archives, and sound clip collections. Print or text media such as news stories and electronic books can also be organized and accessed using this invention.

As will be apparent to those skilled in the art from the foregoing description, zoomable graphical user interfaces according to the present invention provide users with the capability to browse a large (or small) number of media items rapidly and easily. This capability is attributable to many characteristics of interfaces according to exemplary embodiments of the present invention including, but not limited to: (1) the use of images as all or part of the selection information for a particular media item, (2) the use of zooming to rapidly provide as much or as little information as a user needs to make a selection and (3) the use of several GUI techniques which combine to give the user the sense that the entire interface resides on a single plane, such that navigation of the GUI can be accomplished, and remembered, by way of the user's sense of direction. This latter aspect of GUIs according to the present invention can be accomplished by, among other things, linking the various GUI screens together "geographically" by maintaining as much GUI object continuity from one GUI screen to the next, e.g., by displaying edges of neighboring, unselected objects around the border of the current GUI screen. Alternatively, if a cleaner view is desired, and other GUI techniques provide sufficient geographic feedback, then the clipped objects can be omitted. As used in this text, the phrase "GUI screen" refers to a set of GUI objects rendered on one or more display units at the same time. A GUI screen may be rendered on the same display which outputs media items, or it may be rendered on a different display. The display can be a TV display, computer monitor or any other suitable GUI output device.

Another GUI effect which enhances the user's sense of GUI screen connectivity is the panning animation effect which is invoked when a zoom is performed or when the user selects an adjacent object at the same zoom level as the currently selected object. Returning to the example of FIG. 5, as the user is initially viewing this GUI screen, his or her point-of-view is centered about point 550. However, when he or she selects Genre 3 for zooming in, his or her point-of-view will shift to point 552. According to exemplary embodiments of the present invention, the zoom in process is animated to convey the shifting the POV center from point 550 to 552. This panning animation can be provided for every GUI change, e.g., from a change in zoom level or a change from one object to another object on the same GUI zoom level. Thus if, for example, a user situated in the GUI screen of FIG. 6 selected the leftmost unselected genre 515 (Genre 2), a panning animation would occur which would give the user the visual impression of "moving" left or west. Exemplary embodiments of the present invention employ such techniques to provide a consistent sense of directional movement between GUI screens enables users to more rapidly navigate the GUI, both between zoom levels and between media items at the same zoom level.

Various data structures and algorithms can be used to implement zoomable GUIs according to the present invention. For example, data structures and algorithms for panning and zooming in an image browser which displays photographs have been described, for example, in the article entitled "Quantum Treemaps and Bubblemaps for a Zoomable Image Browser" by Benjamin B. Bederson, *UIST 2001, ACM Symposium on User Interface Software and Technology, CHI Letters*, 3(2), pp. 71-80, the disclosure of which is incorporated here by reference. However, in order to provide a GUI for media selection which can, at a high level, switch between numerous applications and, at a lower level, provide user controls associated with selected images to perform various media selection functions, additional data structures and algorithms are needed.

Zoomable GUIs can be conceptualized as supporting panning and zooming around a scene of user interface components in the view port of a display device. To accomplish this effect, zoomable GUIs according to exemplary embodiments of the present invention can be implemented using scene graph data structures. Each node in the scene graph represents some part of a user interface component, such as a button or a text label or a group of interface components. Children of a node represent graphical elements (lines, text, images, etc.) internal to that node. For example, an application can be represented in a scene graph as a node with children for the various graphical elements in its interface. Two special types of nodes are referred to herein as cameras and layers. Cameras are nodes that provide a view port into another part of the scene graph by looking at layer nodes. Under these layer nodes user interface elements can be found. Control logic for a zoomable interface programmatically adjusts a cameras view transform to provide the effect of panning and zooming.

Figure 9:
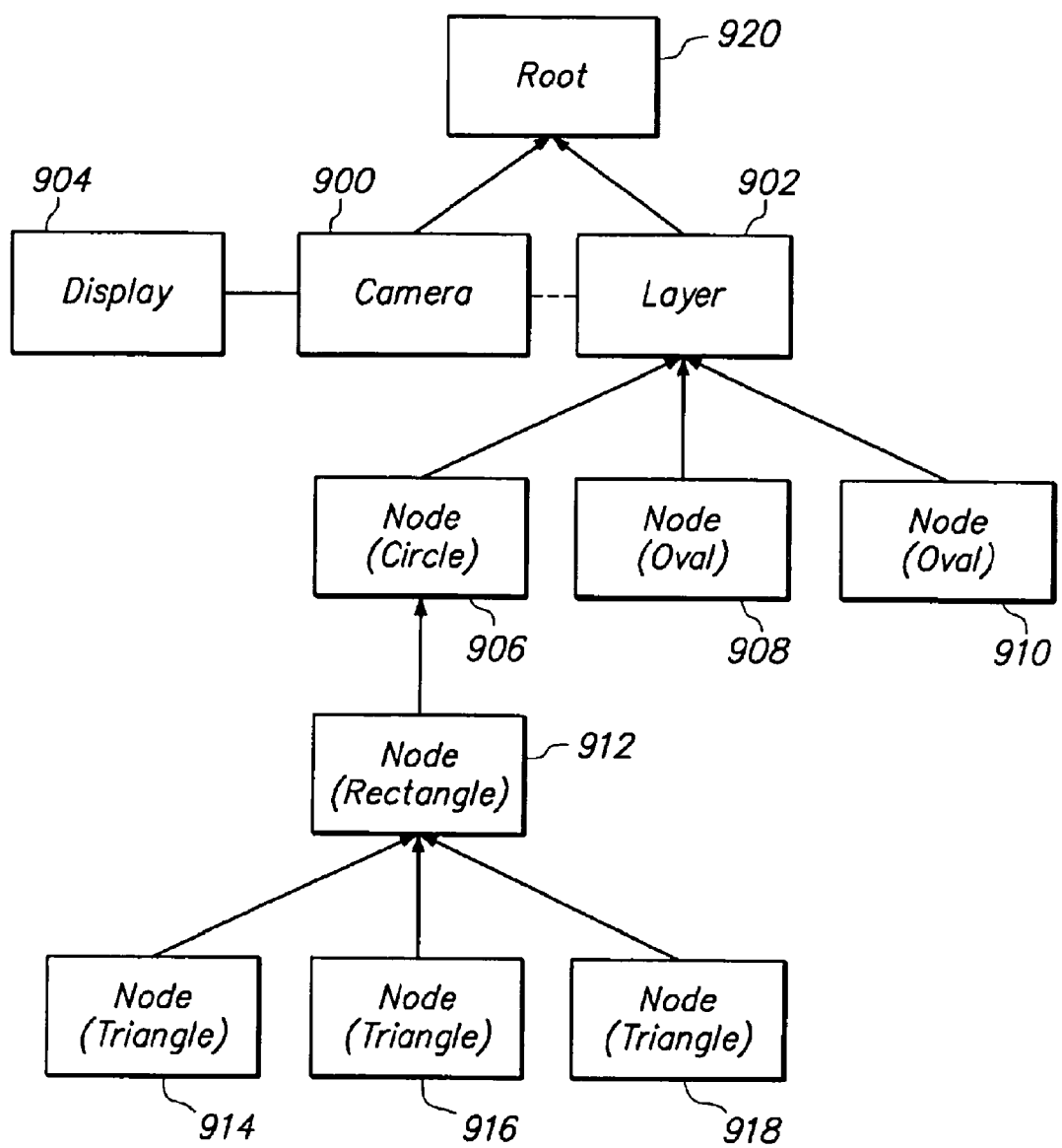
FIG. 9 illustrates an exemplary data structure according to an exemplary embodiment of the present invention.
Figure 10A:
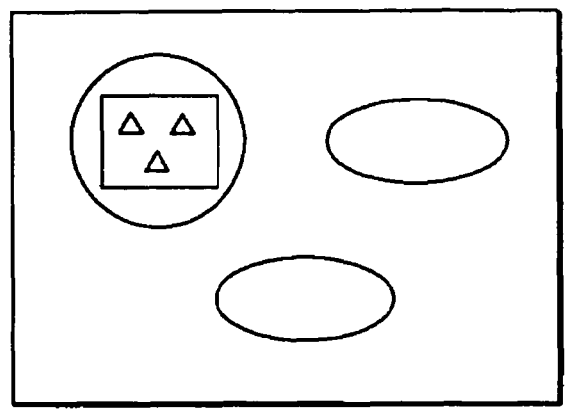
FIGS. 10(a) and 10(b) illustrate a zoomed out and a zoomed in version of a portion of an exemplary GUI created using the data structure of FIG. 9 according to an exemplary embodiment of the present invention.
Figure 10B:
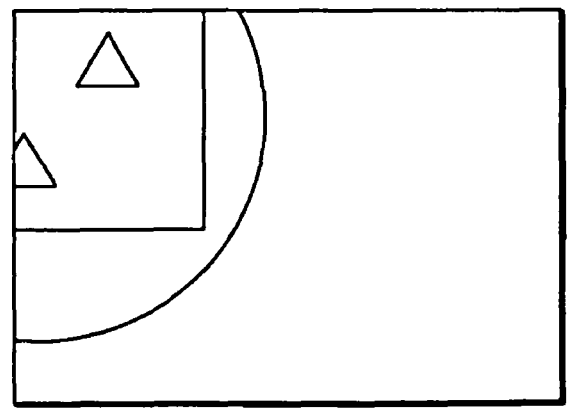

FIG. 9 shows a scene graph that contains basic zoomable interface elements which can be used to implement exemplary embodiments of the present invention, specifically it contains one camera node 900 and one layer node 902. The dotted line between the camera node 900 and layer node 902 indicates that the camera node 900 has been configured to render the children of the layer node 902 in the camera's view port. The attached display device 904 lets the user see the camera's view port. The layer node 902 has three children nodes 904 that draw a circle and a pair of ovals. The scene graph further specifies that a rectangle is drawn within the circle and three triangles within the rectangle by way of nodes 912-918. The scene graph is tied into other scene graphs in the data structure by root node 920. Each node 906-918 has the capability of scaling and positioning itself relative to its parent by using a local coordinate transformation matrix. FIGS. 10(*a*) and 10(*b*) illustrate what the scene graph appears like when rendered through the camera at a first, zoomed out level of magnification and a second, zoomed in level of magnification, respectively.

Rendering the scene graph can be accomplished as follows. Whenever the display 904 needs to be updated, e.g., when the user triggers a zoom-in from the view of FIG. 10(*a*) to the view of FIG. 10(*b*), a repaint event calls the camera node 900 attached to the display 904 to render itself. This, in turn, causes the camera node 900 to notify the layer node 902 to render the area within the camera's view port. The layer node 902 renders itself by notifying its children to render themselves, and so on. The current transformation matrix and a bounding rectangle for the region to update is passed at each step and optionally modified to inform each node of the proper scale and offset that they should use for rendering. Since the scene graphs of applications operating within zoomable GUIs according to the present invention may contain thousands of nodes, each node can check the transformation matrix and the area to be updated to ensure that their drawing operations will indeed be seen by the user. Although the foregoing example, describes a scene graph including one camera node and one layer node, it will be appreciated that exemplary embodiments of the present invention can embed multiple cameras and layers. These embedded cameras can provide user interface elements such as small zoomed out maps that indicate the user's current view location in the whole zoomable interface, and also allow user interface components to be independently zoomable and pannable.

When using a zoomable interface to coordinate the operation of multiple applications, e.g., like the exemplary movie browser described below with respect to FIGS. 14-18, the memory and resource requirements for each application may exceed the total memory available in the media system. This suggests that applications unload some or all of their code and data when the user is no longer viewing them. However, in zoomable GUIs according to the present invention it can be desirable to provide the appearance that some or all of the applications appear active to the user at all times. To satisfy these two competing objectives, the applications which are "off-screen" from the user's point of view can be put into a temporarily suspended state. To achieve this behavior in zoomable GUIs according to exemplary embodiments of the present invention, events are sent to applications to indicate when they enter and exit a view port. One way to implement such events is to add logic to the code that renders a component so that it detects when the user enters a view port. However, this implies that the notification logic gets invoked at every rendering event and, more importantly, that it cannot easily detect when the user has navigated the view port away from the component. Another method for sending events to applications is to incorporate the notification logic into the GUI navigation elements (such as hyperlinks and buttons), so that they send notifications to the component when they change the view port of a camera to include the component of interest. However, this requires the programmer to vigilantly add notification code to all possible navigation UI elements.

According to one exemplary embodiment, a computationally efficient node watcher algorithm can be used to notify applications regarding when GUI components and/or applications enter and exit the view of a camera. At a high level, the node watcher algorithm has three main processing stages: (1) initialization, (2) view port change assessment and (3) scene graph change assessment. The initialization stage computes node quantities used by the view port change assessment stage and initializes appropriate data structures. The view port change assessment stage gets invoked when the view port changes and notifies all watched nodes that entered or exited the view port. Finally, the scene graph change assessment stage updates computations made at the initialization stage that have become invalid due to changes in the scene graph. For example, if an ancestor node of the watched node changes location in the scene graph, computations made at initialization may need to be recomputed.

Of these stages, view port change assessment drives the rest of the node watcher algorithm. To delineate when a node enters and exits a view port, the initialization step determines the bounding rectangle of the desired node and transforms it from its local coordinate system to the local coordinate system of the view port. In this way, checking node entrance does not require a sequence of coordinate transformations at each view port change. Since the parents of the node may have transform matrices, this initialization step requires traversing the scene graph from the node up to the camera. As described below, if embedded cameras are used in the scene graph data structure, then multiple bounding rectangles may be needed to accommodate the node appearing in multiple places.

Once the bounding rectangle for each watched node has been computed in the view port coordinate system, the initialization stage adds the bounding rectangle to the view port change assessment data structures. The node watcher algorithm uses a basic building block for each dimension in the scene. In zoomable interfaces according to some exemplary embodiments, this includes an x dimension, a y dimension, and a scale dimension. As described below, however, other exemplary implementations may have additional or different dimensions. The scale dimension describes the magnification level of the node in the view port and is described by the following equation:

$$s = \frac{d'}{d}$$

Where s is the scale, d is the distance from one point of the node to another in the node's local coordinates and d' is the distance from that point to the other in the view port.

FIG. 11 shows an exemplary building block for detecting scene entrance and exit in one dimension. The following describes handling in the x dimension, but those skilled in the art will appreciate that the other dimensions can be handled in a similar manner. The Region Block 1100 contains references to the transformed bounding rectangle coordinates. This includes the left and right (top and bottom or minimum and maximum scale) offsets of the rectangle. The left and right offsets are stored in Transition Blocks 1102 and 1104, respectively, that are themselves placed in an ordered doubly linked list, such that lower numbered offsets are towards the beginning. The current view port bounds are stored in the View Bounds block 1106. Block 1106 has pointers to the Transition Blocks just beyond the left and right side of the view, e.g., the Transition Block immediately to the right of the one pointed to by View Left Side is in the view unless that latter block is pointed to by View Right Side.

When the view port changes, the following processing occurs for each dimension. First, the View Left Side and View Right Side pointers are checked to see if they need to be moved to include or exclude a Transition Block. Next, if one or both of the pointers need to be moved, they are slid over the Transition Block list to their new locations. Then, for each Transition Block passed by the View Left Side and View Right Side pointers, the node watcher algorithm executes the Transition Block notification code described below. This notification code determines if it is possible that its respective node may have entered or exited the view port. If so, that node is added to a post processing list. Finally, at the end of this processing for each dimension, each node on the post processing list is checked that its view port status actually did change (as opposed to changing and then changing back). If a change did occur, then the algorithm sends an event to the component. Note that if the view port jumps quickly to a new area of the zoomable interface that the algorithm may detect more spurious entrance and exit events.

The Transition Block notification code can be implemented as a table lookup that determines whether the node moved into or out of the view port for the dimension being checked. An exemplary table is shown below.

TABLE 1

Transition Notification Table

| Node side | View side | View Move Direction | Partial Intersection Notification | Full Intersection Notification |
|---|---|---|---|---|
| Left | Left | Left | None | Enter |
| Left | Left | Right | None | Exit |
| Right | Left | Left | Enter | None |
| Right | Left | Right | Exit | None |
| Left | Right | Left | Exit | None |
| Left | Right | Right | Enter | None |
| Right | Right | Left | None | Exit |
| Right | Right | Right | None | Enter |

Columns 1, 2 and 3 are the inputs to the Transition Notification Table. Specifically, the node watcher algorithm addresses the table using a combination of the node side, view side and view move direction to determine whether the node being evaluated was entered, exited or not impacted. Column 1 refers to the side of the node represented by the Transition Block that was passed by the view port pointers. Column 2 refers to the side of the view port and column 3 refers to the direction that that side of the view port was moving when it passed the node's Transition Block. Either output column 4 or 5 is selected depending upon whether the node should be notified when it is partially or fully in view. For example, in some implementations it may be desirable to notify an application such as a streaming video window only after it is fully in view since loading a partially-in-view video window into the zoomable GUI may be visually disruptive.

When the output of the table indicates enter or exit, the node watcher algorithm adds the node to the post processing list. The output columns of Table 1 are populated based on the following rules. If the node intersects in all dimensions then an enter notification will be sent in the post processing step. If the node was in the view and now one or more dimensions have stopped intersecting, then an exit notification will be sent. To reduce the number of nodes in the post processing list, the Transition Block notification code checks for intersection with other dimensions before adding the node to the list. This eliminates the post processing step when only one or two dimensions out of the total number of dimensions, e.g., three or more, intersect. When a user interface object (e.g., an application) wants to be notified of its view port status in the GUI, it registers a function with the node watcher algorithm. When the application goes into or out of the view, the node watcher algorithm calls that application's registered function with a parameter that indicates what happened. Alternatively, notification can be performed using message passing. In this case, each application has an event queue. The application tells the node watcher algorithm how to communicate with its event queue. For example, it could specify the queue's address. Then, when the node watcher detects a transition, it creates a data structure that contains the cause of the notification and places it in the application's queue.

In addition to using node watcher notifications for application memory management, this algorithm can also be used for other functions in zoomable GUIs according to the present invention. For example, the node watcher algorithm can be used to change application behavior based on the user's view focus, e.g., by switching the audio output focus to the currently viewed application. Another application for the node watcher algorithm is to load and unload higher resolution and composite images when the magnification level changes. This reduces the computational load on the graphics renderer by having it render fewer objects whose resolution more closely matches the display. In addition to having the node watcher algorithm watch a camera's view port, it is also useful to have it watch the navigation code that tells the view port where it will end up after an animation. This provides earlier notification of components that are going to come into view and also enables zoomable GUIS according to exemplary embodiments of the present invention to avoid sending notifications to nodes that are flown over due to panning animations.

Figure 12A:
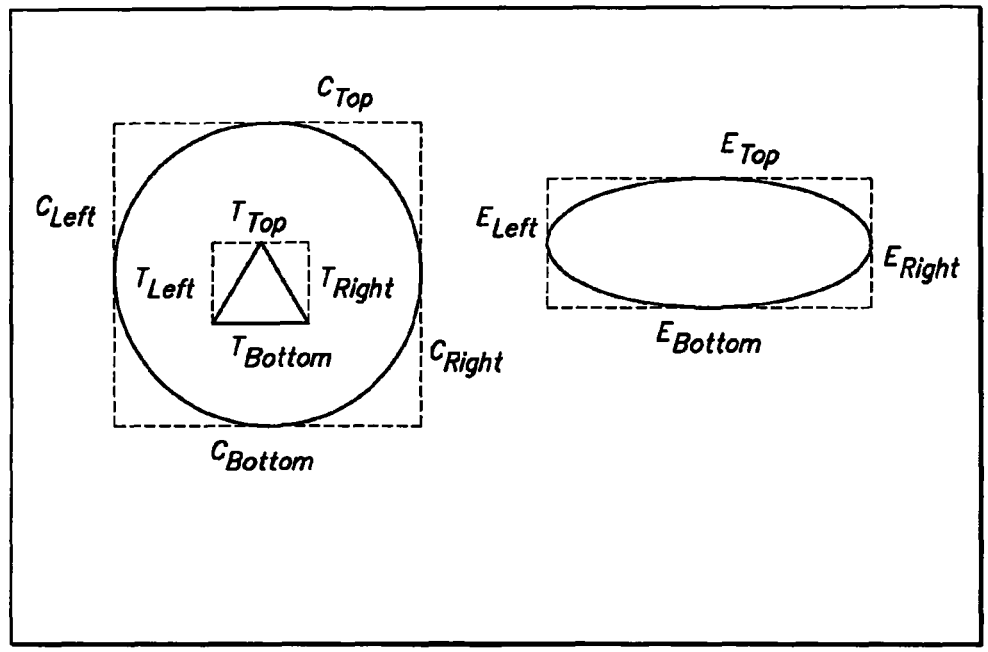
FIGS. 12(a) and 12(b) show a zoomed out and a zoomed in version of a portion of another exemplary GUI used to illustrate operation of a node watching algorithm according to an exemplary embodiment of the present invention.
Figure 12B:
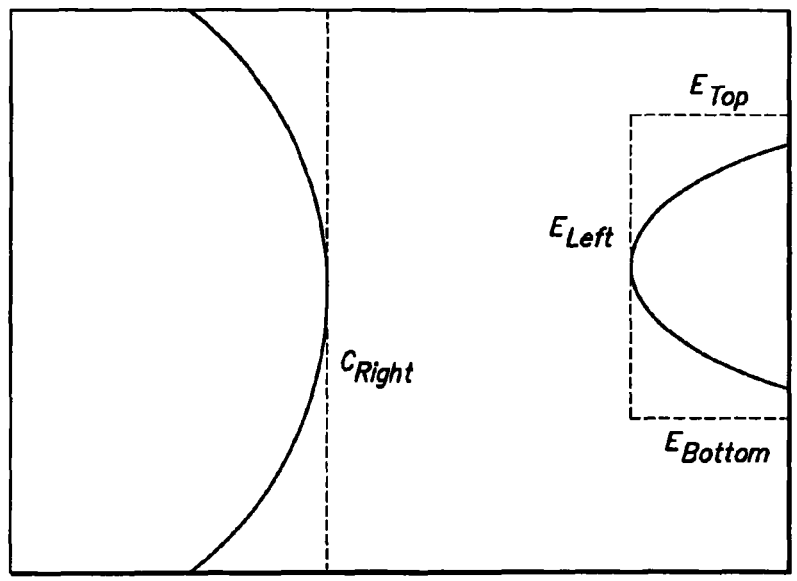

To better understand operation of the node watcher algorithm, an example will now be described with reference to FIGS. 12(a), 12(b), 13(a) and 13(b). FIGS. 12(a) and 12(b) depict a portion of a zoomable GUI at two different magnification levels. At the lower magnification level of FIG. 12(a), three nodes are visible: a circle, a triangle and an ellipse. In FIG. 12(b), the view has been zoomed in so much that the ellipse and circle are only partially visible, and the triangle is entirely outside of the view. These nodes may, for example, represent applications or user interface components that depend on efficient event notification and, therefore, are tracked by the node watcher algorithm according to exemplary embodiments of the present invention. In this example, the bounding rectangles for each node are explicitly illustrated in FIGS. 12(a) and 12(b) although those skilled in the art will appreciate that the bounding rectangles would not typically be displayed on the GUI. Each side of each of the bounding rectangles has been labeled in FIGS. 12(a) and 12(b), and these labels will be used to show the correspondence between the bounding rectangle sides and the transition block data structure which were described above.

Figure 13A:
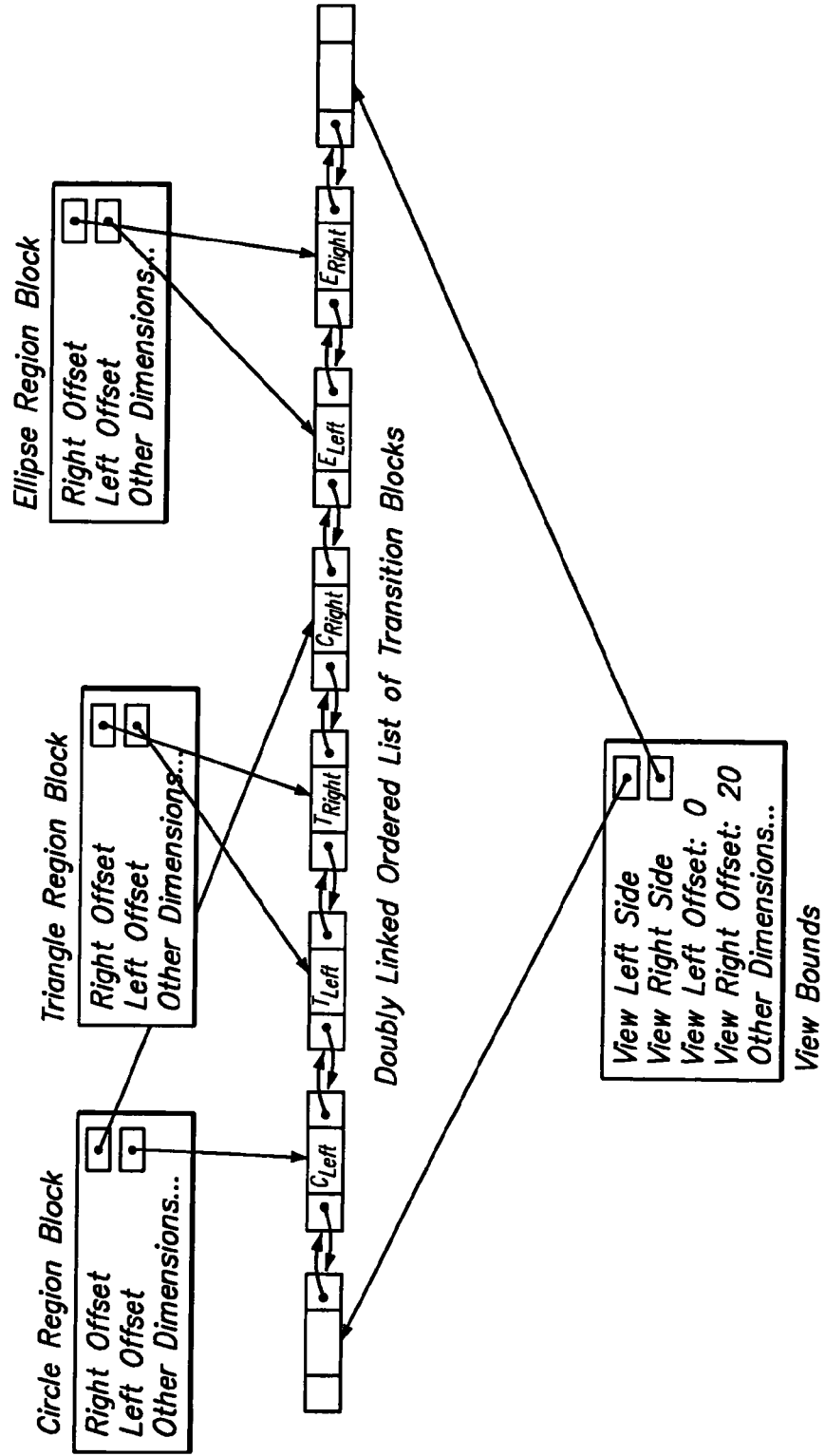
FIGS. 13(a) and 13(b) depict exemplary data structures used to illustrate operation of the node watching algorithm as it the GUI transitions from the view of FIG. 12(a) to the view of FIG. 12(b) according to an exemplary embodiment of the present invention.

FIG. 13(a) shows exemplary node watcher data structures for the horizontal dimension for the zoomed out view of FIG. 12(a). Therein, each side of a node's bounding rectangle is represented using a transition block. The horizontal transition blocks are shown in FIG. 13(a) in the order that they appear on the GUI screen from left to right. For example, the left side of the circle, $C_{Left}$, comes first and then the left side of the triangle, $T_{Left}$, and so on until the right side of the ellipse, $E_{Right}$. Both ends of the list are marked with empty sentinel transition blocks. Also shown in FIG. 13(a) are the region blocks for each node and their corresponding pointers to their bounding rectangle's horizontal transition blocks. At the bottom of FIG. 13(a) is the view bounds data structure that contains pointers to the transition blocks that are just outside of the current view. For the zoomed out view, all nodes are completely visible, and therefore all of their transition blocks are between the transition blocks pointed to by the view bounds data structure.

Figure 13B:
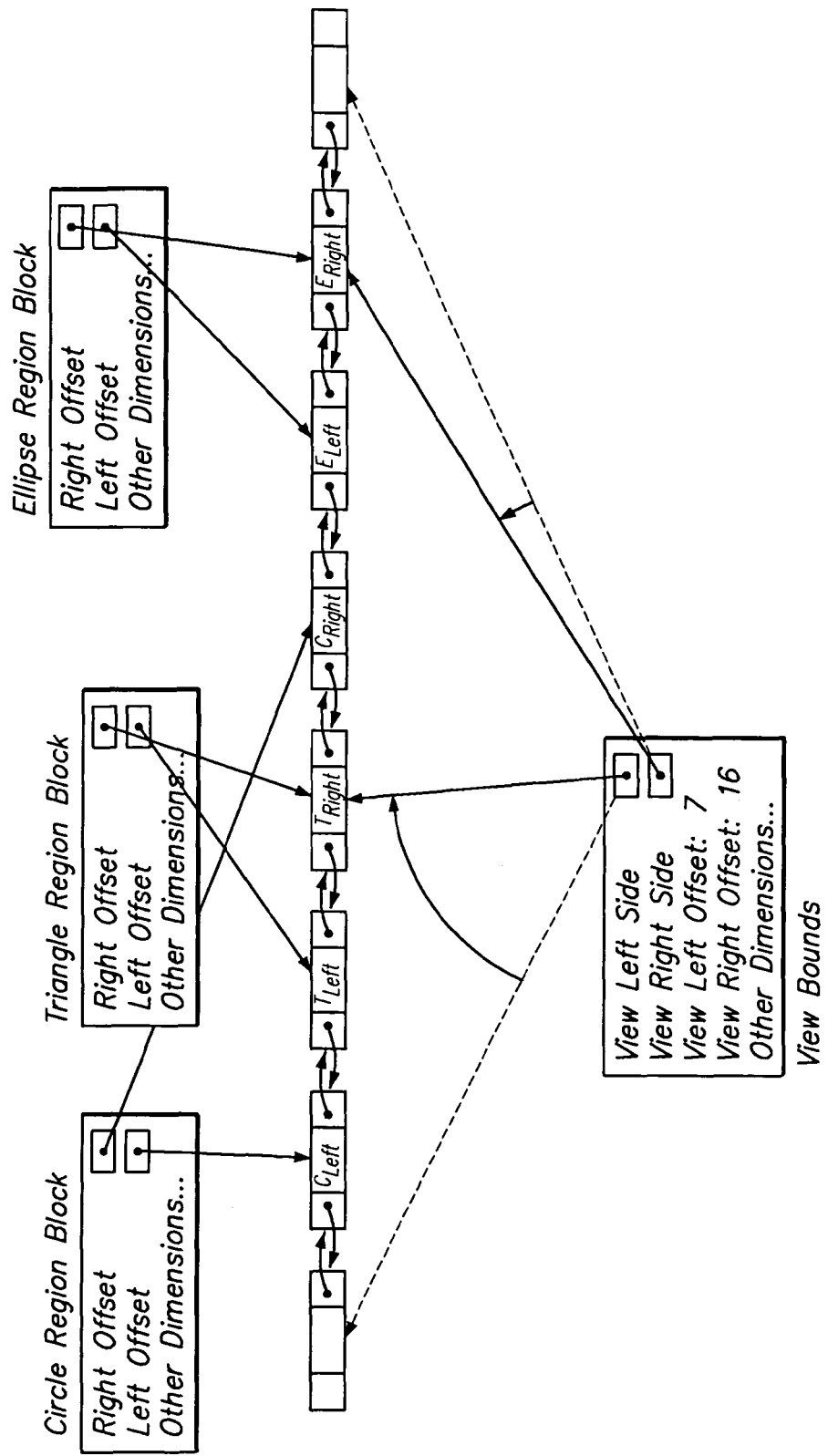

FIG. 13(b) shows the node watcher data structures for the zoomed in view of FIG. 12(b). Therein, it can be seen that the view bounds part of the data structure has changed so that it now points to the transition blocks for the right side of the triangle, $T_{Right}$, and the right side of the ellipse, $E_{Right}$, since these two bounding rectangle sides are just outside of the current (zoomed in) view.

Given these exemplary data structures and GUI scenes, the associated processing within the node watcher algorithm while the zoom transition occurs can be described as follows. Starting with the left side of the view, the node watcher algorithm moves the view left side pointer to the right until the transition block that is just outside of the view on the left side is reached. As shown in FIG. 13(b), the view left side pointer first passes the $C_{Left}$ transition block. For this example, assume that the circle node represents an application or other user interface object associated with the zoomable GUI that requires a notification when it is not fully visible in the view. Given these inputs to the node watcher algorithm, Table 1 indicates that the circle node should receive an exit notification for the horizontal dimension. Of course, the node watcher algorithm will typically aggregate notifications from all dimensions before notifying the node to avoid sending redundant exit notifications. Next, the view left side pointer passes the left side of the triangle, $T_{Left}$. If the triangle node has requested notifications for when it completely leaves the view, then the node watcher algorithm indicates per Table 1 that no notification is necessary. However, when the view pointer passes $T_{Right}$, Table 1 indicates that the triangle has exited the view entirely and should be notified. The view pointer stops here since the right side of the circle's bounding rectangle, $C_{Right}$, is still visible in the view.

From the right side, the node watcher algorithm's processing is similar. The view right side pointer moves left to the ellipse's right side $E_{Right}$. Depending on whether the ellipse has requested full or partial notifications, the node watcher algorithm will or will not send a notification to the ellipse pursuant to Table 1. The vertical dimension can be processed in a similar manner using similar data structures and the top and bottom boundary rectangle values. Those skilled in the arts will also appreciate that a plurality of boundary rectangles can be used to approximate non-rectangular nodes when more precise notification is required. Additionally, the present invention contemplates that movement through other dimensions can be tracked and processed by the node watcher algorithm, e.g., a third geometrical (depth or scale) dimension, as well as non-geometrical dimensions such as time, content rating (adult, PG-13, etc.) and content type (drama, comedy, etc.). Depending on the number of dimensions in use, the algorithm, more accurately, detects intersections of boundary segments, rectangles, and n-dimensional hypercubes.

In addition to the node watcher algorithm described above, exemplary embodiments of the present invention provide resolution consistent semantic zooming algorithms which can be used in zoomable GUIs according to exemplary embodiments of the present invention. Semantic zooming refers to adding, removing or changing details of a component in a zoomable GUI depending on the magnification level of that component. For example, in the movie browser interface described below, when the user zooms close enough to the image of the movie, it changes to show movie metadata and playback controls. The calculation of the magnification level is based on the number of pixels that the component uses on the display device. The zoomable GUI can store a threshold magnification level which indicates when the switch should occur, e.g., from a view without the movie metadata and playback controls to a view with the movie metadata and playback controls.

Television and computer displays have widely varying display resolutions. Some monitors have such a high resolution that graphics and text that is readable on a low resolution display is so small to become completely unreadable. This also creates a problem for applications that use semantic zooming, especially on high resolution displays such as HDTVs. In this environment, semantic zooming code that renders based on the number of pixels displayed will change the image before the more detailed view is readable. Programmatically modifying the threshold at which semantic zooming changes component views can only work for one resolution.

Figure 14:
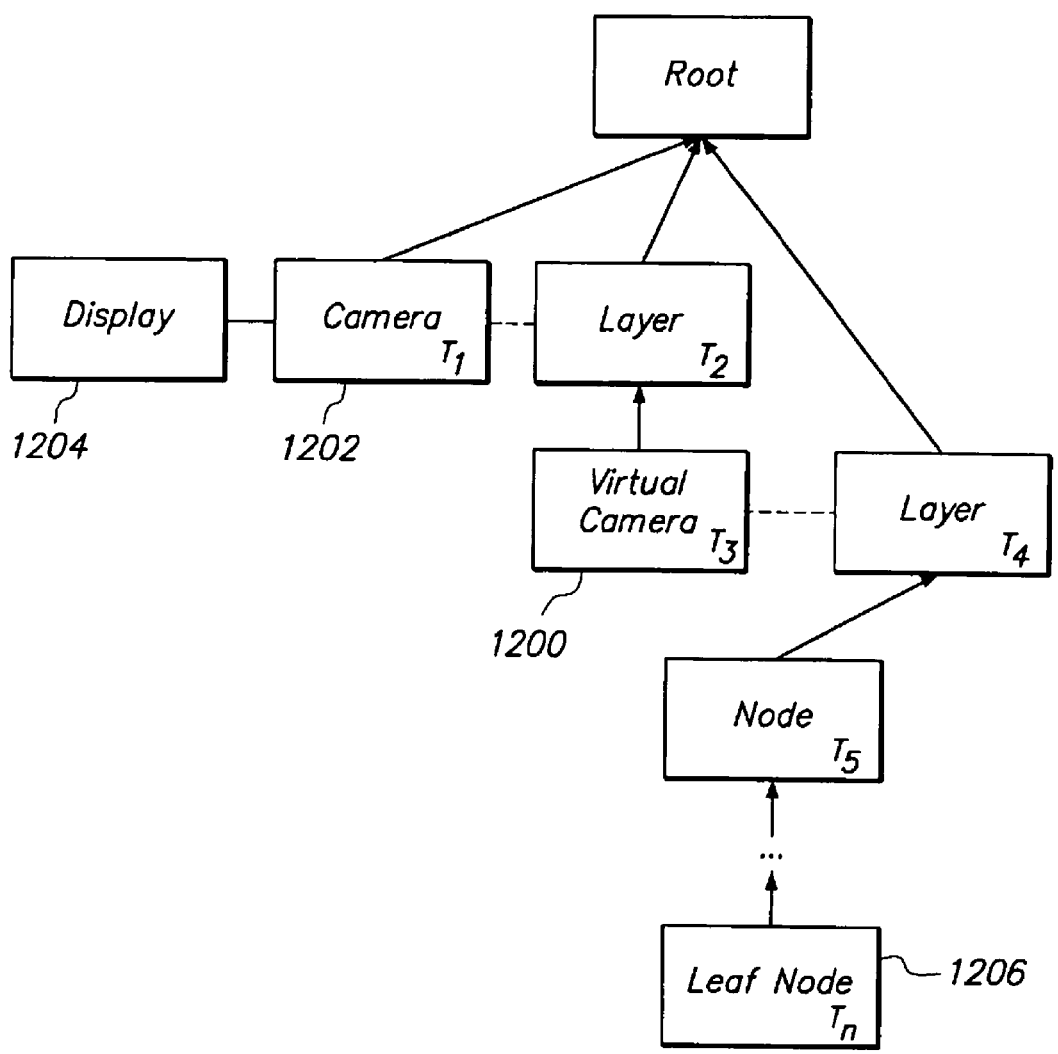
FIG. 14 depicts a data structure according to another exemplary embodiment of the present invention including a virtual camera for use in resolution consistent zooming.

The desirable result is that semantic zooming occurs consistently across all monitor resolutions. One solution is to use lower resolution display modes on high resolution monitors, so that the resolution is identical on all displays. However, the user of a high resolution monitor would prefer that graphics would be rendered at their best resolution if semantic zooming would still work as expected. Accordingly, exemplary embodiments of the present invention provide a semantic zooming technique which supports displays of all different solutions without the previously stated semantic viewing issues. This can be accomplished by, for example, creating a virtual display inside of the scene graph. This is shown in FIG. 14 by using an embedded virtual camera node 1200 and adding logic to compensate for the display resolution. The virtual camera node 1200 defines a view port whose size maps to the user's view distance and monitor size. For example, a large virtual camera view port indicates that a user is either sitting close enough to the monitor or has a large enough monitor to resolve many details. Alternately, a small view port indicates that the user is farther away from the monitor and requires larger fonts and image. The zoomable GUI code can base the semantic zooming transitions on the magnification level of components seen on this virtual camera and using the user's preferred viewing conditions.

The main camera node 1202 that is attached to the display device 1204 has its view port configured so that it displays everything that the virtual camera 1200 is showing. Since graphics images and text are not mapped to pixels until this main camera 1202, no loss of quality occurs from the virtual camera. The result of this is that high definition monitors display higher quality images and do not trigger semantic zooming changes that would make the display harder to read.

According to one exemplary embodiment of the present invention, the process works as follows. Each camera and node in the scene graph has an associated transform matrix ($T_1$ to $T_n$). These matrices transform that node's local coordinate system to that of the next node towards the display. In the figure, $T_1$ transforms coordinates from its view port to display coordinates. Likewise, $T_2$ transforms its local coordinate system to the camera's view port. If the leaf node 1206 needs to render something on the display, it computes the following transform matrix:

$$A = T_1 T_2 \ldots T_n$$

This calculation can be performed while traversing the scene graph. Since the component changes to support semantic zooming are based on the virtual camera 1200, the following calculation is performed:

$$B = T_4 T_5 \ldots T_n$$

Typically, $T_1$ to $T_3$ can be determined ahead of time by querying the resolution of the monitor and inspecting the scene graph. Determining B from A is, therefore, accomplished by inverting these matrices and multiplying as follows:

$$B = (T_1 T_2 T_3)^{-1} A$$

For the case when calculating $T_1$ to $T_3$ ahead of time is problematic, e.g., if a graphics API hides additional transformations, logic can be added to the virtual camera to intercept the transformation matrix that it would have used to render to the display. This intercepted transformation is then inverted and multiplied as above to compute the semantic zooming threshold.

Figure 15A:
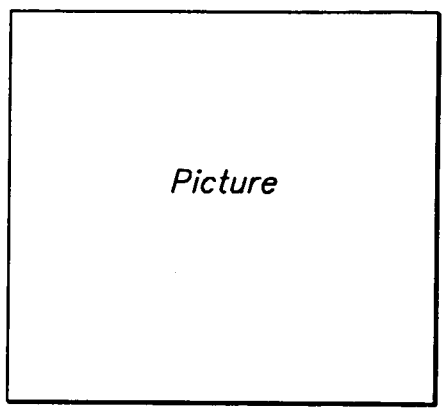
FIGS. 15(a) and 15(b) show a zoomed out and zoomed in version of a portion of an exemplary GUI which depict semantic zooming according to an exemplary embodiment of the present invention.
Figure 15B:
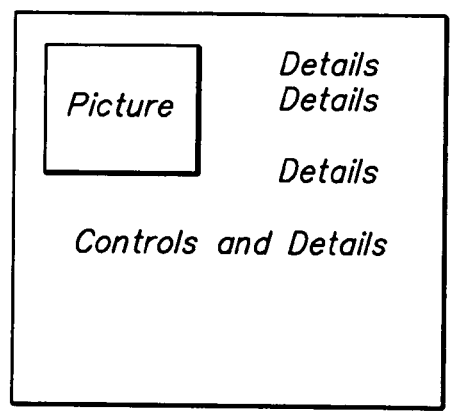
Figure 16:
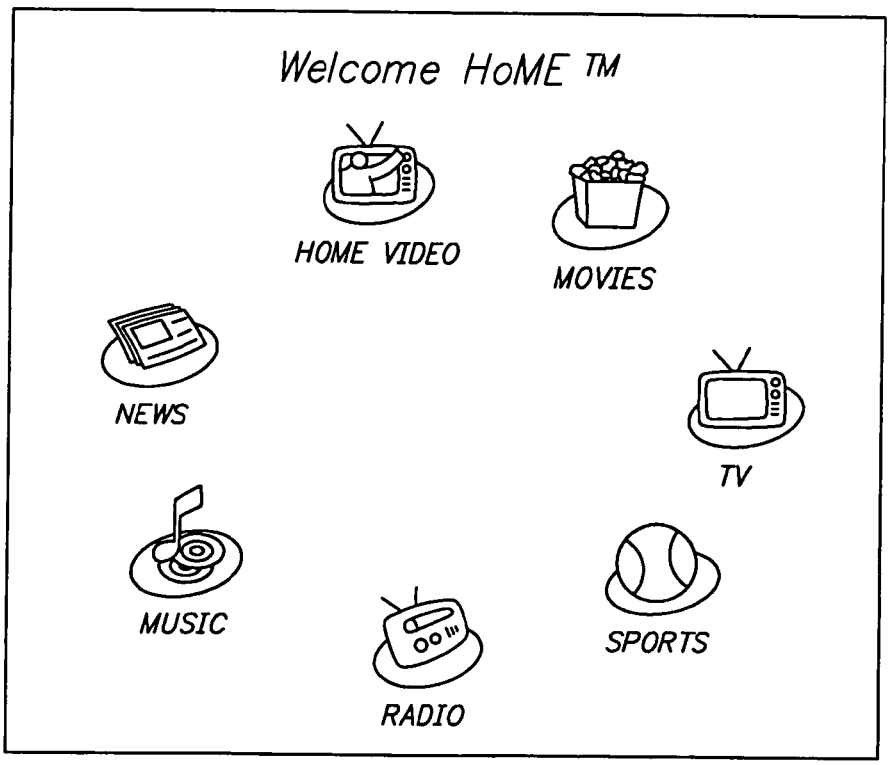

One strength of zoomable interfaces according to exemplary embodiments of the present invention is the ability to maintain context while navigating the interface. All of the interface components appear to exist in the zoomable world, and the user just needs to pan and zoom to reach any of them. The semantic zooming technique described above changes the appearance of a component depending on the zoom or magnification level. FIGS. 15(a) and 15(b) provide an example of semantic zooming for a component where the zoomed out version of the component (FIG. 15(a)) is a picture and the zoomed in version (FIG. 15(b)) includes the same picture as well as some controls and details. Some more detailed examples of this are provided below. One challenge associated with semantic zooming is that changes between views can occur abruptly, and transition techniques such as alpha blending do not provide visually pleasing results when transitioning between two such views.

Accordingly, exemplary embodiments of the present invention provide for some common image or text in all views of a component to provide a focal point for a transition effect when a semantic zoom is performed. For example, in FIGS. 15(a) and 15(b), the common element is the picture. The transition effect between the zoomed out version and the zoomed in version can be triggered using, for example, the above-described node watcher algorithm as follows. First, a registration with the node watcher can be performed to receive an event when the main camera's view port transitions from the magnification level of the zoomed out version of the component to the zoomed in version. Then, when the event occurs, an animation can be displayed which shows the common element(s) shrinking and translating from their location in the zoomed out version to their location in the zoomed in version. Meanwhile, the camera's view port continues to zoom into the component.

Figure 17:
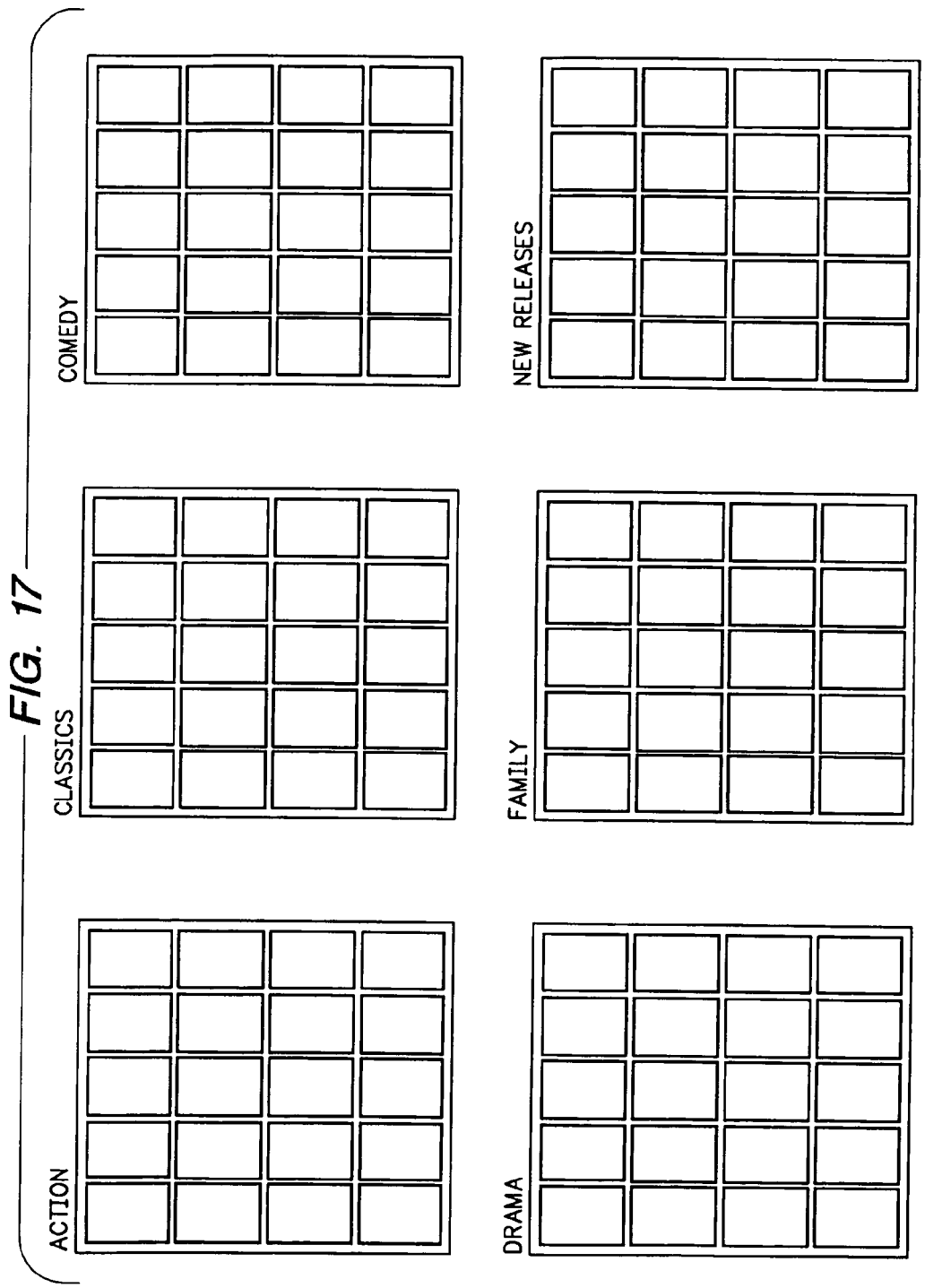

These capabilities of graphical user interfaces according to the present invention will become even more apparent upon review of another exemplary embodiment described below with respect to FIGS. 16-20. Therein, a startup GUI screen 1400 displays a plurality of organizing objects which operate as media group representations. The purely exemplary media group representations of home video, movies, TV, sports, radio, music and news could, of course include different, more or fewer media group representations. Upon actuation of one of these icons by a user, the GUI according to this exemplary embodiment will then display a plurality of images each grouped into a particular category or genre. For example, if the "movie" icon in FIG. 16 was actuated by a user, the GUI screen of FIG. 17 can then be displayed. Therein, a large number, e.g., 120 or more, selection objects are displayed. These selection objects can be categorized into particular group(s), e.g., action, classics, comedy, drama, family and new releases. Those skilled in the art will appreciate that more or fewer categories could be provided. In this exemplary embodiment, the media item images can be cover art associated with each movie selection. Although the size of the blocks in FIG. 17 is too small to permit detailed illustration of this relatively large group of selection item images, in implementation, the level of magnification of the images is such that the identity of the movie can be discerned by its associated image, even if some or all of the text may be too small to be easily read.

Figure 18:
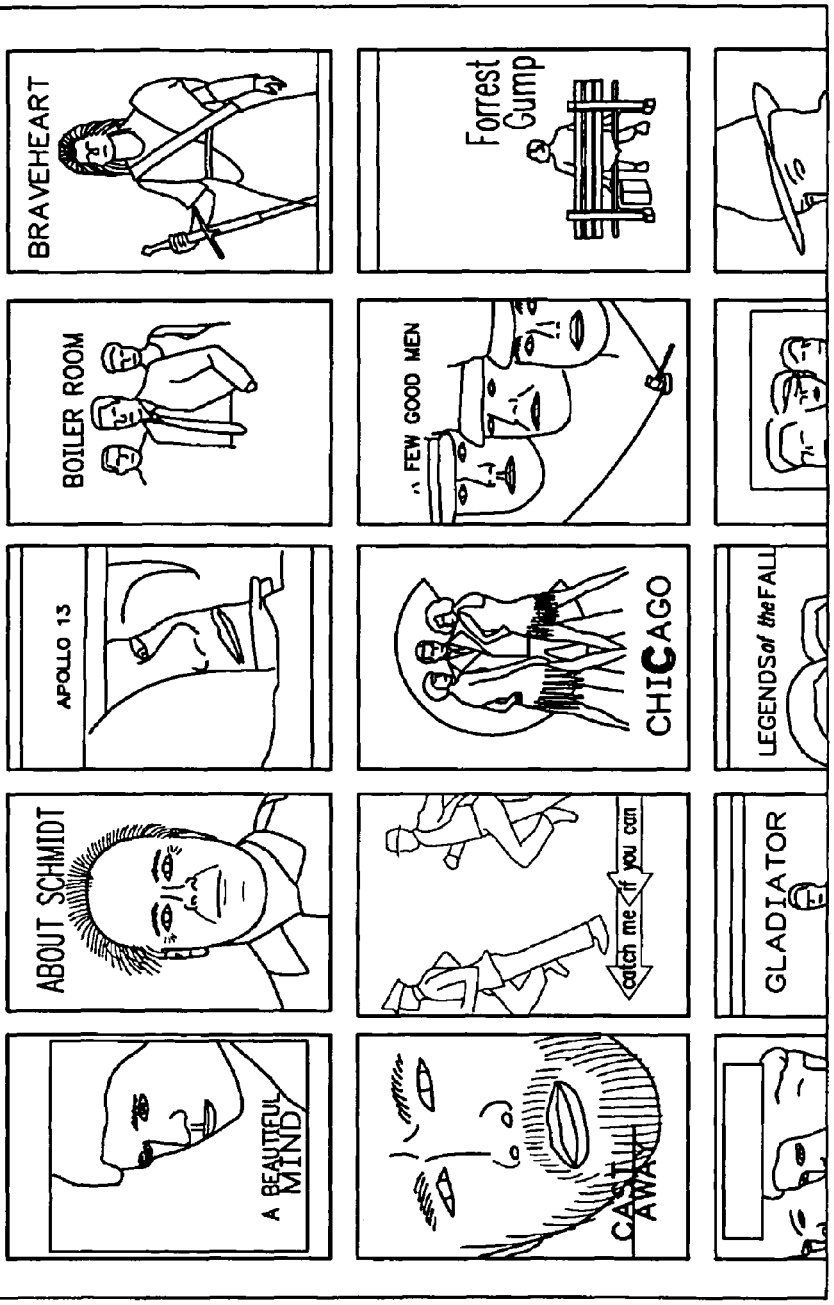

The cursor (not shown in FIG. 17) can then be disposed over a group of the movie images and the input device actuated to provide a selection indication for one of the groups. In this example the user selects the drama group and the graphical user interface then displays a zoomed version of the drama group of images as seen in FIG. 18. As with the previous embodiment, a transition effect can also be displayed as the GUI shifts from the GUI screen of FIG. 17 to the GUI screen of FIG. 18, e.g., the GUI may pan the view from the center of the GUI screen of FIG. 17 to the center of the drama group of images during or prior to the zoom. Note that although the zoomed version of the drama group of FIG. 18 only displays a subset of the total number of images in the drama group, that this zoomed version can alternatively contain all of the images in the selected group. The choice of whether or not to display all of the images in a selected group in any given zoomed in version of a GUI screen can be made based upon, for example, the number of media items in a group and a minimum desirable magnification level for a media item for a particular zoom level. This latter characteristic of GUIs according to the present invention can be predetermined by the system designer/service provider or can be user customizable via software settings in the GUI. For example, the number of media items in a group and the minimum and/or maximum magnification levels can be configurable by either or both of the service provider or the end user. Such features enable those users with, for example, poor eyesight, to increase the magnification level of media items being displayed. Conversely, users with especially keen eyesight may decrease the level of magnification, thereby increasing the number of media items displayed on a GUI screen at any one time and decrease browsing time.

One exemplary transition effect which can be employed in graphical user interfaces according to the present invention is referred to herein as the "shoe-to-detail" view effect. When actuated, this transition effect takes a zoomed out image and simultaneously shrinks and translates the zoomed out image into a smaller view, i.e., the next higher level of magnification. The transition from the magnification level used in the GUI screen of FIG. 17 to the greater magnification level used in the GUI screen of FIG. 18 results in additional details being revealed by the GUI for the images which are displayed in the zoomed in version of FIG. 18. The GUI selectively reveals or hides details at each zoom level based upon whether or not those details would display well at the currently selected zoom level. Unlike a camera zoom, which attempts to resolve details regardless of their visibility to the unaided eye, exemplary embodiments of the present invention provide for a configurable zoom level parameter that specifies a transition point between when to show the full image and when to show a version of the image with details that are withheld. The transition point can be based upon an internal resolution independent depiction of the image rather the resolution of TV/Monitor 212. In this way, GUIs according to the present invention are consistent regardless of the resolution of the display device being used in the media system.

In this exemplary embodiment, an additional amount of magnification for a particular image can be provided by passing the cursor over a particular image. This feature can be seen in FIG. 19, wherein the cursor has rolled over the image for the movie "Apollo 13". Although not depicted in FIG. 19, such additional magnification could, for example, make more legible the quote "Houston, we have a problem" which appears on the cover art of the associated media item as compared to the corresponding image in the GUI screen of FIG. 18 which is at a lower level of magnification. User selection of this image, e.g., by depressing a button on the input device, can result in a further zoom to display the details shown in FIG. 20. This provides yet another example of semantic zooming as it was previously described since various information and control elements are present in the GUI screen of FIG. 20 that were not available in the GUI screen of FIG. 19. For example, information about the movie "Apollo 13" including, among other things, the movie's runtime, price and actor information is shown. Those skilled in the art will appreciate that other types of information could be provided here. Additionally, this GUI screen includes GUI control objects including, for example, button control objects for buying the movie, watching a trailer or returning to the previous GUI screen (which could also be accomplished by depressing the ZOOM OUT button on the input device). Hyperlinks can also be used to allow the user to jump to, for example, GUI screens associated with the related movies identified in the lower right hand corner of the GUI screen of FIG. 20 or information associated with the actors in this movie. In this example, some or all of the film titles under the heading "Filmography" can be implemented as hyperlinks which, when actuated by the user via the input device, will cause the GUI to display a GUI screen corresponding to that of FIG. 20 for the indicated movie.

A transition effect can also be employed when a user actuates a hyperlink. Since the hyperlinks may be generated at very high magnification levels, simply jumping to the linked media item may cause the user to lose track of where he or she is in the media item selection "map". Accordingly, exemplary embodiments of the present invention provide a transition effect to aid in maintaining the user's sense of geographic position when a hyperlink is actuated. One exemplary transition effect which can be employed for this purpose is a hop transition. In an initial phase of the transition effect, the GUI zooms out and pans in the direction of the item pointed to by the hyperlink. Zooming out and panning continues until both the destination image and the origination image are viewable by the user. Using the example of FIG. 20 once again, if the user selects the hyperlink for "Saving Private Ryan", then the first phase of the hyperlink hop effect would include zooming out and panning toward the image of "Saving Private Ryan" until both the image for "Saving Private Ryan" and "Apollo 13" were visible to the user. At this point, the transition effect has provided the user with the visual impression of being moved upwardly in an arc toward the destination image. Once the destination image is in view, the second phase of the transition effect gives the user the visual impression of zooming in and panning to, e.g., on the other half of the arc, the destination image. The hop time, i.e., the amount of time both phases one and two of this transition effect are displayed, can be fixed as between any two hyperlinked image items. Alternatively, the hop time may vary, e.g., based on the distance traveled over the GUI. For example, the hop time can be parameterized as HopTime=A log(zoomed-in scale level/hop apex scale level)+B(distance between hyperlinked media items)+C, where A, B and C are suitably selected constant values.

Figure 19:

The node watcher algorithm described above with respect to FIGS. 9-13(b) can also be used to aid in the transition between the zoom level depicted in the exemplary GUI screen of FIG. 19 and the exemplary GUI screen of FIG. 20. The rendering of GUI screens containing text and/or control elements which are not visible in other zoom level versions of the selected image may be more computationally and/or memory intensive than the images at lower magnification levels. Accordingly, the node watcher algorithm can be used in exemplary embodiments of the present invention to aid in pre-loading of GUI screens such as that shown in FIG. 20 by watching the navigation code of the GUI to more rapidly identify the particular media item being zoomed in on.

Figure 21:
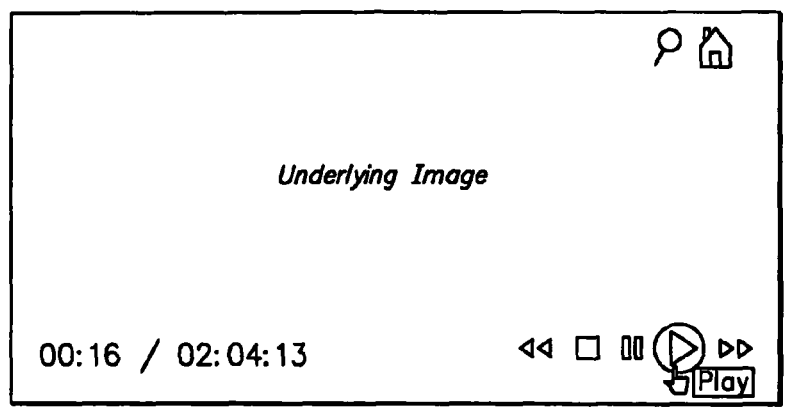
FIG. 21 illustrates an exemplary set of overlay controls which can be provided according to exemplary embodiments of and the present invention.

Included in exemplary implementations of the present invention are screen-location and semantically-based navigation controls. These control regions appear when the user positions the cursor near or in a region associated with those controls on a screen where those controls are appropriate as shown in FIG. 21. For example, when playing a movie, the so-called trick functions of Fast Forward, Rewind, Pause, Stop and so on are semantically appropriate. In this exemplary embodiment, the screen region assigned to those functions is the lower right corner and when the cursor is positioned near or in that region, the set of icons for those trick functions appear. These icons then disappear when the function engaged is clearly completed or when the cursor is repositioned elsewhere on the screen. The same techniques can also be used to cover other navigational features like text search and home screen selection. In this exemplary implementation, these controls are semantically relevant on all screens and the region assigned to them is the upper right corner. When the cursor is positioned near or in that region, the set of icons for those navigational controls appear. These icons then disappear when the function is activated or the cursor is repositioned elsewhere on the screen. Note that for user training purposes, the relevant control icons may initially optionally appear briefly (e.g., 5 seconds) on some or all of the relevant screens in order to alert the inexperienced user to their presence.

Figure 22:
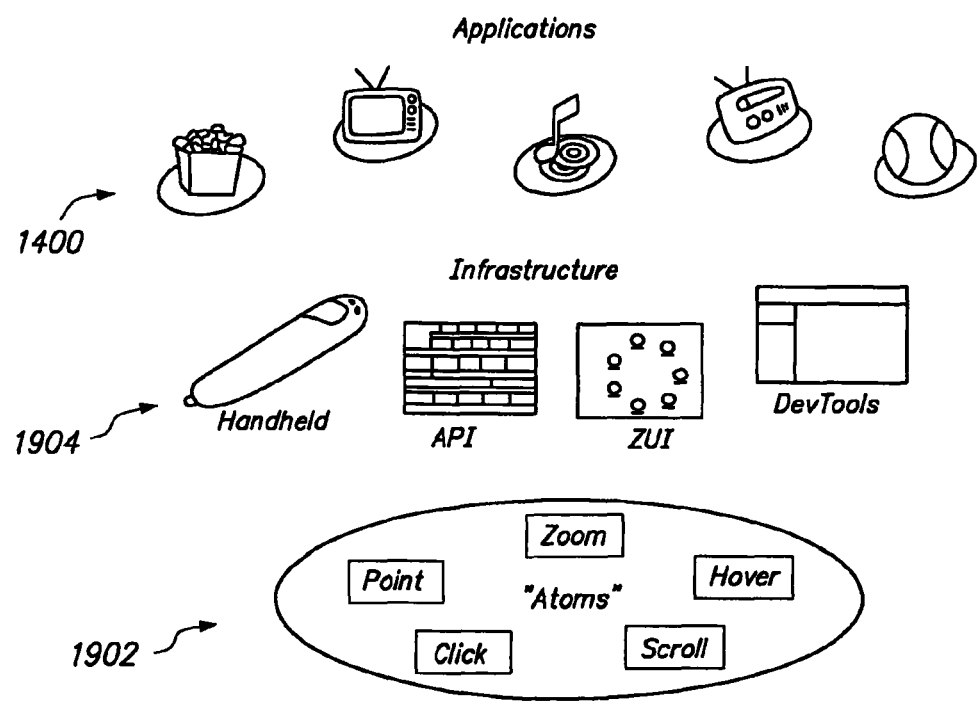
FIG. 22 illustrates an exemplary framework for implementing zoomable graphical user interfaces according to the present invention.

Having provided some examples of zoomable graphical user interfaces according to the present invention, exemplary frameworks and infrastructures for using such interfaces will now be described. FIG. 22 provides a framework diagram wherein zoomable interfaces associated with various high level applications 1900, e.g., movies, television, music, radio and sports, are supported by primitives 1902 (referred to in the Figure as "atoms"). In this exemplary embodiment, primitives 1902 include POINT, CLICK, ZOOM, HOVER and SCROLL, although those skilled in the art will appreciate that other primitives may be included in this group as well, e.g., PAN and DRAG. As described above the POINT and CLICK primitives operate to determine cursor location and trigger an event when, for example, a user actuates the ZOOM IN or ZOOM OUT button on the handheld input device. These primitives simplify navigation and remove the need for repeated up-down-right-left button actions. As illustrated above, the ZOOM primitive provides an overview of possible selections and gives the user context when narrowing his or her choices. This concept enables the interface to scale to large numbers of media selections and arbitrary display sizes. The SCROLL primitive handles input from the scroll wheel input device on the exemplary handheld input device and can be used to, for example, accelerates linear menu navigation. The HOVER primitive dynamically enlarges the selections underneath the pointer (and/or changes the content of the selection) to enable the user to browse potential choices without committing. Each of the aforedescribed primitive operations can be actuated in GUIs according to the present invention in a number of different ways. For example, each of POINT, CLICK, HOVER, SCROLL and ZOOM can be associated with a different gesture which can be performed by a user. This gesture can be communicated to the system via the input device, whether it be a 3D pointer, trackball, touchpad, etc. and translated into an actuation of the appropriate primitive. Likewise, each of the primitives can be associated with a respective voice command.

Between the lower level primitives 1902 and the upper level applications 1900 reside various software and hardware infrastructures 1904 which are involved in generating the images associated with zoomable GUIs according to the present invention. As seen in FIG. 22, such infrastructures 1904 can include a handheld input device/pointer, application program interfaces (APIs), zoomable GUI screens, developers' tools, etc.

The foregoing exemplary embodiments are purely illustrative in nature. The number of zoom levels, as well as the particular information and controls provided to the user at each level may be varied. Those skilled in the art will appreciate that the present invention provides revolutionary techniques for presenting large and small sets of media items using a zoomable interface such that a user can easily search through, browse, organize and play back media items such as movies and music. Graphical user interfaces according to the present invention organize media item selections on a virtual surface such that similar selections are grouped together. Initially, the interface presents a zoomed out view of the surface, and in most cases, the actual selections will not be visible at this level, but rather only their group names. As the user zooms progressively inward, more details are revealed concerning the media item groups or selections. At each zoom level, different controls are available so that the user can play groups of selections, individual selections, or go to another part of the virtual surface to browse other related media items. Zooming graphical user interfaces according to exemplary embodiments of the present invention can contain categories of images nested to an arbitrary depth as well as categories of categories. The media items can include content which is stored locally, broadcast by a broadcast provider, received via a direct connection from a content provider or on a peering basis. The media items can be provided in a scheduling format wherein date/time information is provided at some level of the GUI. Additionally, frameworks and GUIs according to exemplary embodiments of the present invention can also be applied to television commerce wherein the items for selection are being sold to the user.

The conventional television application assumes that the user has to consciously and deliberately select from a set of relevant screen regions or objects in order to make a selection. Typically this is done with up/down/left/right arrows with the screen highlighting the region of interest. When the user gets there, she or he presses, e.g., the "OK" button to proceed. By way of contrast, exemplary embodiments of the present invention allow the user to directly point to whatever on the screen is of interest. This makes selection much more intuitive and quick. It also permits enhanced information to be displayed as part of pointing; something referred to herein as "semantic hover". One example of semantic hover in exemplary embodiments of the present invention is that hovering over a program title in the TV application causes extended information about that program to be displayed. Additionally, it permits actions to be relevant to the region of interest. The user can simply point at a region of the screen that may or may not contain a specific object of interest and engage an action that has no relevance anywhere else on the screen. One example of this in applications according to the present invention is that moving the cursor to the left part of the screen engages a channel selection feature. The user can then use a scroll wheel to change channels or just point at the slider bar to set the corresponding channel. None of this is easily accomplished with a conventional navigation scheme.

Another unique feature associated with integrating a 3D device with an on-screen navigation system according to exemplary embodiments of the present invention is the ability to cope with both tremor and unwanted movement. This is very different than the situation with a desktop mouse and a PC screen. In that case, the mouse is resting on a flat surface and the unwanted movement is naturally filtered out thanks to friction and the ability to rest. However, with a 3D device, it is held in the user's hand at arbitrary angles resulting in a very different control environment. Either the algorithm associated with processing the motion data of the 3D device or the application which receives that data (or both) have to deal with tremor and unwanted movement. Another aspect of such combinations according to the present invention is precision. In general, the pointing resolution of a desktop mouse is superior to that of a 3D device. This means that the desktop mouse can point at smaller screen objects than the 3D device can.

Systems according to exemplary embodiments of the present invention do all three of these things. In the algorithm itself, tremor and desired motion are modeled and processed so that only the desired motion is used. Additionally, movement of the 3D device that is generated solely because the user is depressing a button or rolling a scroll wheel of the 3D pointing device is modeled and compensated for. Additionally, in the downstream application which receives the processed movement data associated with the user's movement of the 3D pointing device, knowledge of 3D resolution and movement characteristics are included in the design of the application screens, which also provide or semantic feedback to make the system easier to control.

The advantages of 3D pointing in combination with on-screen navigation also include new features and functions that are possible in various applications because of this pairing. Some examples are listed below, categorized by their different applications. Note that all of the GUI screens illustrated in FIGS. 23-33 can be navigated to using the afore-described techniques.

Figure 23A:
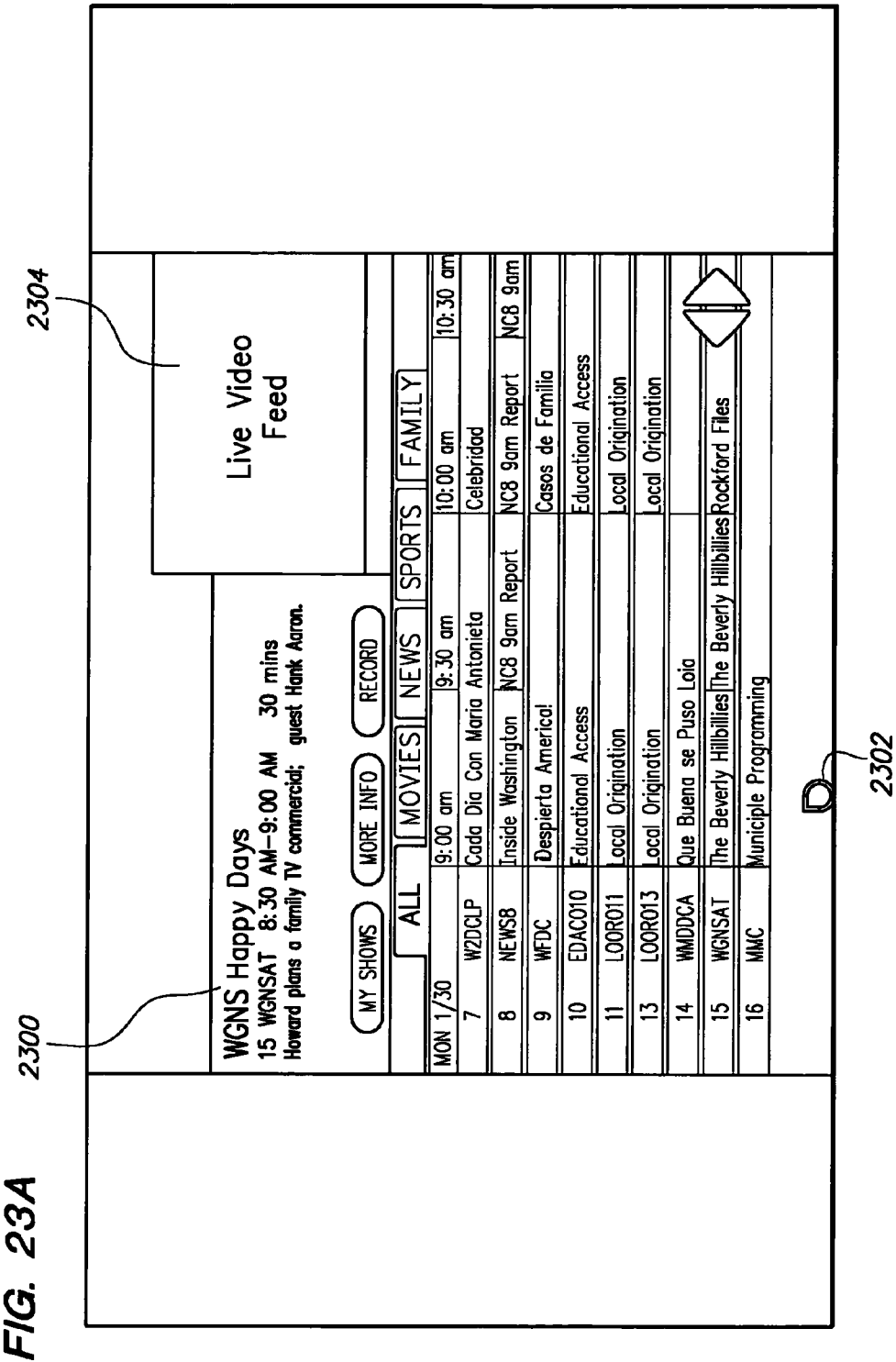
Figure 24A:
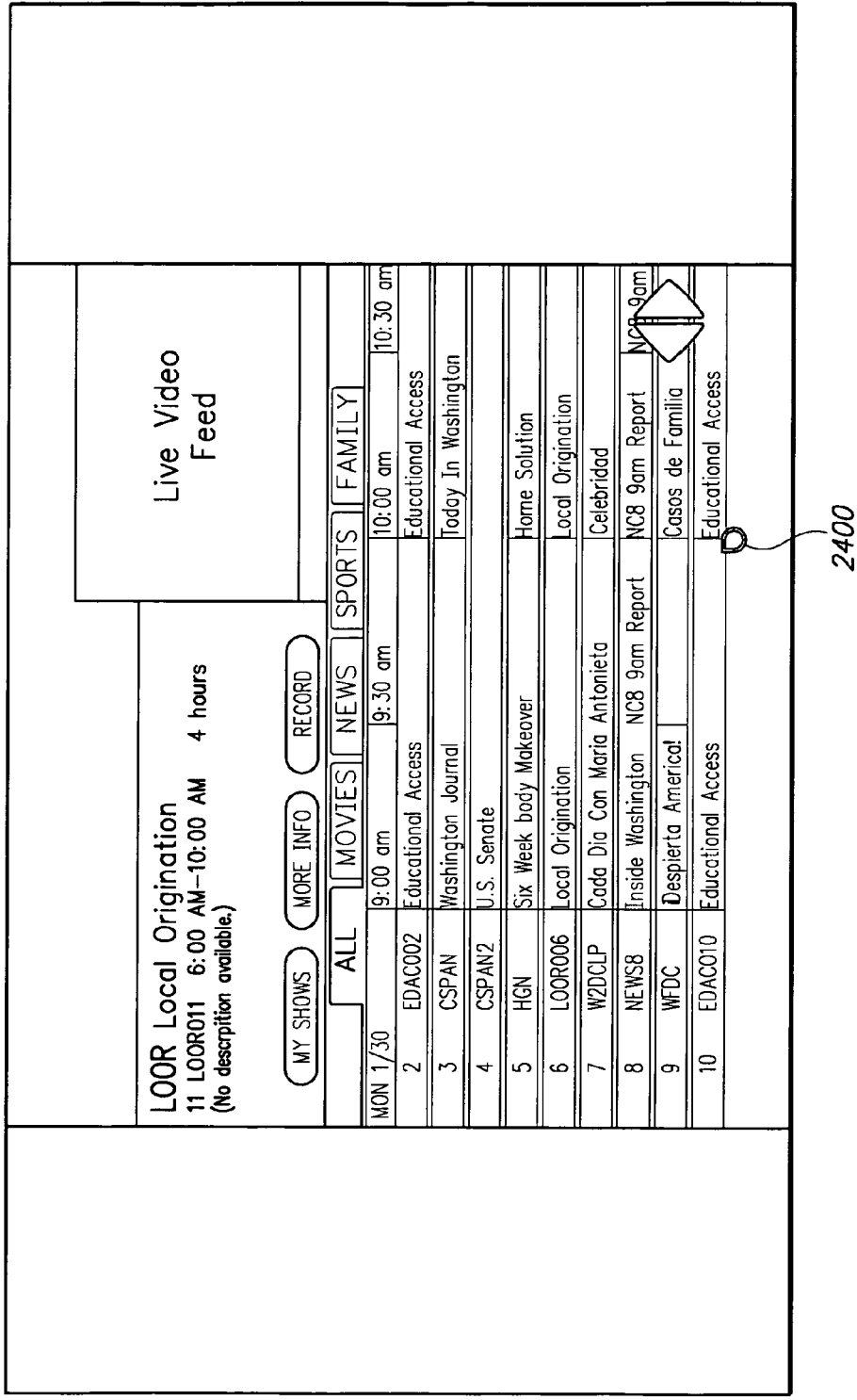
FIGS. 24(a)-24(b) are GUI screens illustrating using 3D pointing to scroll channel listings in an electronic program guide according to an exemplary embodiment of the present invention.
Figure 24B:
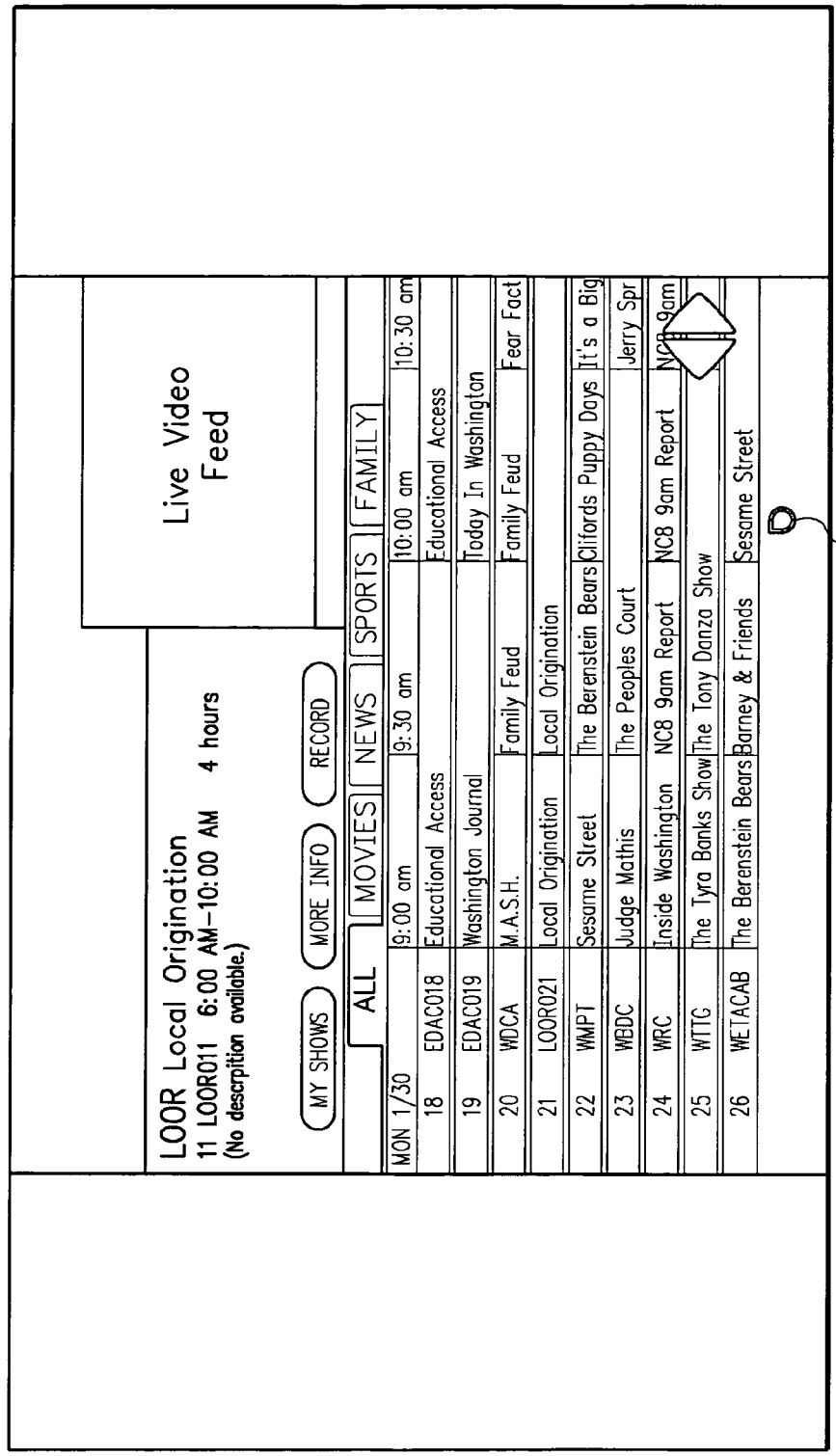
Figure 25B:
Figure 26A:
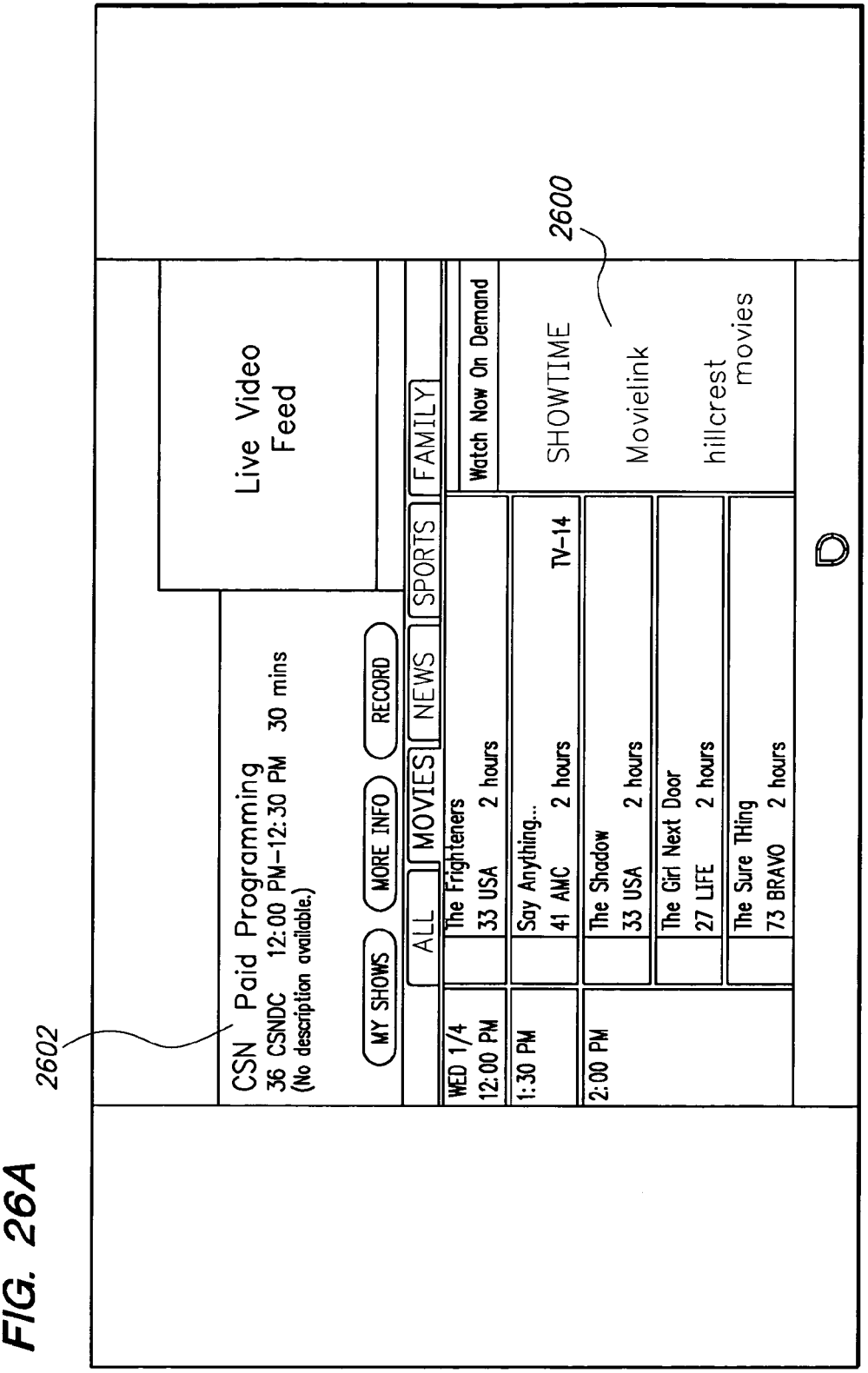
FIGS. 26(a)-26(b) are GUI screens illustrating using 3D pointing to display links to enable more efficient transition between media items in an electronic program guide according to an exemplary embodiment of the present invention.
Figure 26B:
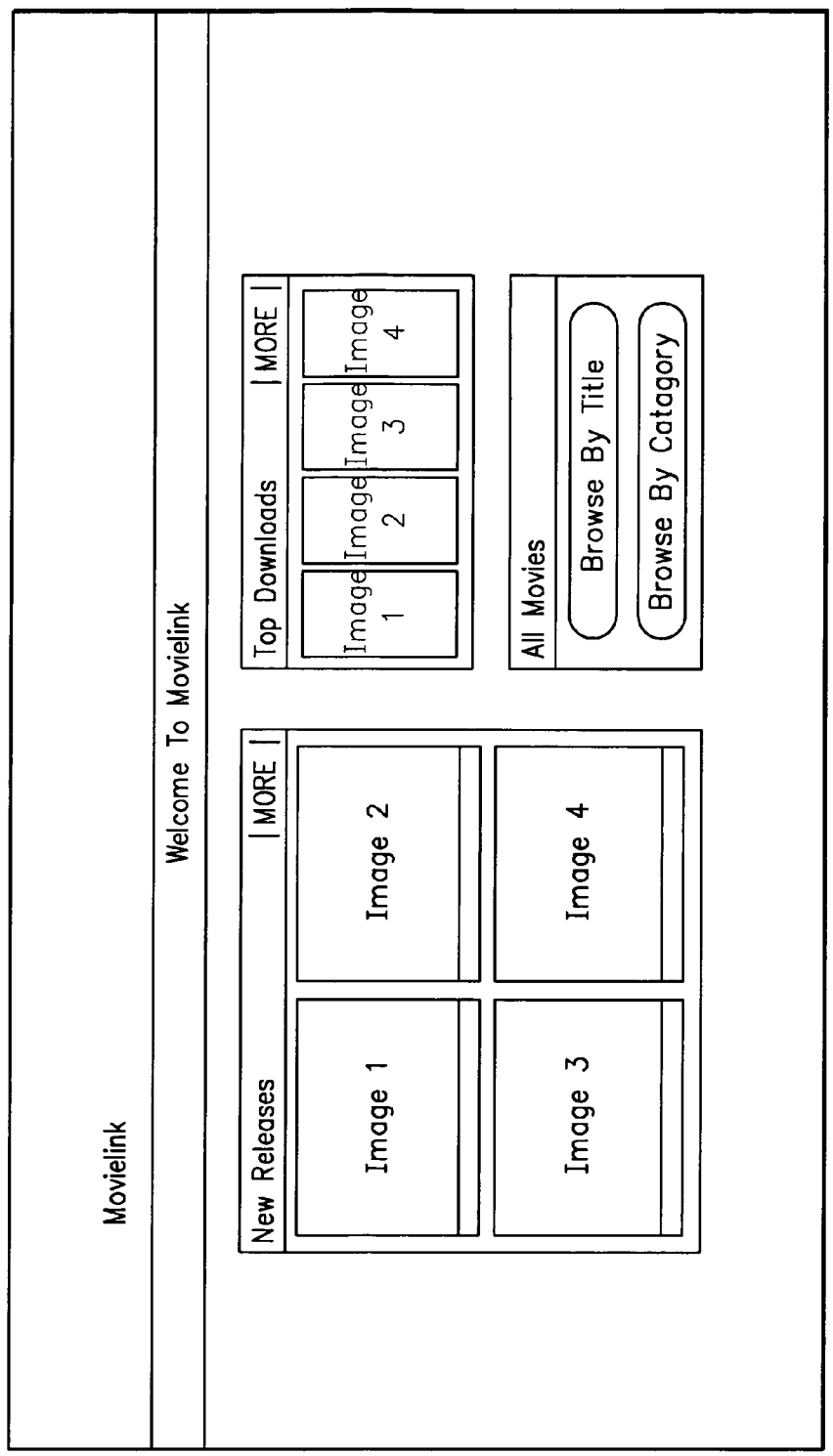
Figure 27B:
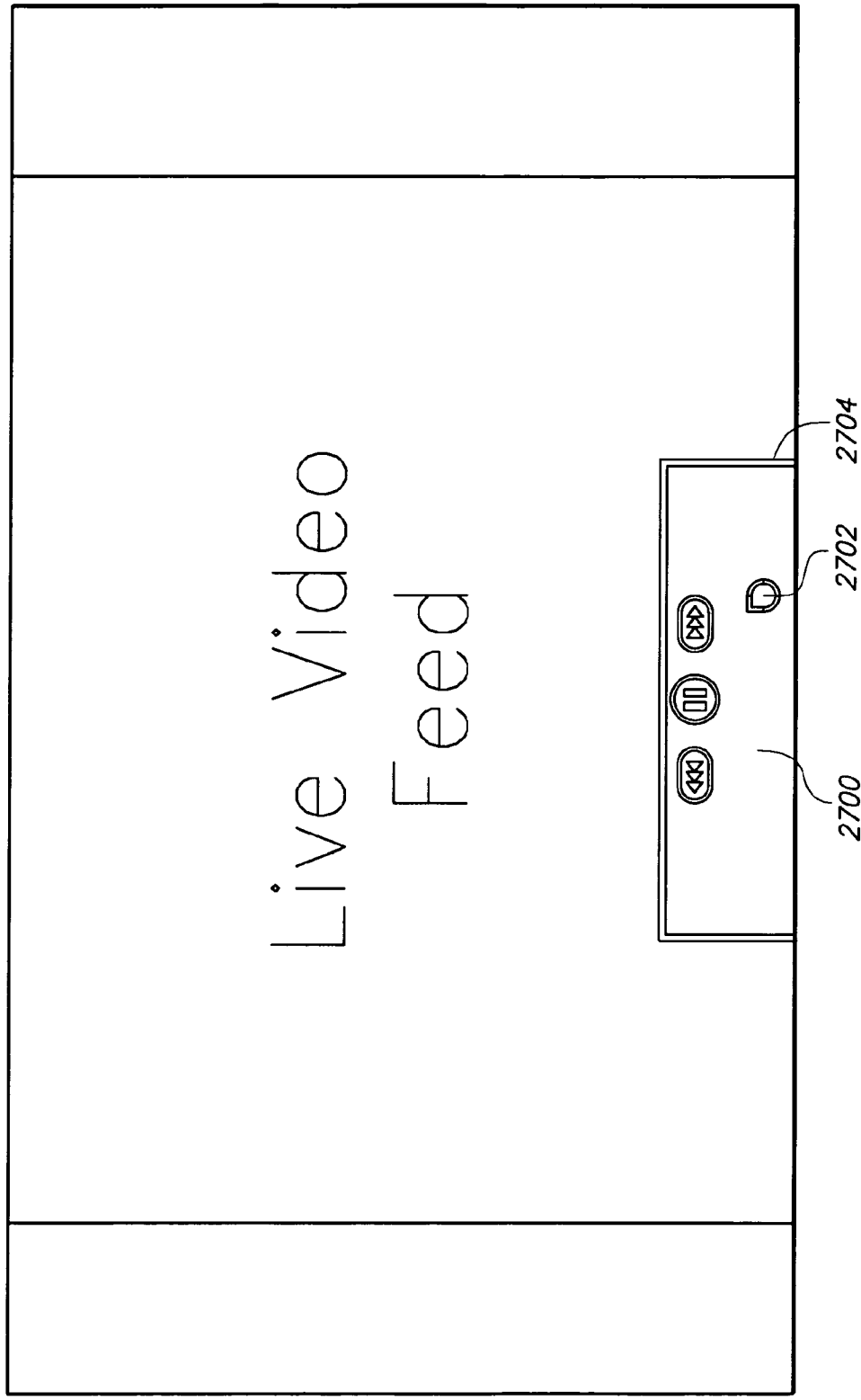

TV: In a guide to television, there are the following exemplary benefits:
1. Pointing at a program listing reveals additional information about the program with no clicking or screen changing required. (semantic hover). See, for example, FIGS. 23(a) and 23(b) which illustrate this technique. Therein, an electronic program guide has a plurality of channels and the programming information for those channels displayed in a GUI screen which can be accessed, e.g., from a higher level GUI screen as described above. At the time instant illustrated in FIG. 23 (a), a currently selected channel information pane 2300 displays information associated with a program airing on channel 15 from 8:30 AM-9:00 AM, i.e., "Happy Days". The cursor 2302 is not currently pointing to a program listing. At another time instant illustrated in FIG. 23(b), the cursor has moved to point to the show "Beverly Hillbillies" airing on channel 15 at 9:00 AM, e.g., by virtue of a corresponding movement of a 3D pointing mechanism in front of the television screen. This results, automatically and without any input other than pointing from the user according to this exemplary embodiment of the present invention, in the information displayed in the currently selected channel information pane 2300 changing to display information about the newly selected program as shown in FIG. 23(b). In this example, the GUI screen can also have a live feed section 2304 which displays the video and/or audio information associated with a currently selected channel.
2. Scrolling among program listings allows for easy navigation of long linear lists. Again, such scrolling can be performed simply by pointing at the television with, e.g., a 3D pointing mechanism. See, for example, FIGS. 24(a) and 24(b). In FIG. 24(a), the GUI screen is currently displaying a program guide with channels 2-10 and their corresponding program information. By moving the cursor 2400 to the portion of the screen below the list, a scrolling function can be automatically activated, such that the program guide scrolls down without requiring the user to take any other action. A GUI screen resulting from this scrolling activity is illustrated as FIG. 24(b).
3. Screen controls that are only shown when requested such as volume and channel. For example, FIG. 25(a) illustrates a GUI screen wherein a particular television channel has been selected and the video and audio feed associated with that channel is being output by the system. By moving the 3D pointer in front of the television, and correspondingly moving the cursor 2500 to the righthand side of the GUI screen, a volume control slider bar 2502 is displayed on screen and can be manipulated by the user, e.g., by dragging the volume icon 2504 up or down. If the user moves the 3D pointer in such a way that the cursor moves to the lefthand side of the GUI screen, then a channel changing control 2506 can be displayed as shown in FIG. 25(c). Some program guide information can also be displayed in a pop-up panel 2508, which can be manipulated, e.g., by pointing at tabs as shown in FIG. 25(d). By pointing to the channel control bar 2510, a pop-up 2512 is displayed indicating a channel which is located at the pointed to position on the channel control bar 2510 (FIG. 25(e)). A subsequent input (e.g., a button press, etc.) or a pause over this location of a predetermined time period results in the channel being changed and a corresponding change in information in the display pane 2508 (FIG. 25(f)).
4. Visual browser that simultaneously presents many options to the user and from which the user can select by merely pointing. This aspect of exemplary embodiments of the present invention is illustrated in FIGS. 17-20, described above.
5. Automatic cross-linking suggestions displayed when the user either hovers or selects an item. This aspect of exemplary embodiments of the present invention can be found in various GUI screens associated with interfaces and systems described herein. For example, as shown in FIG. 26(a), cross links can be provided in a righthand pane 2600 of a program guide for other "on-demand" GUI screens based on an initial user selection of "Paid Programming" evidenced by the display pane 2602 in the upper portion of the GUI screen illustrated in this Figure. For example, if the user operates the "Movielink" link within display pane 2600, e.g., by moving a cursor thereover and clicking on the "Movielink" text, the GUI screen illustrated as FIG. 26(b) could be displayed as a result of that operation.
6. On-screen transport controls (e.g., rewind, fast forward, play, stop, scene skip, end and beginning) allows for easy control of the video playback. Like the volume and channel selection controls discussed above, these controls can be displayed in response to a user's movement of the cursor to a predetermined portion of the display area. See, e.g., FIGS. 27(a) and 27(b) wherein the on-screen transport controls 2700 are displayed in FIG. 27(b) in response to placement of the cursor 2702 within the region defined by box 2704.

Figure 28B:
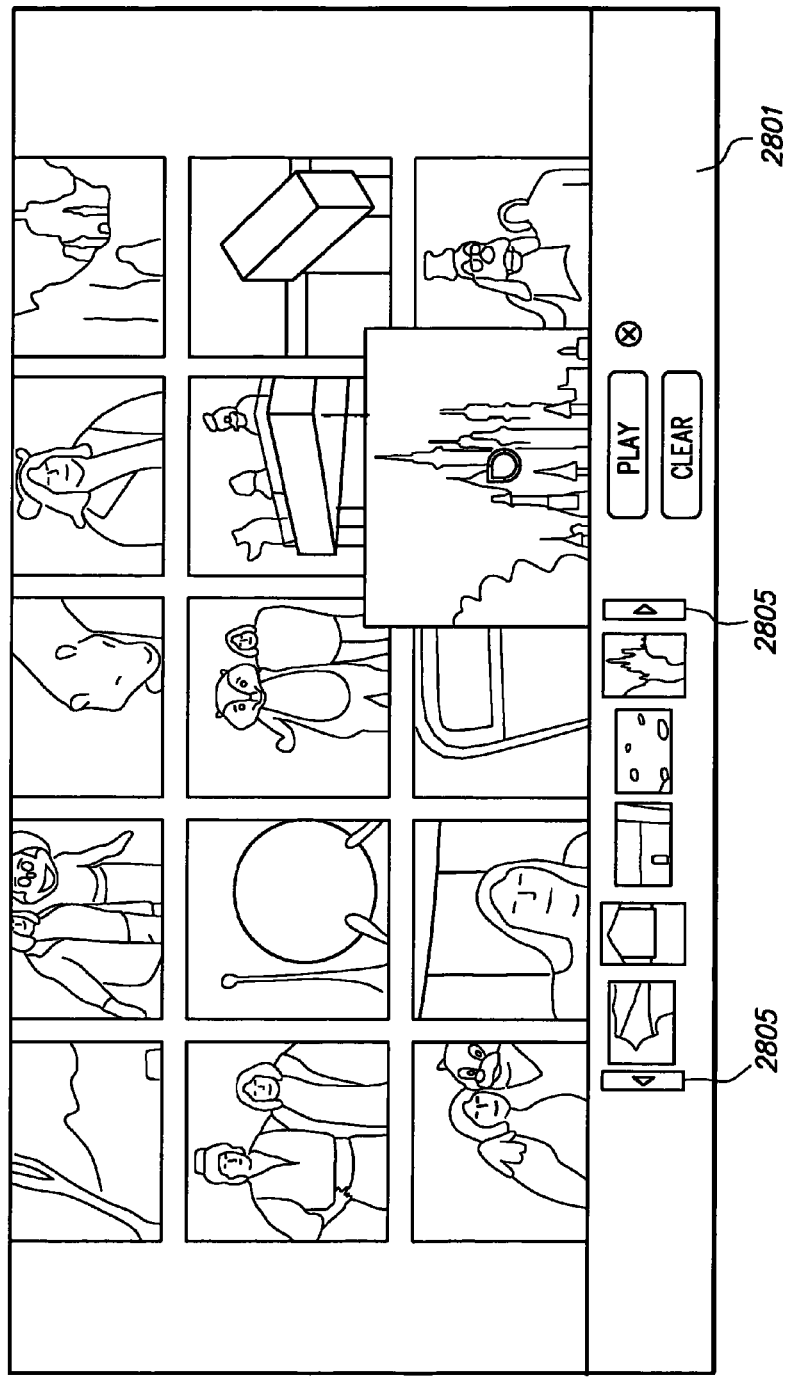

Photos: In a photo application, there are the following exemplary benefits:
1. Pointing at a photo collection user can then either automatically add it to the playlist or optionally with a drag-and-drop motion. For example, as illustrated in FIG. 28(a), pointing at a particular photo in the "Europe" collection (which was reached by zooming into a portion of a bookshelf of photos in much the same way as described above with respect to movies and FIGS. 17-20) results in a "hover zoom" effect where the photo 2800 is enlarged and automatically added to a playlist portion 2801 of the GUI screen. A smaller version 2802 of the photo 2800 is placed in the playlist portion 2801 to represent its addition to this list.
2. Zooming into a photo album can give more contextual information and allow for hierarchical sorting. As the photo playlist grows, scroll controls 2805 will appear to limit the number of smaller version images displayed within playlist portion 2801 at any time (see FIG. 28(b)).
3. On-screen transport controls allows for easy control of the slide show playback, e.g., "Play" and "Clear" buttons in FIGS. 28(a) and 28(b).

Figure 29A:
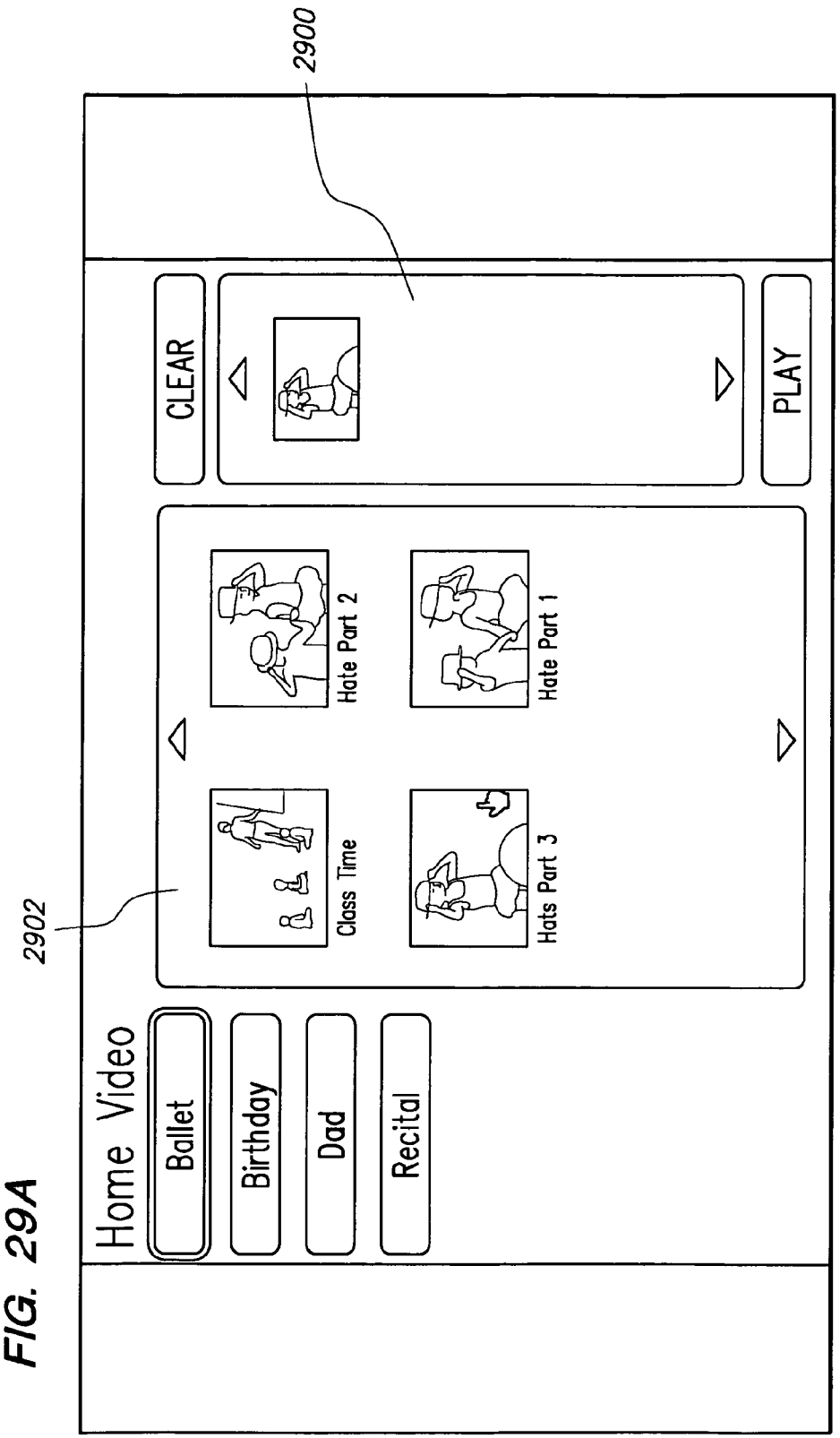
FIGS. 29(a)-29(b) are GUI screens illustrating using 3D pointing to manipulate videos in a home video collection interface according to an exemplary embodiment of the present invention.
Figure 29B:
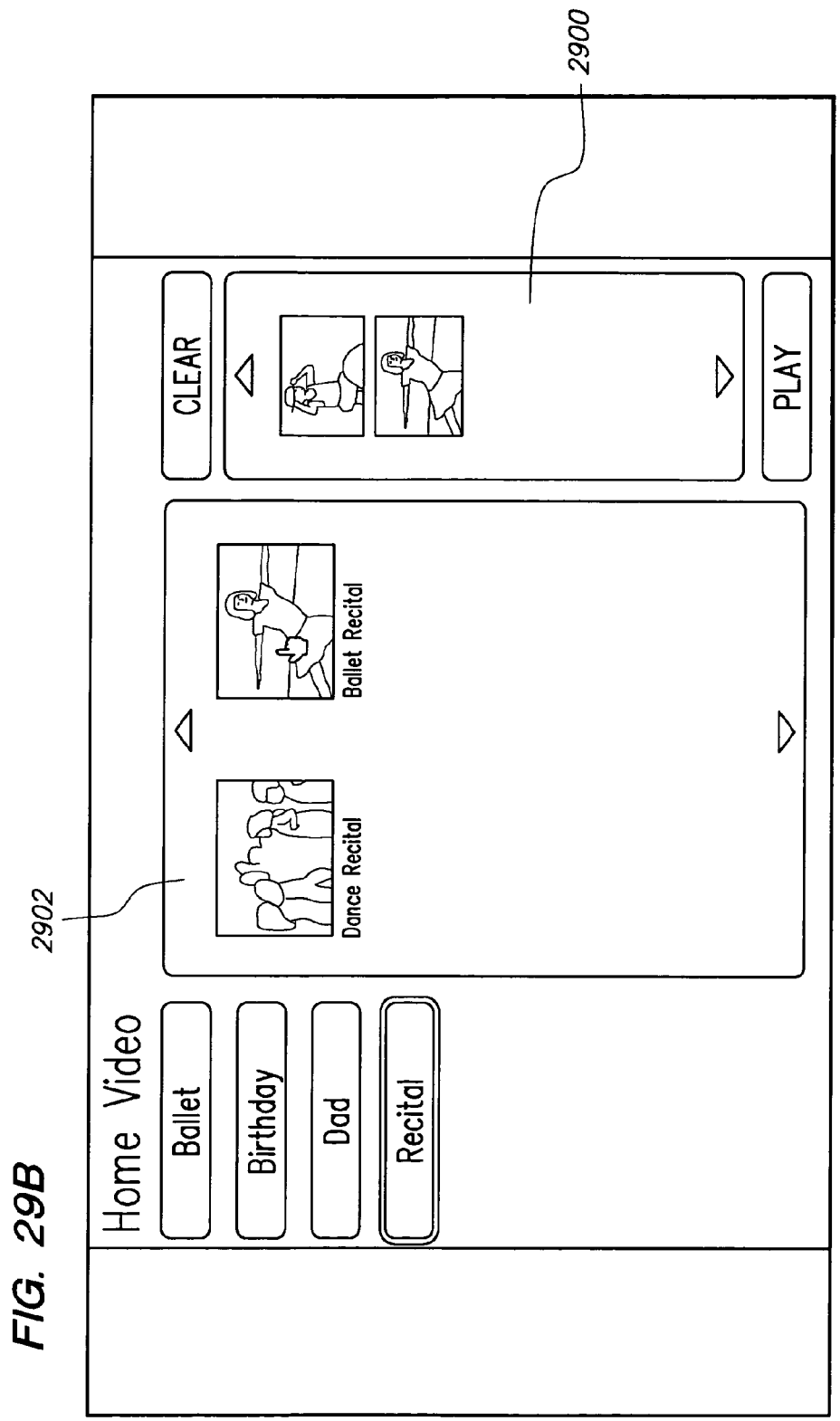

Home Movies In a home movie application, there are the following exemplary benefits:
1. Pointing at a home video collection user can then either automatically add it to the playlist or optionally with a drag-and-drop motion as illustrated in FIG. 29(a). Therein, the "Hats Part3" movie from the "Ballet" collection is added to the playlist 2900 by pointing to its image in the collection area 2902 of the GUI screen. Selecting the "Recital" button in the upper lefthand portion of this GUI screen changes the images in the collection area to those stored as part of the "Recital" collection, from which another home movie is added to the playlist 2900 as illustrated in FIG. 29(b).
2. Zooming into a movie album can give more contextual information and allow for hierarchical sorting.
3. On-screen transport controls, e.g., "Play" and "Clear", allow for easy control of the home video and home video playlist playback as seen in FIGS. 29(a) and 29(b).

Figure 30B:
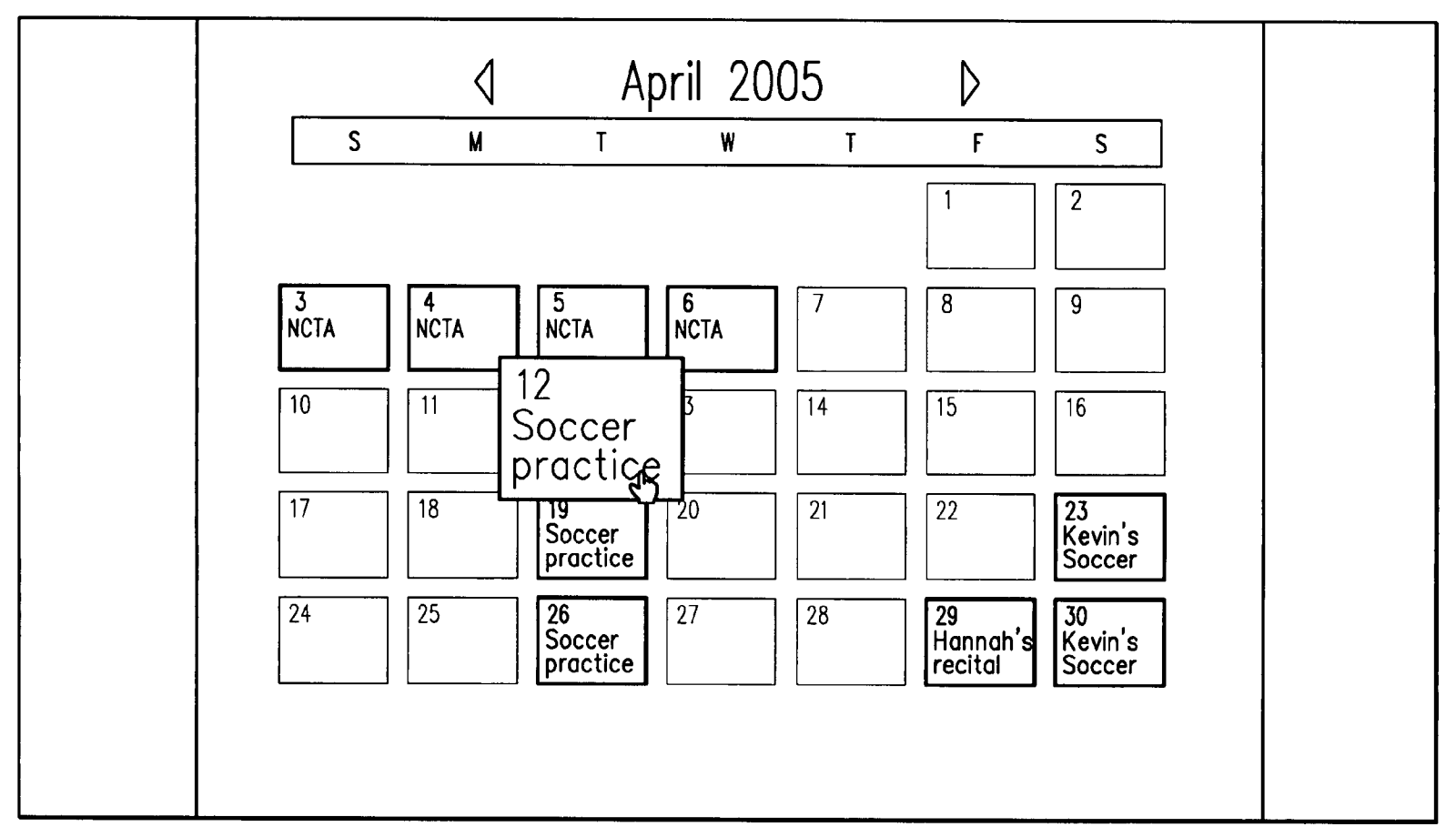

Calendar: In a calendar application, there are the following exemplary benefits:
1. User can hover over a calendar day and see additional information about the appointments on that day without clicking as illustrated in FIGS. 30(a) and 30(b).
2. User can zoom into a day to see additional detail or to edit such detail on screen with an on-screen text entry system.
3. User can sort the calendar to see conflicts among different members of interest.

Figure 31A:
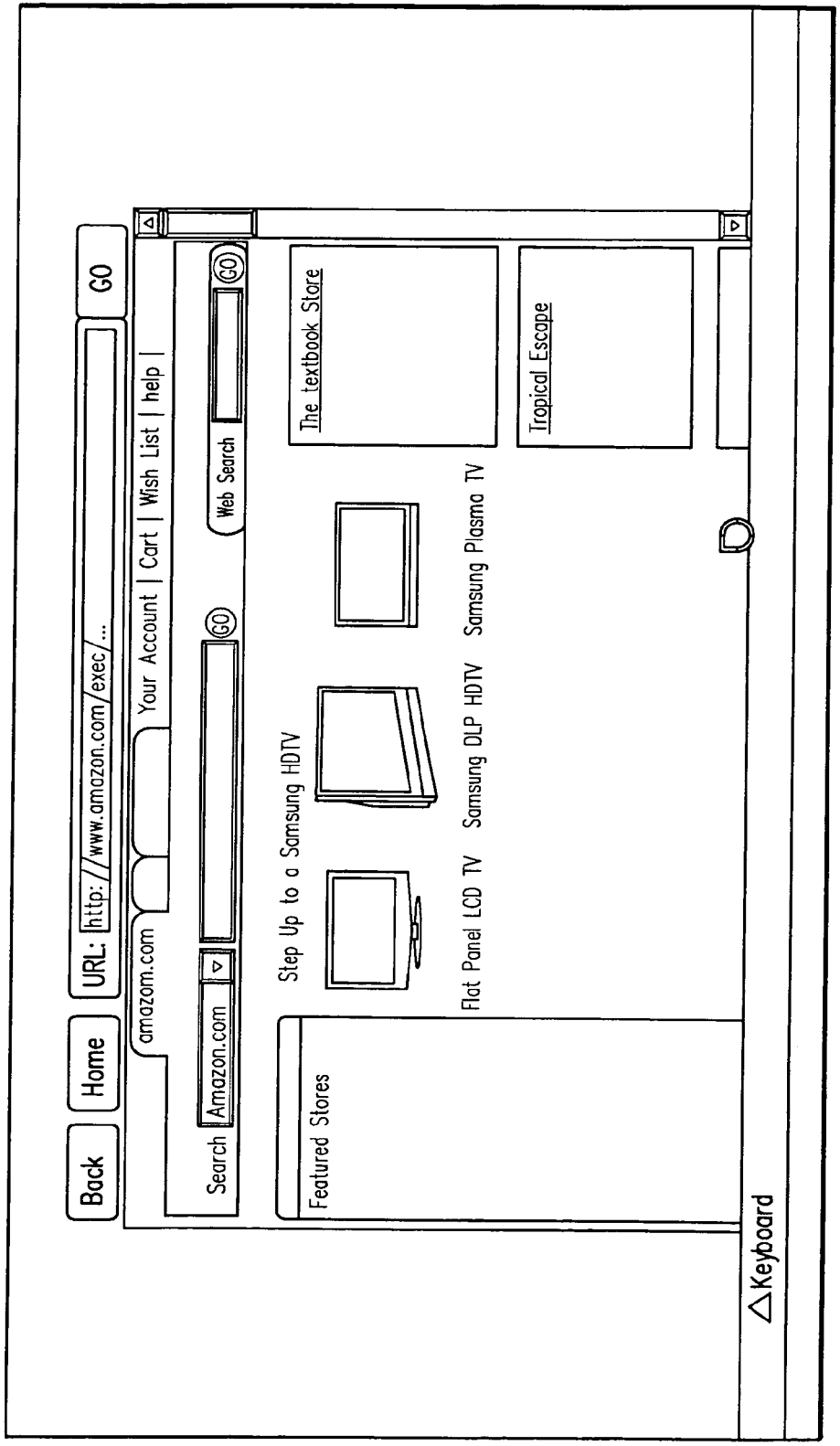
FIGS. 31(a)-31(b) are GUI screens illustrating using 3D pointing to manipulate an Internet interface according to an exemplary embodiment of the present invention.
Figure 31B:
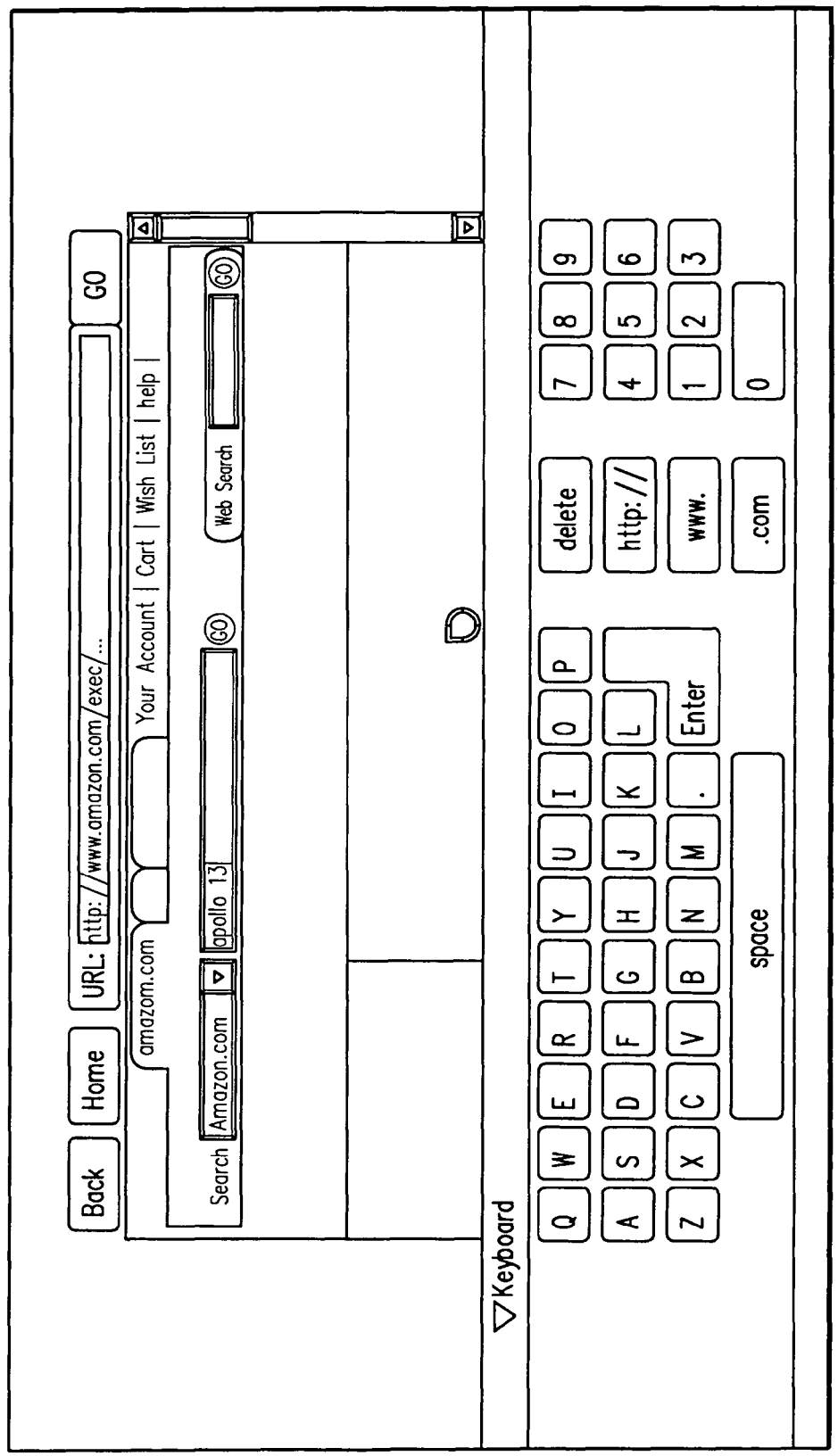

Internet Browsing: In an internet browsing application, there are the following exemplary benefits:
1. User can surf the web on TV in a very similar way to how it is done on the desktop, e.g., as shown in FIG. 31(a). The difference is that the 3D complexities are dealt with.
2. Text entry can be done on-screen with on-screen tool if user doesn't want to bother with a keyboard, e.g., as shown in FIG. 31(b).

Figure 32A:
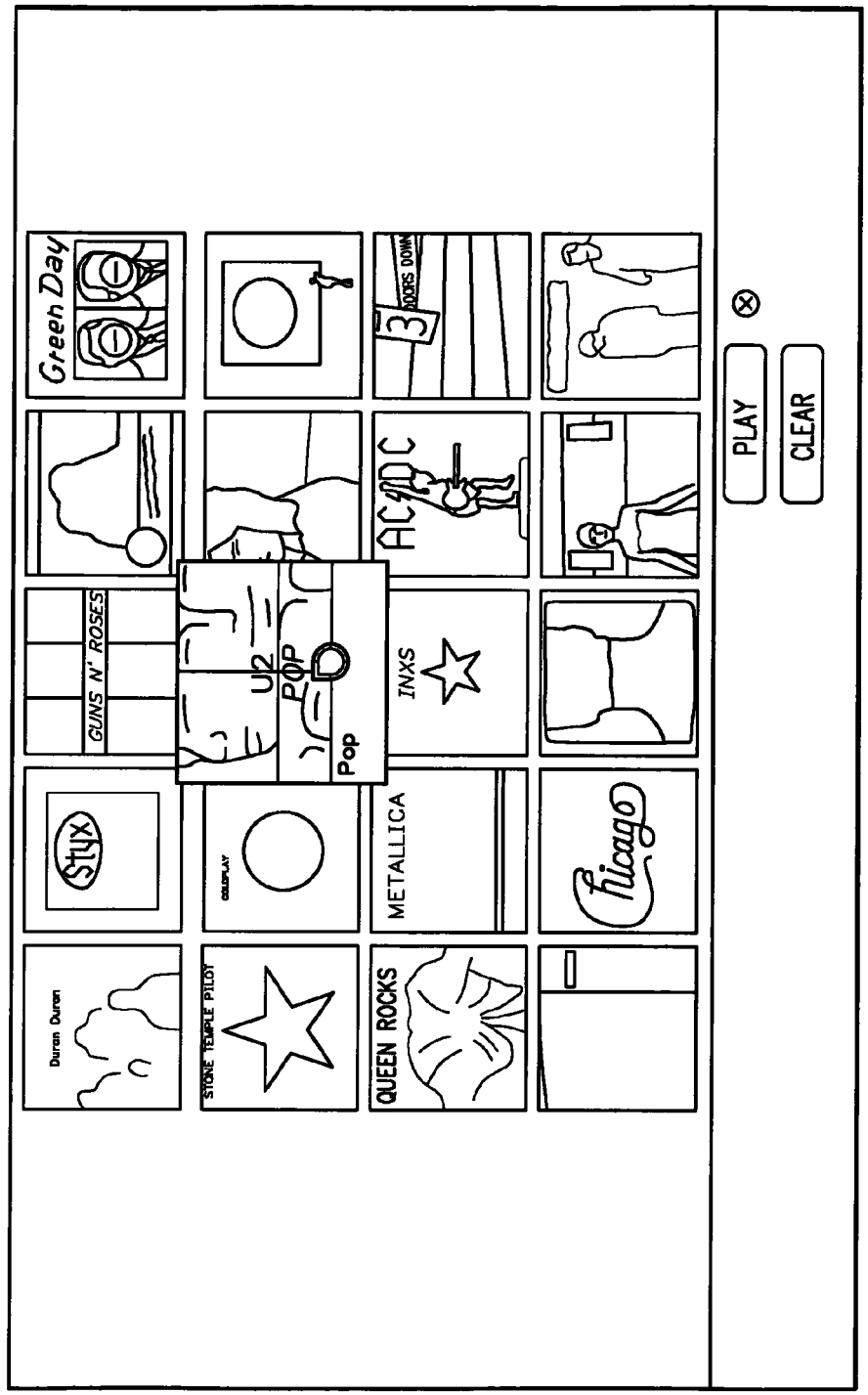
Figure 32B:
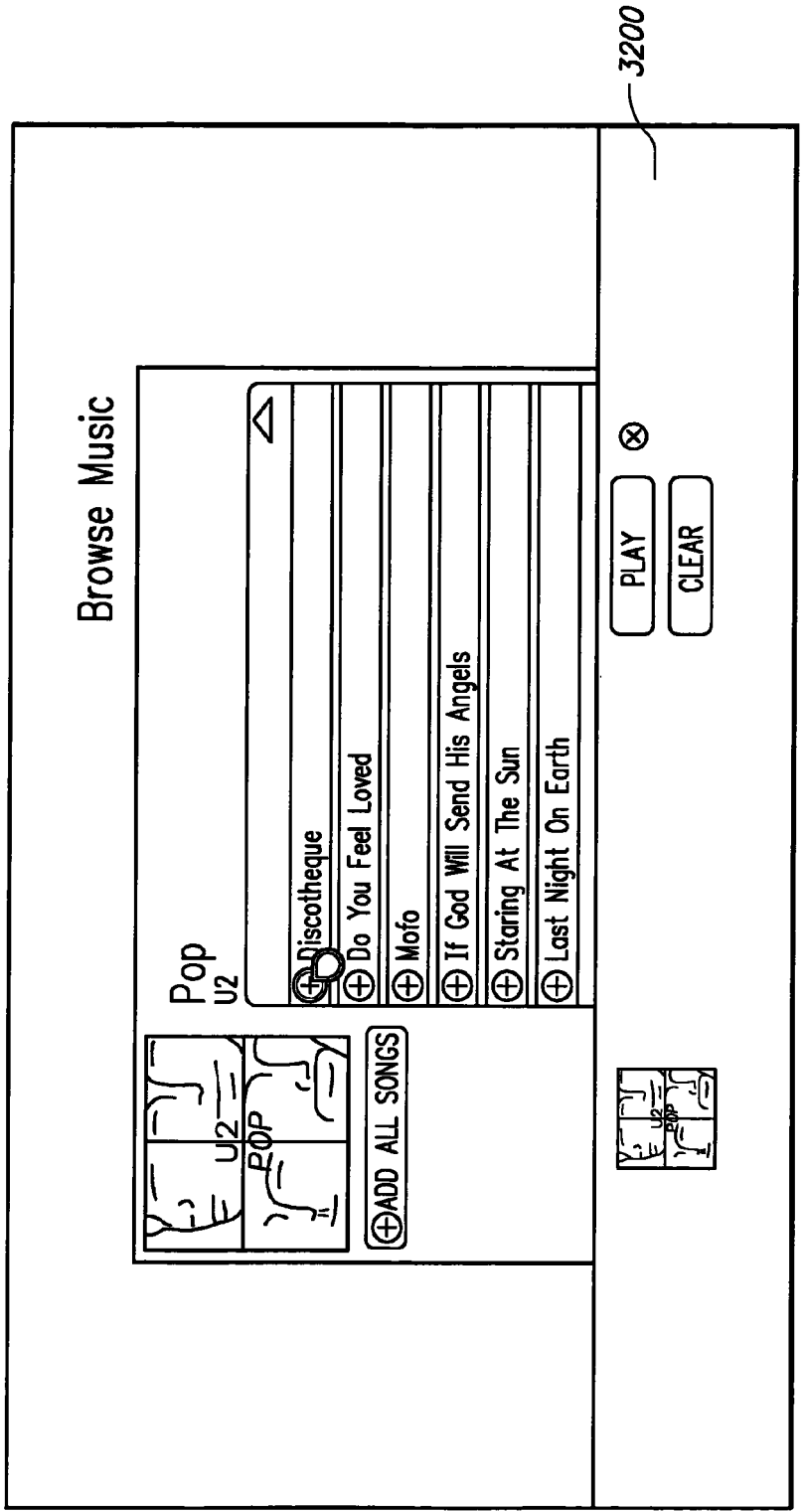

Music: In a music application, there are the following exemplary benefits:
1. User can point at a music list or visual music presentation and either automatically add it to a playlist or just play it. For example, a user can navigate to a portion of a bookshelf of album covers as illustrated in FIG. 32(a) and select a particular album by pointing to it. This can result in the display of a screen such as that depicted in FIG. 32(b) wherein individual music tracks can be selected and added to a playlist portion 3200 of the GUI screen.
2. User can easily navigate cross-links by pointing at the ones of interest (like similar artists or similar albums).
3. On-screen transport controls 3202 allow for easy control of either the song or playlist playback as illustrated in FIG. 32(c) and can also be added to any visual display.

Figure 33A:
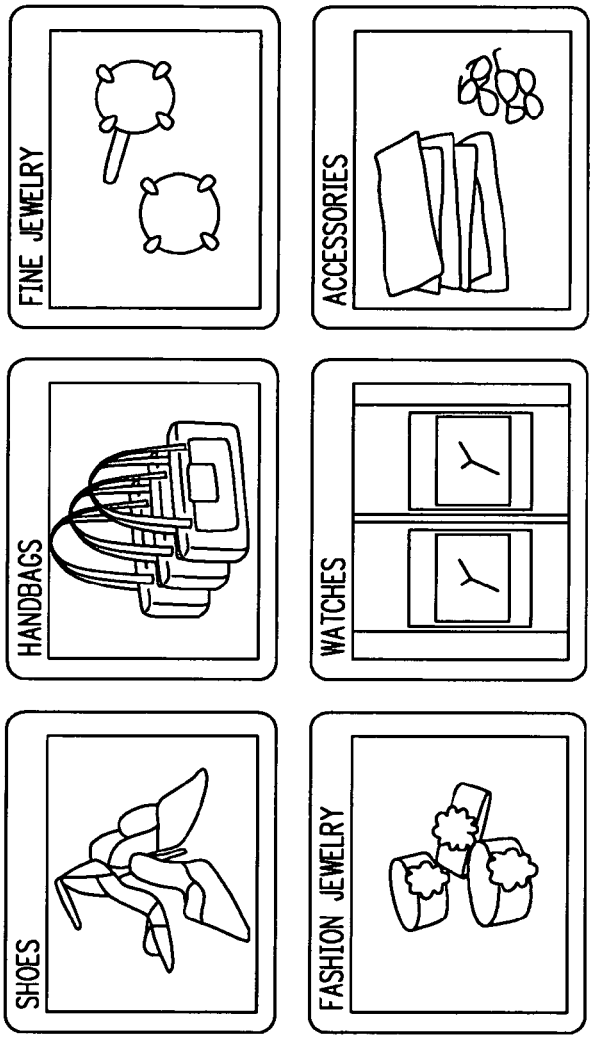
FIGS. 33(a)-33(f) are GUI screens illustrating using 3D pointing to manipulate a shopping interface according to an exemplary embodiment of the present invention.
Figure 33B:
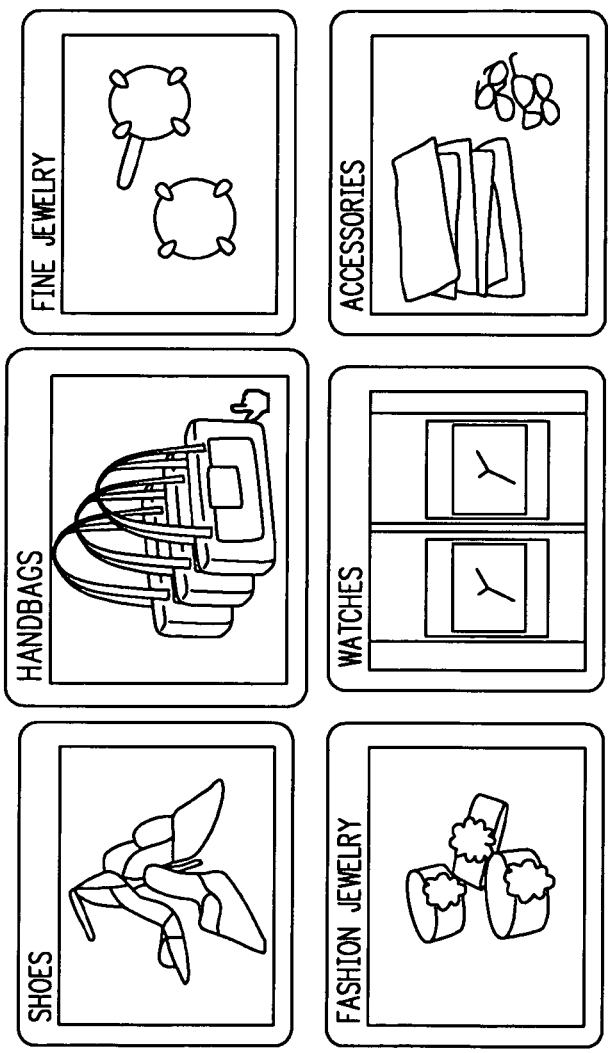
Figure 33C:
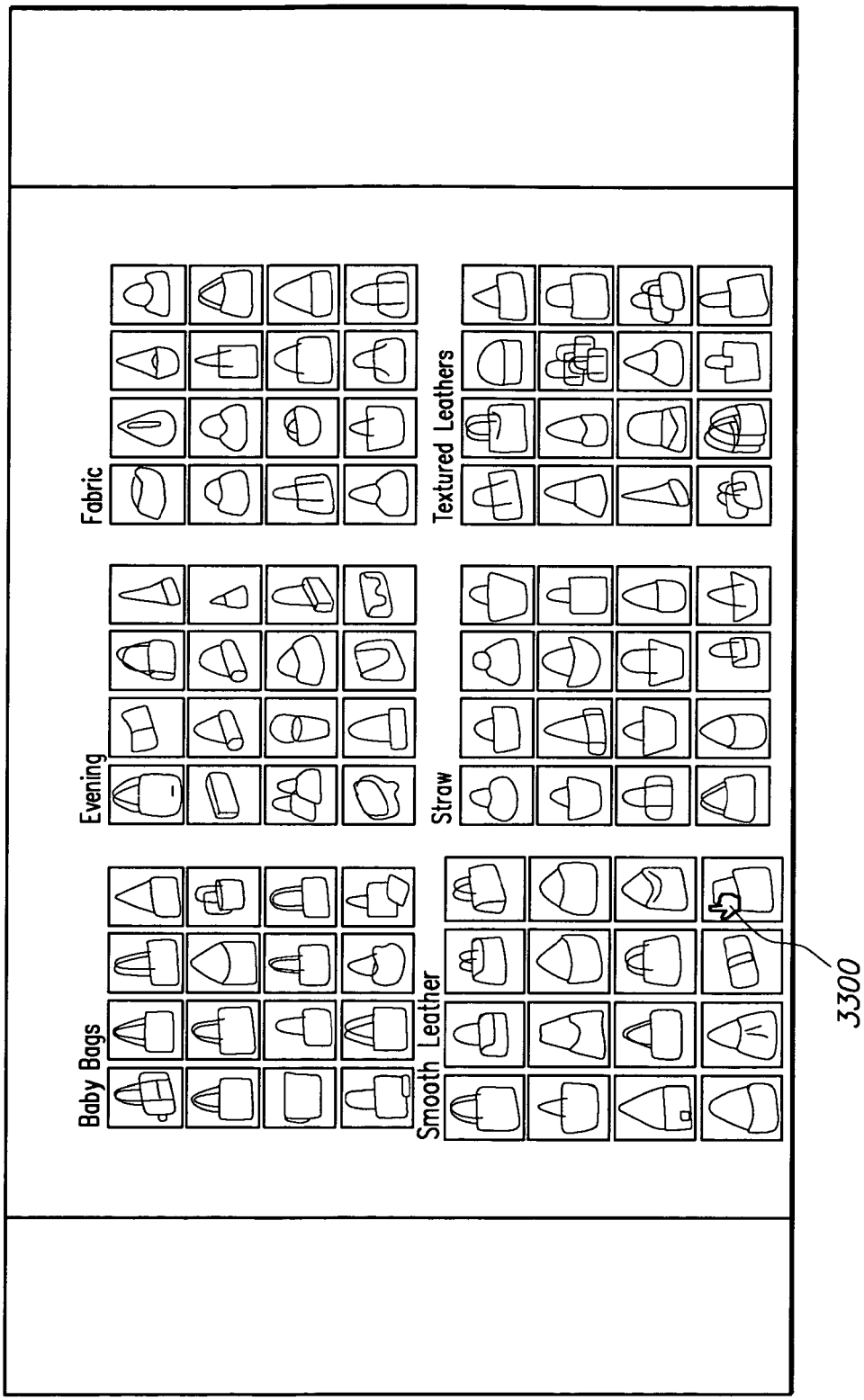
Figure 33D:
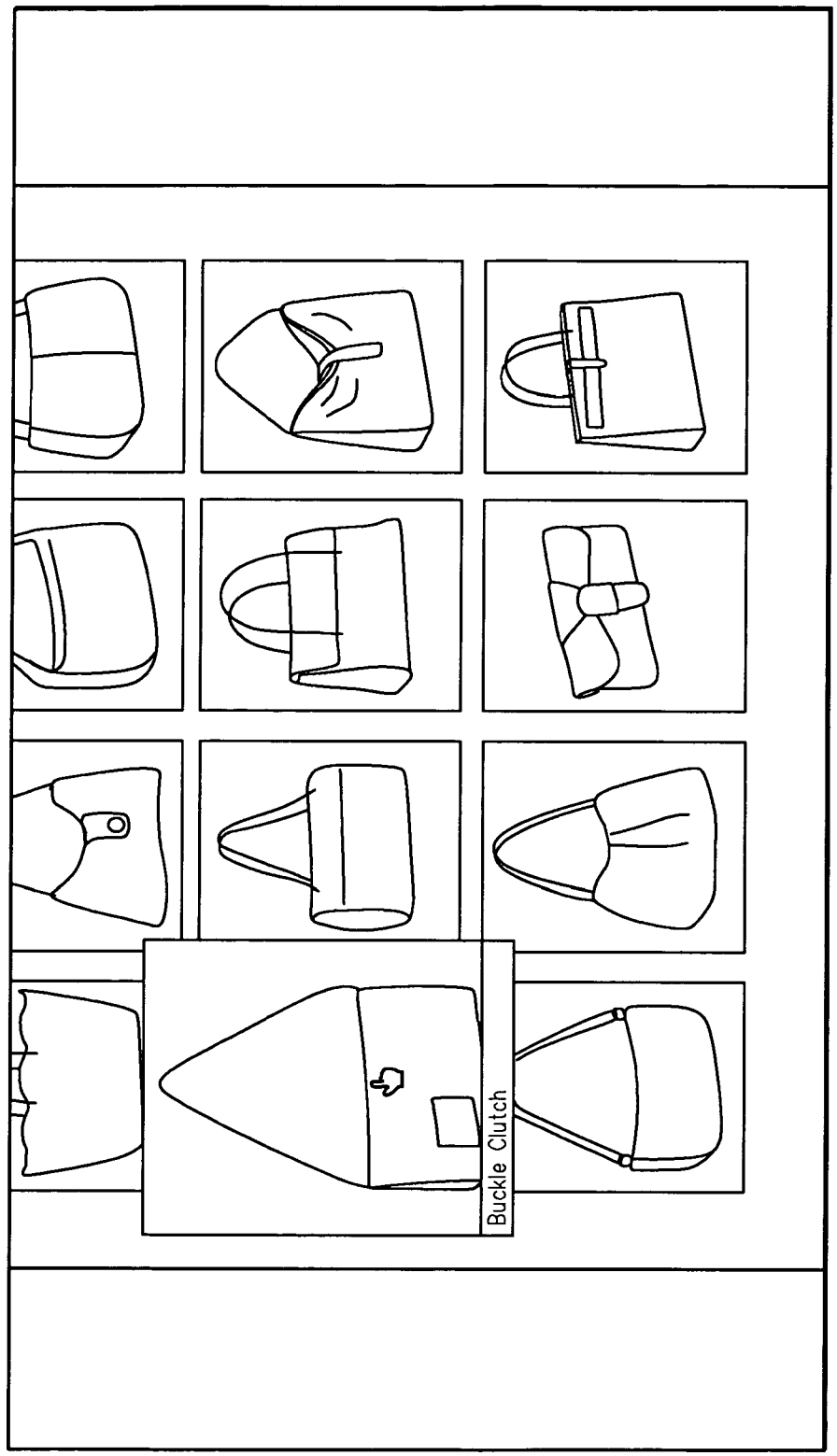
Figure 33E:
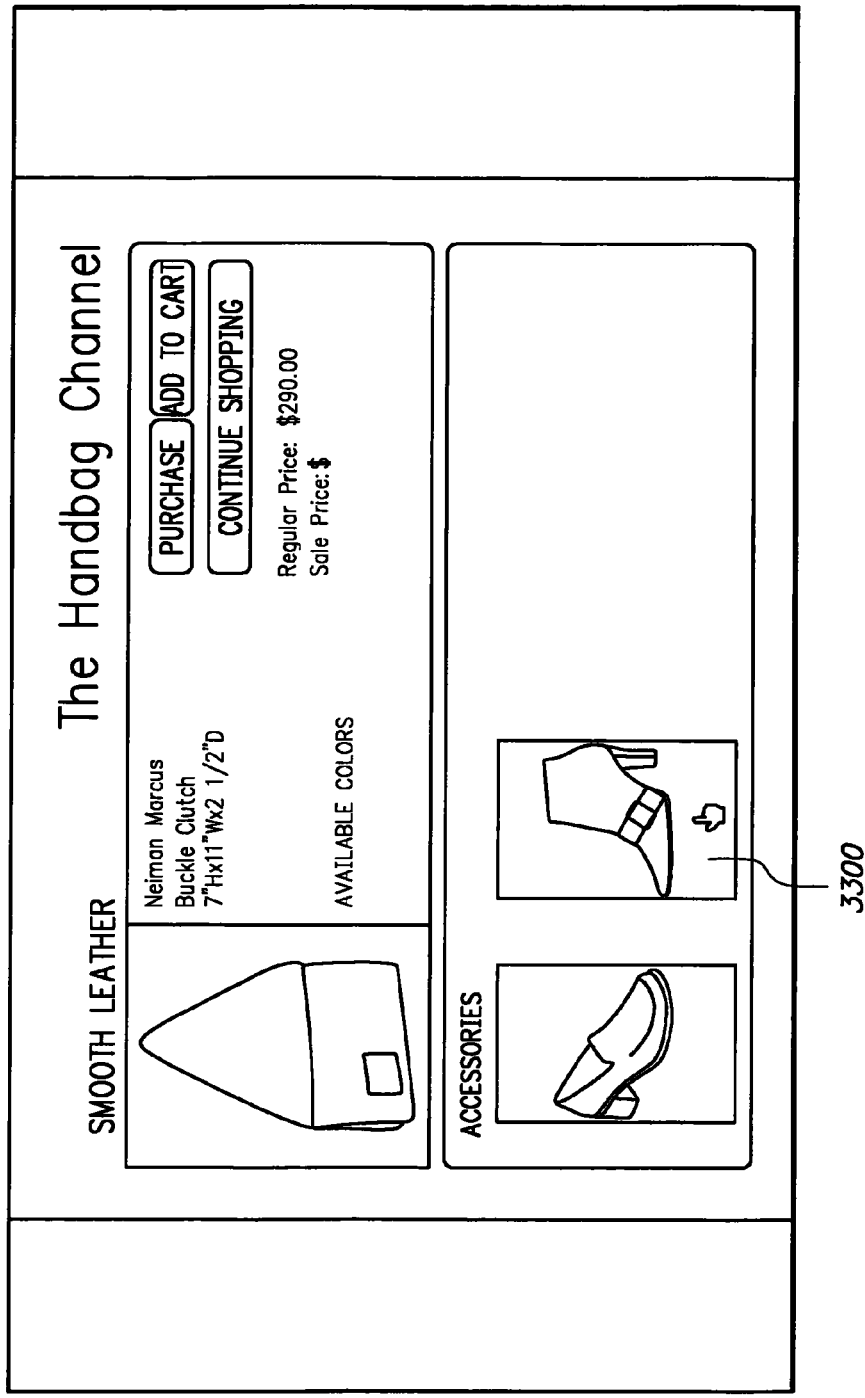
Figure 33F:
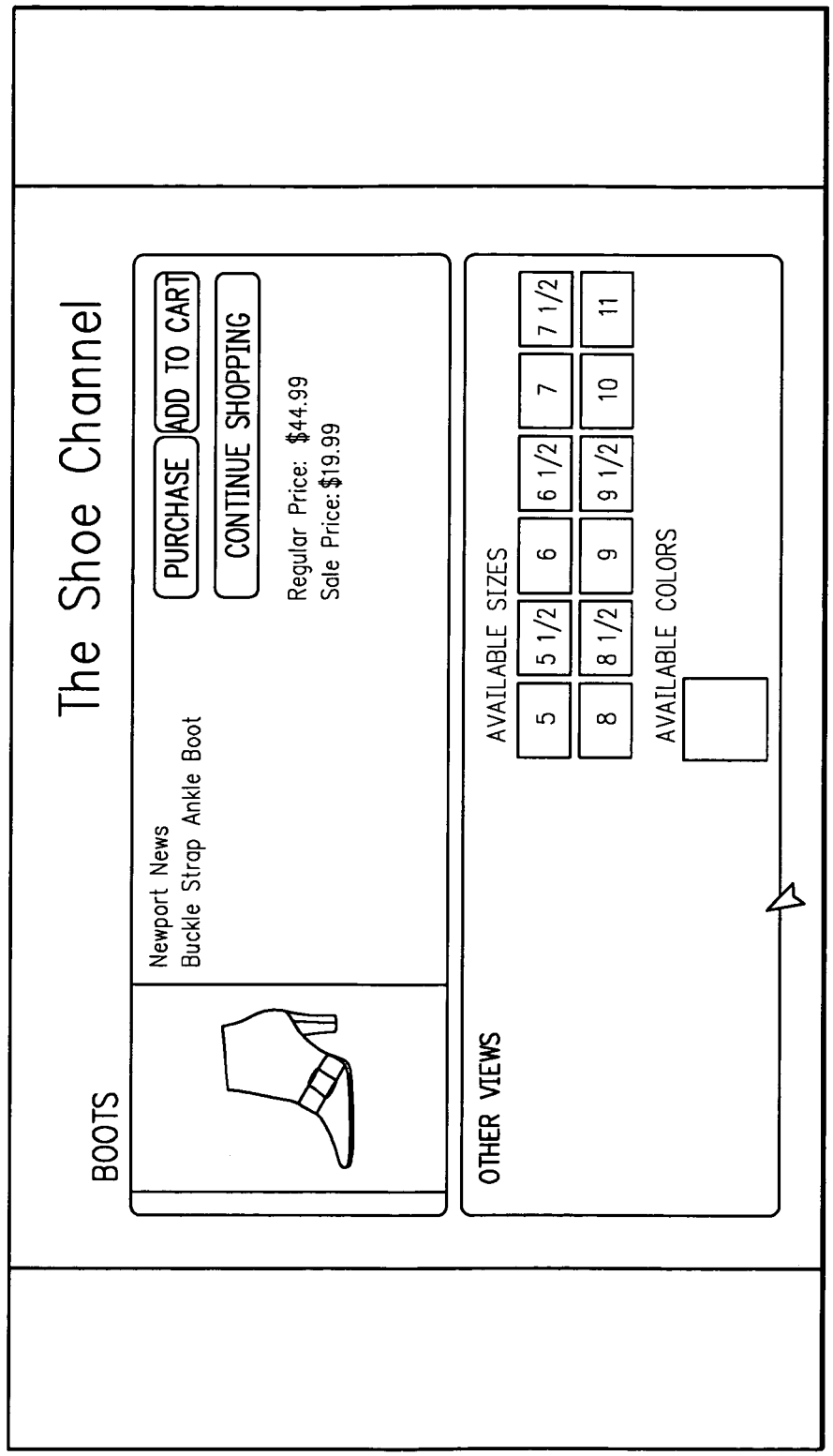

Shopping: In a shopping application, there are the following exemplary benefits:
1. User can point at a shopping items list or visual goods presentation and either automatically add it to a shopping cart or just buy it. For example, as illustrated in FIG. 33(a), at a first zoom level, a number of different categories of items for sale can be depicted using some generic phrases and images. When a user pauses the cursor 3300 over a particular category, e.g., "Handbags" in FIG. 33(b), that image is magnified slightly to denote its current selection. Then, either automatically or as a result of an additional user input (e.g., a button press), a zoom in can be performed on the "Handbag" category, revealing a bookshelf of handbags as shown in FIG. 33(c). Again, the cursor's position indicates a current selection within the bookshelf, reflected by the hover-zoom of the "Smooth Leather" category of items in FIG. 33(c). Another zoom in can be performed, again either automatically after an elapsed period of pointing at this category or in response to a specific user input via the handheld device, resulting in a more detailed view of this category as shown in FIG. 33(d). Selection of an image of particular handbag may result in a zoom in to the detailed view of FIG. 33(e), e.g., using the zooming, panning and/or translating effects described above.
2. User can easily navigate cross-links by pointing at the ones of interest (like other goods from same store, matching accessories, similar designers). For example, as shown in FIG. 33(e) a crosslink to a shoe accessory is displayed as an image 3300. If that link is activated, the user can jump to a detailed view of that item without having to navigate through the various higher level screens to reach it, as seen in FIG. 33(f).
3. User can easily get more information on an item of interest by hovering or by zooming.

The user is allowed to just point at the screen to indicate what is desired. The gesture itself can optionally be considered as part of the applications input. By adjusting the application both to take account of (e.g., tremor, unintended movement, screen resolutions) and take advantage of (e.g., semantic hover, zoom, screen image relevant controls) the 3D navigation, a truly powerful interactive TV application is possible. An additional discussion of exemplary techniques for handling unintended movement of a 3D pointing device is found in U.S. patent application Ser. No. 11/119,987, entitled "Methods and Devices for Removing Unintentional Movement in 3D Pointing Devices", filed on May 2, 2005, the disclosure of which is incorporated here by reference.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:
1. A method for using a 3D pointing device with a software application that displays output on a television screen, the method comprising the steps of:
displaying a first set of information on said television screen associated with said software application, wherein said software application includes at least one of: an electronic program guide, television screen controls, a photo album, a home video collection and a shopping interface;
receiving data associated with movement of said 3D pointing device;
processing said data associated with movement of said 3D pointing device to compensate for unintended movement of said 3D pointing device;
moving a cursor displayed on said television screen based on said processed data to a new position on said television screen; and
changing said display of said first set of information on said television screen in response to said new position of said cursor.

2. The method of claim 1, wherein said unintended movement is caused by tremor associated with a user holding said 3D pointing device.

3. The method of claim 1, wherein said unintended movement is caused by a user actuating a movable element on said 3D pointing device.

4. The method of claim 1, further comprising the step of:
displaying, at least in part based on said new position of said cursor after said step of moving said cursor, a second set of information on said television screen, said second set of information being different than said first set of information.

5. The method of claim 4, wherein said first set of information includes a plurality of images and second set of information is a hoverzoom of an image associated with said first set of information.

6. The method of claim 4, wherein said step of displaying said second set of information requires an additional input from a user in addition to said movement of said cursor.

7. The method of claim 4, wherein said step of displaying said second set of information further comprises the step of:
displaying said second set of information in direct response to said cursor position without requiring any additional input from a user.

8. The method of claim 4, wherein said first set of information is a program guide and second set of information is displayed by scrolling a linear list of programs.

9. The method of claim 4, wherein said first set of information is a program guide and said second set of information is a screen control which is displayed in response to a user request.

10. The method of claim 4, wherein said first set of information is a program guide and said second set of information includes cross-links displayed responsive to hovering over an item displayed as part of said first set of information or selecting said item.

11. The method of claim 4, wherein said first set of information is a program guide and said second set of information includes on-screen transport controls associated with the control of video playback.

12. The method of claim 4, wherein said first set of information is a photo collection and wherein second set of information is a playlist to which said photo collection is added.

13. The method of claim 4, wherein said first set of information is a photo collection and wherein said second set of information is a zoomed version of said photo album which provides contextual information associate therewith that permits hierarchical sorting.

14. The method of claim 4, wherein said first set of information is a photo collection and wherein said second set of information includes on-screen transport controls which enable a user to control a slide show presentation of photos.

15. The method of claim 4, wherein said first set of information is a video collection and wherein said second set of information is a playlist to which said video collection is added.

16. The method of claim 4, wherein said first set of information is a video collection and wherein said second set of information is a zoomed version of said video collection which provides contextual information associate therewith that permits hierarchical sorting.

17. The method of claim 4, wherein said first set of information is a video collection and wherein said second set of information includes on-screen transport controls which enable a user to control presentation of said video collection.

18. The method of claim 4, wherein said first set of information is a calendar and wherein said second set of information is information associated with a particular day on said calendar, displayed on said television screen in response to movement of said cursor over a respective portion of said calendar.

19. The method of claim 4, wherein said first set of information is a calendar and wherein said second set of information is information associated with a particular day on said calendar, which information can be edited by a user using an on-screen text entry system.

20. The method of claim 4, wherein said first set of information is a calendar and wherein said second set of information is a sorted version of said calendar.

21. A system for using a 3D pointing device with a software application stored on a computer-readable medium that displays output on a television screen, the system comprising:
means for displaying a first set of information on said television screen associated with said software application, wherein said software application includes at least one of: an electronic program guide, television screen controls, a photo album, a home video collection and a shopping interface;
means for receiving data associated with movement of said 3D pointing device;
means for processing said data associated with movement of said 3D pointing device to compensate for unintended movement of said 3D pointing device;
means for moving a cursor displayed on said television screen based on said processed data to a new position on said television screen; and
means for changing said display of said first set of information on said television screen in response to said new position of said cursor.

22. The system of claim 21, wherein said unintended movement is caused by tremor associated with a user holding said 3D pointing device.

23. The system of claim 21, wherein said unintended movement is caused by a user actuating a movable element on said 3D pointing device.

24. The system of claim 21, further comprising:
means for displaying, at least in part based on said new position of said cursor after said step of moving said cursor, a second set of information on said television screen, said second set of information being different than said first set of information.

25. The system of claim 24, wherein said first set of information includes a plurality of images and second set of information is a hoverzoom of an image associated with said first set of information.

26. The system of claim 24, wherein said means for displaying said second set of information requires an additional input from a user in addition to said movement of said cursor.

27. The system of claim 24, wherein said means for displaying said second set of information further comprises:
means for displaying said second set of information in direct response to said cursor position without requiring any additional input from a user.

* * * * *